(12) United States Patent
Mitchell et al.

(10) Patent No.: US 9,754,428 B2
(45) Date of Patent: *Sep. 5, 2017

(54) INTERACTIVE TIMELINE INTERFACE AND DATA VISUALIZATION

(71) Applicant: FLEETMATICS IRELAND LIMITED, Dublin (IE)

(72) Inventors: Peter Mitchell, Dublin (IE); Kyle Erlenbach, Solon, OH (US)

(73) Assignee: FLEETMATICS IRELAND LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,602

(22) Filed: Sep. 16, 2013

(65) Prior Publication Data

US 2015/0081162 A1    Mar. 19, 2015

(51) Int. Cl.
| | |
|---|---|
| *G06Q 10/06* | (2012.01) |
| *G07C 5/08* | (2006.01) |
| *G07C 5/02* | (2006.01) |
| *B60W 40/09* | (2012.01) |
| *G07C 5/00* | (2006.01) |
| *G06Q 10/08* | (2012.01) |
| *G08G 1/01* | (2006.01) |
| *G08G 1/00* | (2006.01) |
| *B60W 40/08* | (2012.01) |

(52) U.S. Cl.
CPC .............. *G07C 5/02* (2013.01); *B60W 40/09* (2013.01); *G06Q 10/06* (2013.01); *G06Q 10/08* (2013.01); *G07C 5/008* (2013.01); *G08G 1/0112* (2013.01); *G08G 1/0129* (2013.01); *G08G 1/20* (2013.01); *B60W 2040/0818* (2013.01)

(58) Field of Classification Search
CPC ............ G06Q 10/06; G06Q 10/06398; G06Q 10/1091; G07C 5/00; G07C 5/02; G07C 5/06; G07C 5/08; G07C 5/12; B60W 40/09
USPC ......................................... 701/32.4; 705/7.38
See application file for complete search history.

(56) References Cited

U.S. PATENT DOCUMENTS

| | | | |
|---|---|---|---|
| 4,974,170 | A | 11/1990 | Bove et al. |
| 5,025,261 | A | 6/1991 | Ohta et al. |
| 5,223,844 | A | 6/1993 | Mansell et al. |
| 5,430,656 | A | 7/1995 | Dekel et al. |
| 5,652,707 | A | 7/1997 | Wortham |
| 5,682,525 | A | 10/1997 | Bove et al. |
| 5,774,830 | A | 6/1998 | Tsuji |
| 6,067,007 | A | 5/2000 | Gioia |

(Continued)

FOREIGN PATENT DOCUMENTS

| | | |
|---|---|---|
| DE | 10151354 | 5/2003 |
| DE | 10 2006 056 874 | 6/2008 |

(Continued)

OTHER PUBLICATIONS

FleetMatics UK, FleetMatics 8.0 User Guide, Jul. 2011, FleetMatics UK.*

(Continued)

*Primary Examiner* — Mussa A Shaawat
*Assistant Examiner* — Nadeem Odeh

(57) ABSTRACT

A computer system and method for storing and processing GPS data for a plurality of drivers and vehicles to provide a visual representation of driver's activity for fleets of driver and vehicles.

20 Claims, 61 Drawing Sheets

(56) References Cited

U.S. PATENT DOCUMENTS

| | | | |
|---|---|---|---|
| 6,148,260 A | 11/2000 | Musk et al. | |
| 6,181,911 B1 | 1/2001 | Sih et al. | |
| 6,195,041 B1 | 2/2001 | Gardner et al. | |
| 6,505,106 B1 | 1/2003 | Lawrence et al. | |
| 6,862,524 B1 | 3/2005 | Nagda et al. | |
| 7,040,435 B1 | 5/2006 | Lesesky et al. | |
| 7,155,321 B2 | 12/2006 | Bromley et al. | |
| 7,388,518 B2 | 6/2008 | Mitchell et al. | |
| 7,561,054 B2 | 7/2009 | Raz et al. | |
| 7,587,278 B2 | 9/2009 | Poe et al. | |
| 7,827,507 B2 | 11/2010 | Geise et al. | |
| 8,032,277 B2 * | 10/2011 | Larschan et al. | 701/32.4 |
| 8,140,358 B1 | 3/2012 | Lin et al. | |
| 8,577,935 B2 | 11/2013 | Keaveny et al. | |
| 2004/0218910 A1 | 11/2004 | Chang et al. | |
| 2004/0249565 A1 | 12/2004 | Park | |
| 2004/0254698 A1 | 12/2004 | Hubbard et al. | |
| 2005/0154769 A1 | 7/2005 | Eckart et al. | |
| 2006/0116819 A1 | 6/2006 | Soundararajan | |
| 2006/0200008 A1 | 9/2006 | Moore-Ede | |
| 2006/0213731 A1 | 9/2006 | Leseky et al. | |
| 2007/0120986 A1 | 5/2007 | Nunomaki | |
| 2007/0150188 A1 | 6/2007 | Rosenberg | |
| 2007/0239322 A1 | 10/2007 | McGuade et al. | |
| 2007/0266180 A1 | 11/2007 | Mitchell et al. | |
| 2008/0300784 A1 | 12/2008 | Kleinstern et al. | |
| 2009/0135730 A1 | 5/2009 | Scott et al. | |
| 2009/0138188 A1 | 5/2009 | Kores et al. | |
| 2010/0057334 A1 | 3/2010 | Ramaswamy et al. | |
| 2010/0087984 A1 * | 4/2010 | Joseph | 701/33 |
| 2010/0100507 A1 | 4/2010 | Davidson et al. | |
| 2010/0125409 A1 | 5/2010 | Prehofer | |
| 2010/0203901 A1 | 8/2010 | Dinoff et al. | |
| 2010/0215250 A1 | 8/2010 | Zhu | |
| 2011/0071867 A1 | 3/2011 | Chen et al. | |
| 2011/0093291 A1 | 4/2011 | Leistner | |
| 2011/0112717 A1 | 5/2011 | Resner | |
| 2011/0122775 A1 | 5/2011 | Zamoetti et al. | |
| 2011/0153367 A1 | 6/2011 | Amigo et al. | |
| 2011/0161102 A1 | 6/2011 | Leistner | |
| 2011/0191135 A1 | 8/2011 | Williams et al. | |
| 2011/0307297 A1 | 12/2011 | Leistner | |
| 2012/0066030 A1 | 3/2012 | Limpert | |
| 2012/0078497 A1 | 3/2012 | Burke, Jr. | |
| 2012/0197484 A1 * | 8/2012 | Nath et al. | 701/32.4 |
| 2012/0256770 A1 | 10/2012 | Mitchell | |
| 2012/0259545 A1 | 10/2012 | Mitchell | |
| 2013/0007626 A1 | 1/2013 | Adams et al. | |
| 2013/0079971 A1 * | 3/2013 | Raghunathan | G07C 5/008 701/31.4 |
| 2013/0162425 A1 | 6/2013 | Raghunathan et al. | |
| 2013/0225196 A1 | 8/2013 | James et al. | |

FOREIGN PATENT DOCUMENTS

| | | |
|---|---|---|
| GB | 2337653 | 11/1999 |
| GB | 2 345 824 | 7/2000 |
| WO | WO 2008/065131 | 6/2008 |
| WO | WO 2010/027469 | 3/2010 |

OTHER PUBLICATIONS

International Preliminary Report on Patentability for PCT/EP2012/071304 dated May 15, 2014.

International Preliminary Report on Patentability for PCT/EP2012/071217 dated May 15, 2014.

International Search Report and a Written Opinion (PCT/EP2014/069560) dated Nov. 26, 2014.

Iman M. Almomani et al "Ubiquitous GPS Vehicle Tracking and Management", Applied Electrical Engineering and Computing Technologies (AEECT), 2011 IEEE Jordan Conference on, IEEE. Dec. 6, 2011, pp. 1-6, XP032097253, DOI:10, 1109/AEECT.2011.6132526 ISBN:978-1-4577-1083-4 (D3).

International Search Report and a Written Opinion ( PCT/EP2014/069556) dated Dec. 22, 2014.

Notification Concerning Transmittal of International Preliminary Report on Patentability (Chapter 1 of the Patent Cooperation Treaty) dated Mar. 22, 2016 for Application No. PCT/EP2014/069552.

* cited by examiner

FIG. 3K

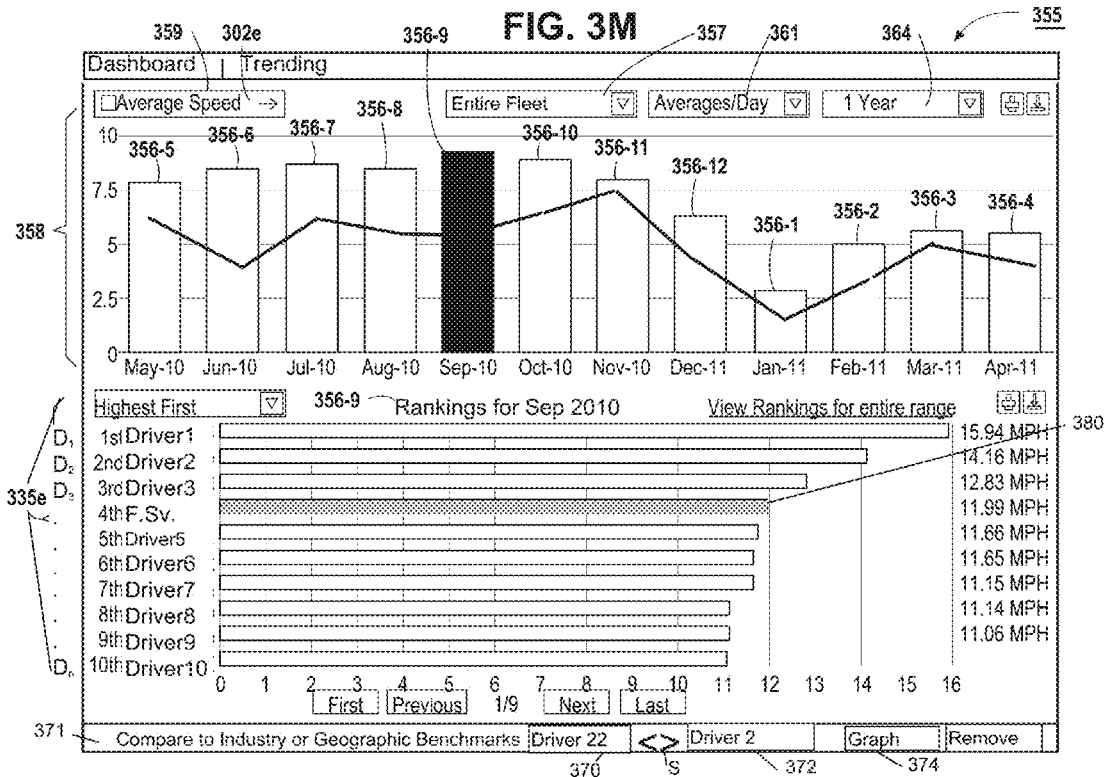

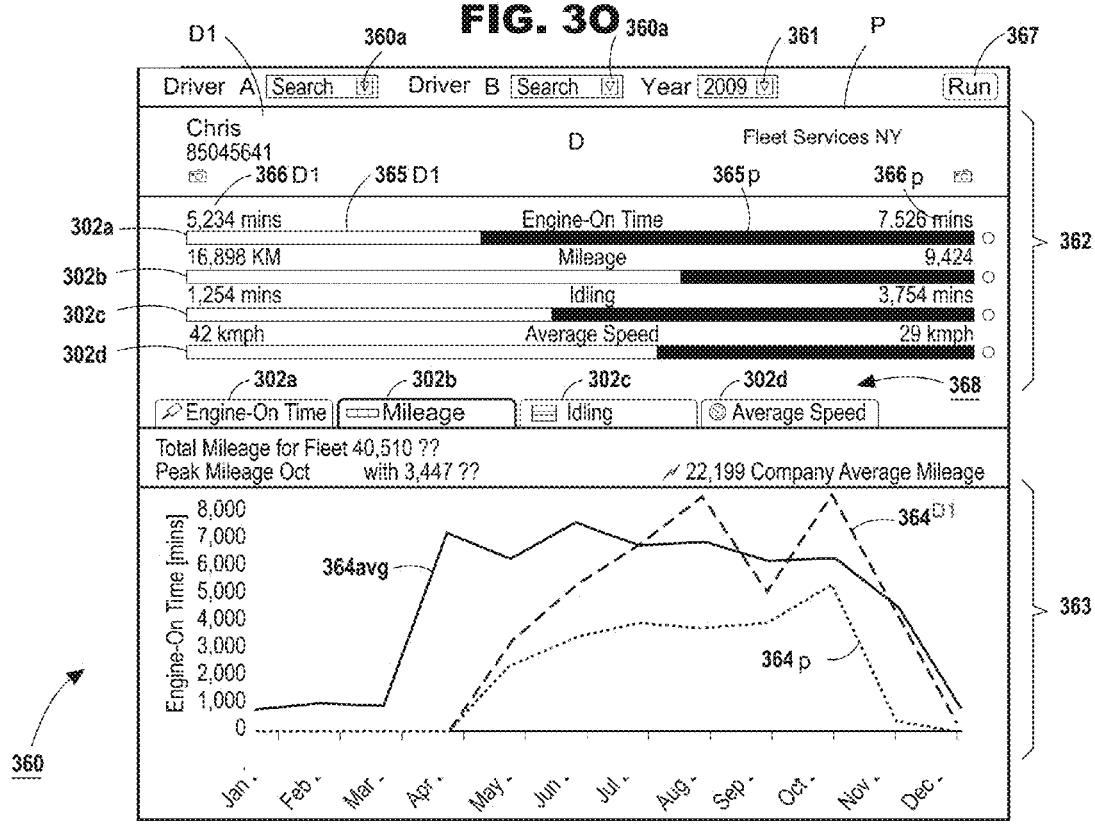

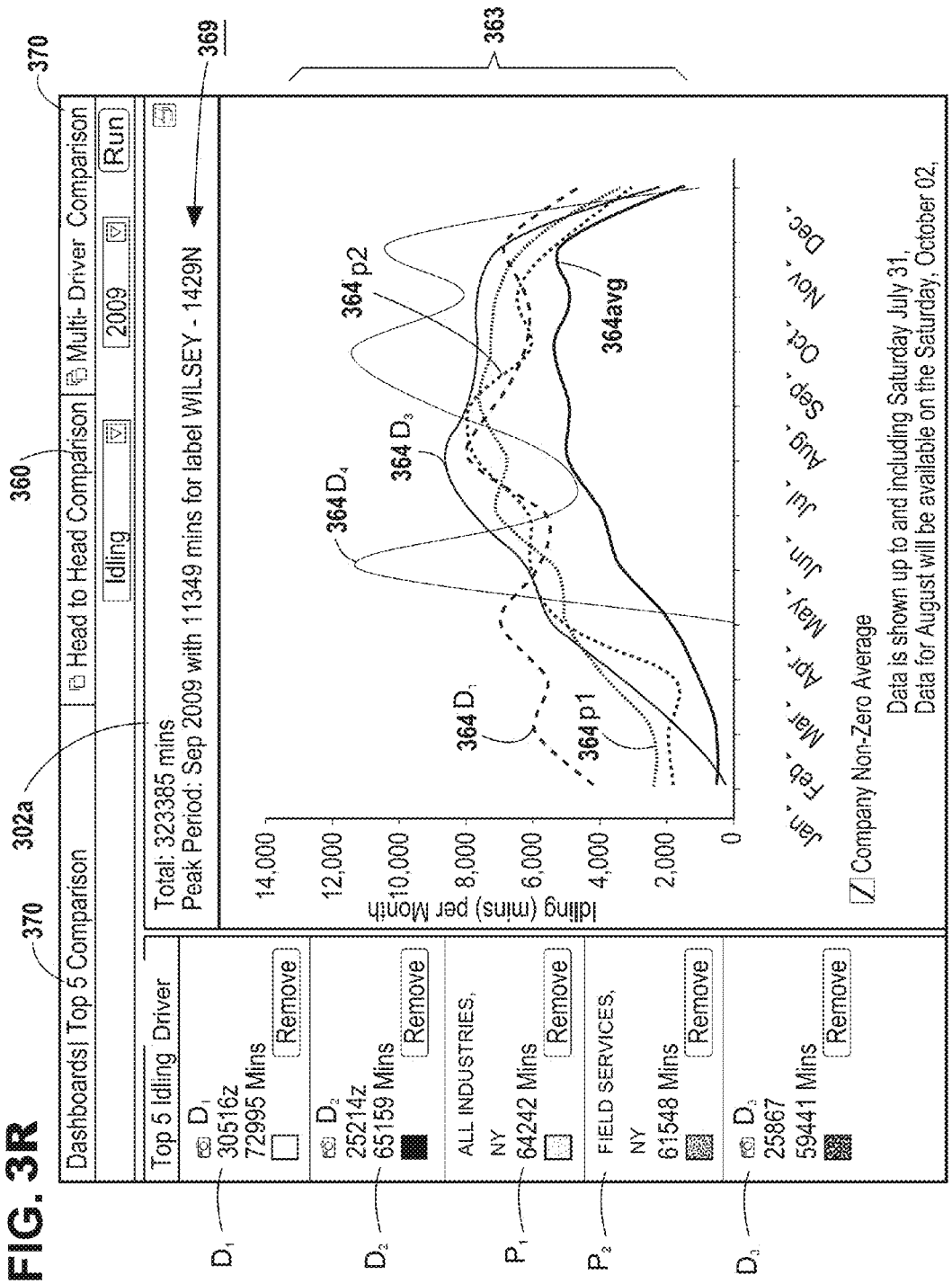

FIG. 3V

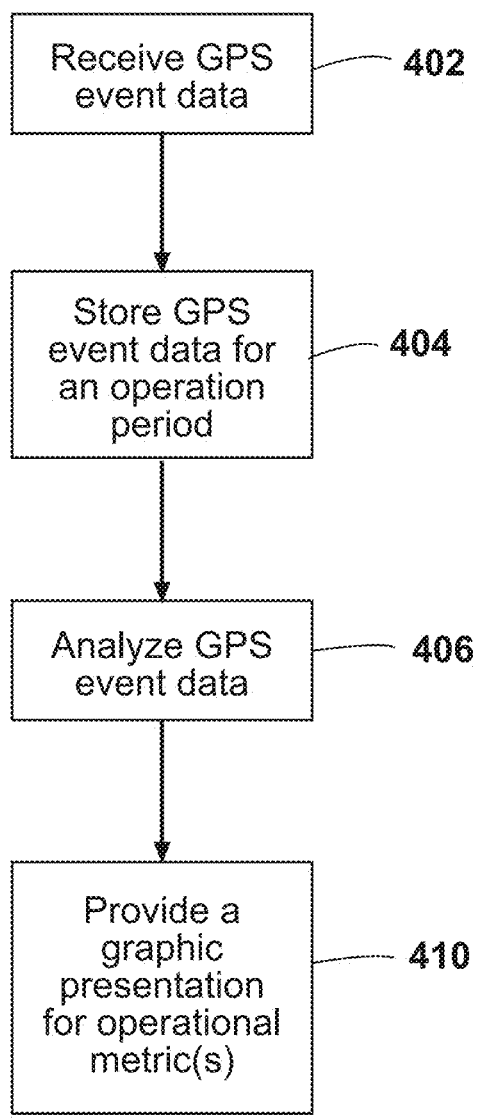

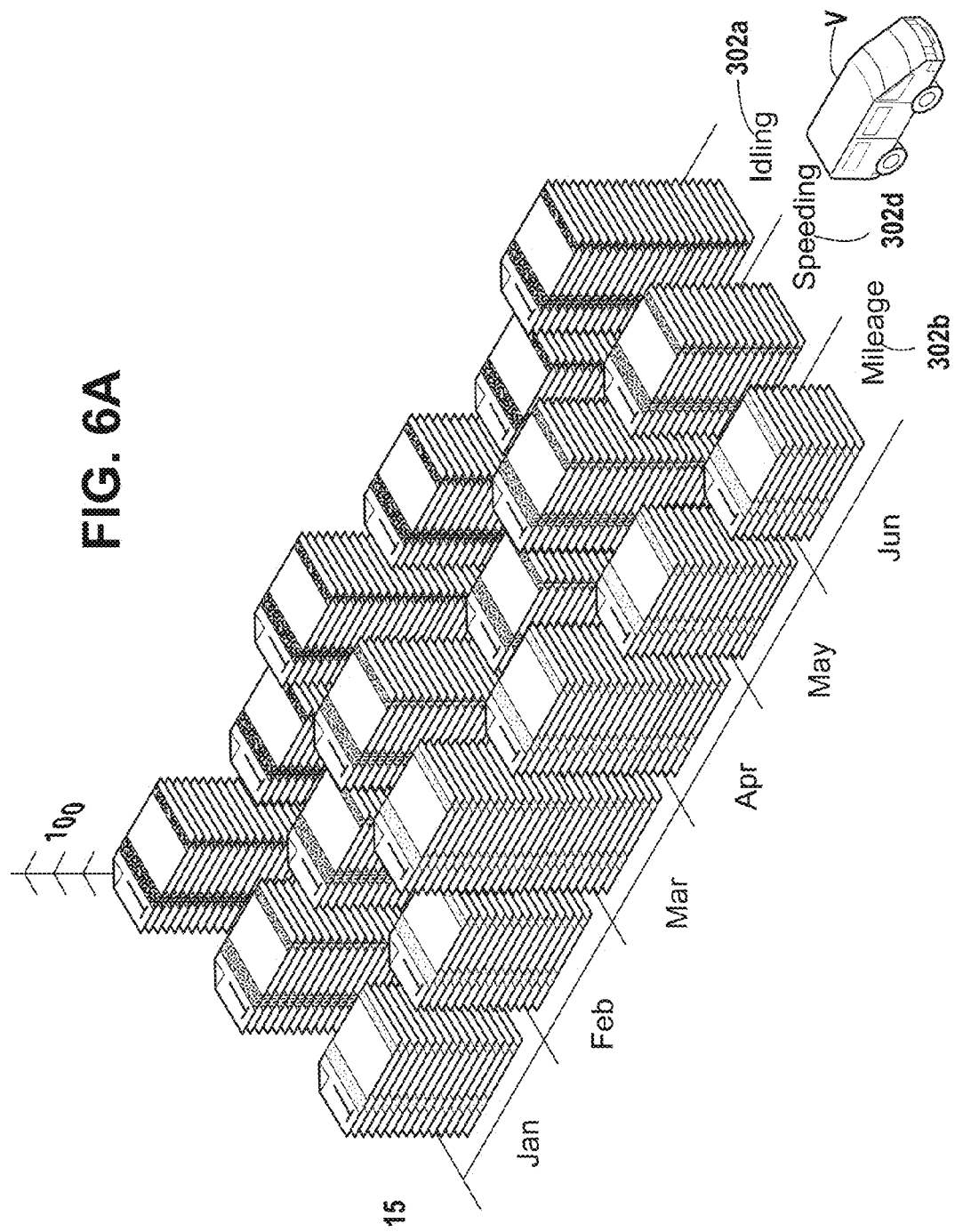

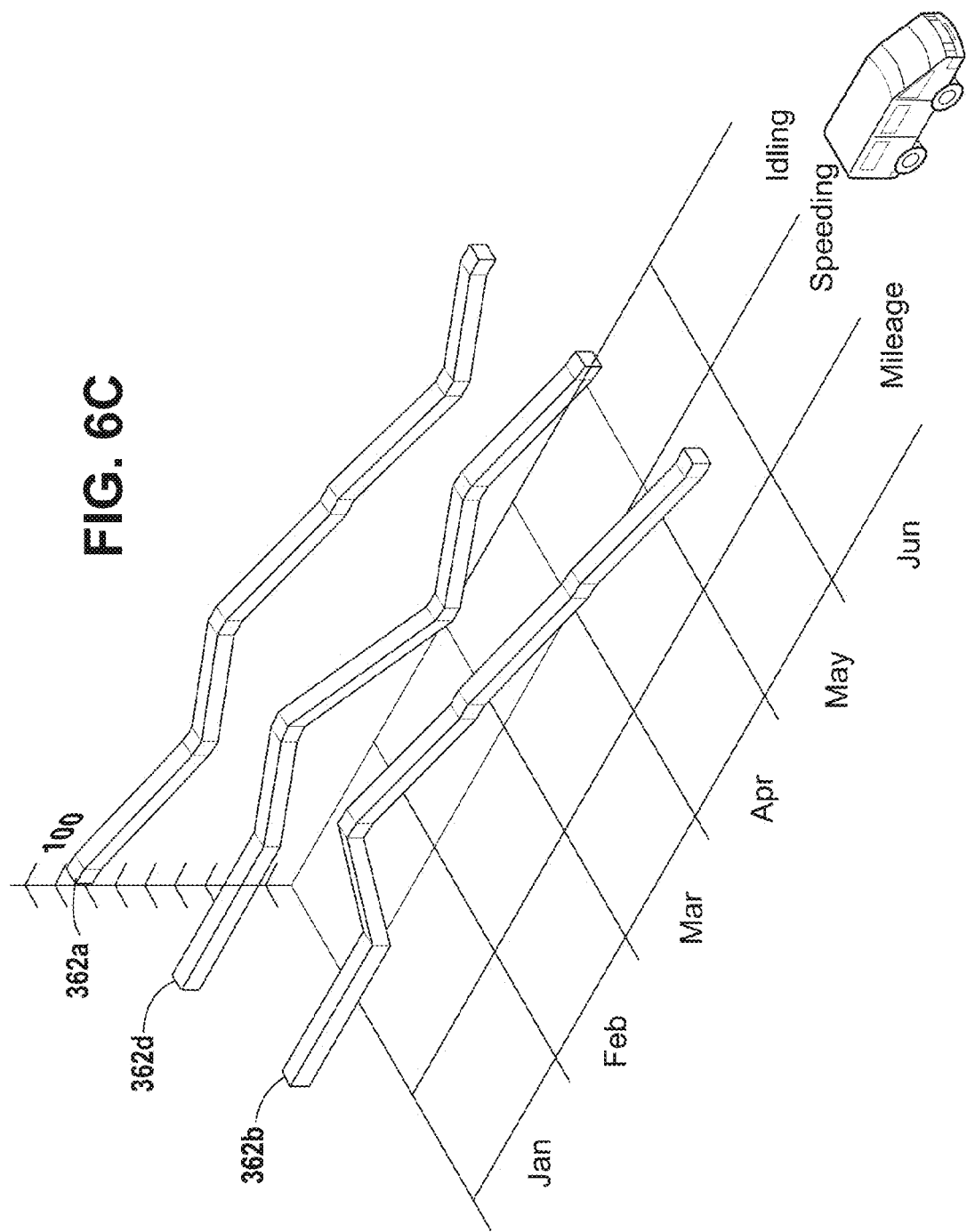

| INDUSTRY SEGMENT | LARGE STATES | | | | | | REGIONS | | | | | Countrywide |
|---|---|---|---|---|---|---|---|---|---|---|---|---|
| | FL | IL | NJ | NY | CA | TX | NORTH EAST | SOUTH EAST | SOUTH CENTRAL | MIDWEST | WEST | |
| 1. 1. Plumbing, Heating, Air-conditioning | 1 | 1 | 1 | 1 | 1 | 1 | 1 | 1 | 1 | 1 | 1 | 1 |
| 2. 1. Electrical Work | 1 | 1 | 1 | 1 | 1 | 1 | 1 | 1 | 1 | 1 | 1 | 1 |
| 3. 1. Disinfecting and Pest Control Service | 1 | | | | | | 1 | 1 | 1 | 1 | 1 | 1 |
| 4. 1. For Hire Trucking, Except Local | | | | | | | 1 | 1 | 1 | 1 | 1 | 1 |
| 5. 1. For Hire Trucking, Local | | | | | | | 1 | 1 | 1 | 1 | 1 | 1 |
| 6. 1. Landscapers | 1 | 1 | 1 | 1 | 1 | 1 | 1 | 1 | 1 | 1 | 1 | 1 |
| 7. 2. Delivery | 1 | 1 | 1 | 1 | 1 | 1 | 1 | 1 | 1 | 1 | 1 | 1 |
| 8. 2. Home & Business Field Service | 1 | 1 | 1 | 1 | 1 | 1 | 1 | 1 | 1 | 1 | 1 | 1 |
| 9. 2. Passenger Transportation | 1 | | 1 | 1 | | | 1 | 1 | 1 | 1 | 1 | 1 |
| 10. 3. Contractors Heavy | 1 | 1 | 1 | 1 | 1 | 1 | 1 | 1 | 1 | 1 | 1 | 1 |
| 11. 3. Contractors Light | 1 | 1 | 1 | 1 | 1 | 1 | 1 | 1 | 1 | 1 | 1 | 1 |
| 12. 3. Specialty Transport | 1 | 1 | 1 | 1 | 1 | 1 | 1 | 1 | 1 | 1 | 1 | 1 |
| 13. 4. All Industries ** | 1 | 1 | 1 | 1 | 1 | 1 | 1 | 1 | 1 | 1 | 1 | 1 |

** for Large States: excludes For Hire Trucking, Local and Hire Trucking, except Local

| State | Unique Vehicle Mix |
|---|---|
| NY | 8% |
| TX | 8% |
| FL | 7% |
| MA | 7% |
| CA | 6% |
| IL | 6% |
| NJ | 4% |

| Region | Unique Vehicle Mix |
|---|---|
| NORTH EAST | 32% |
| SOUTH EAST | 26% |
| MIDWEST | 18% |
| WEST | 11% |
| SOUTH CENTRAL | 11% |

June 2011 vehicle-day report

FIG. 7

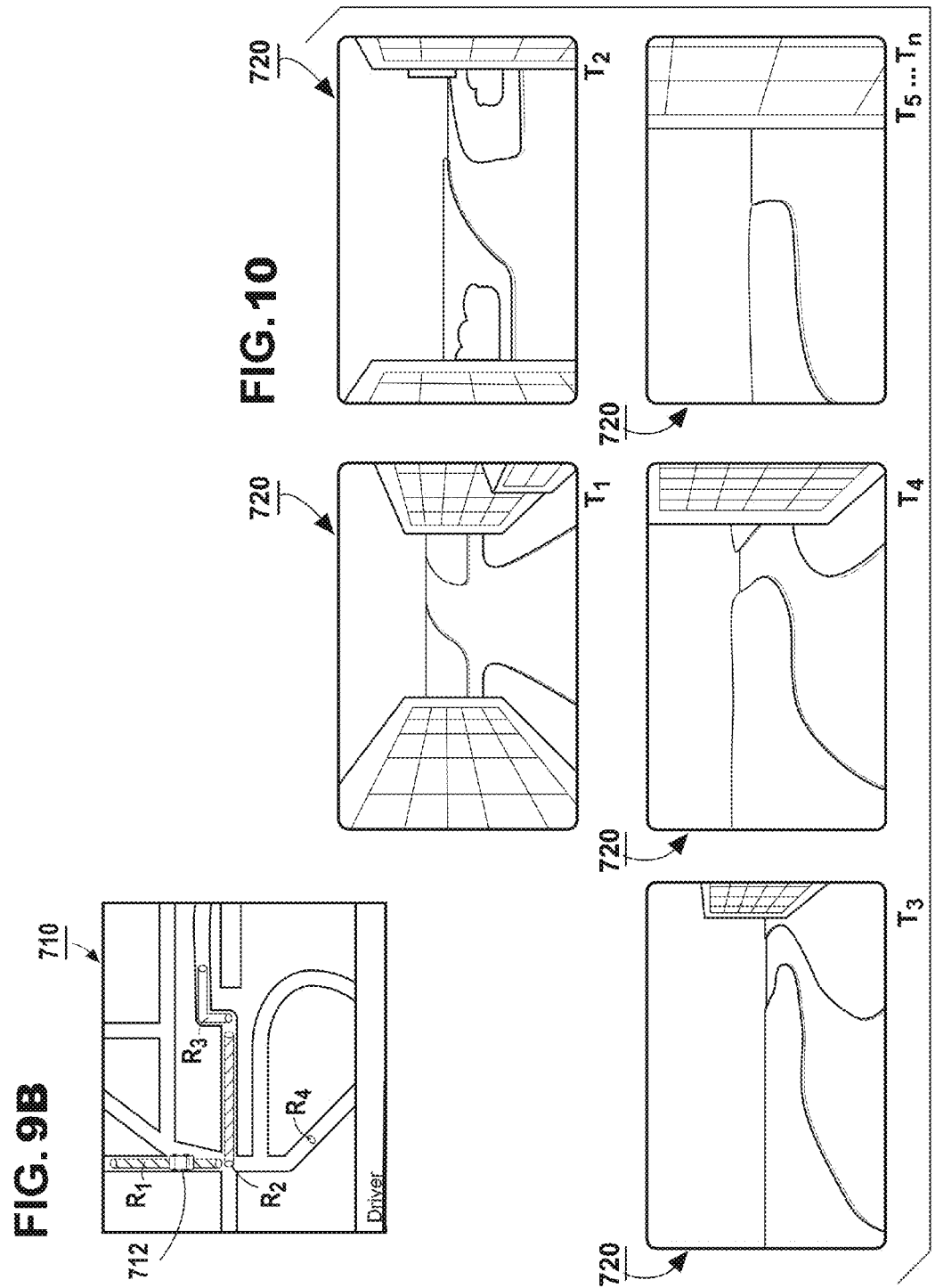

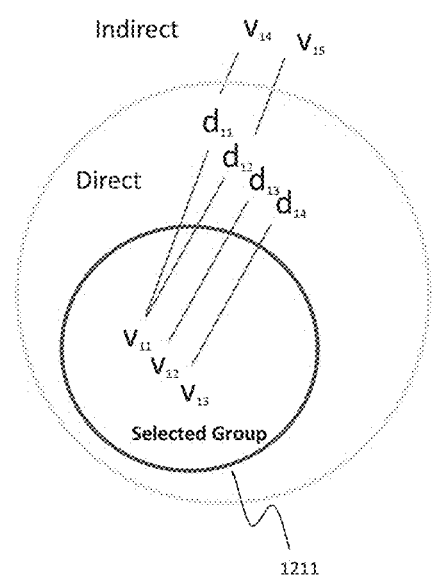 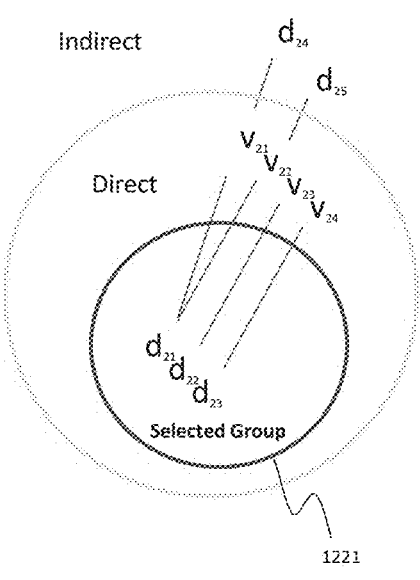
FIG. 12A                   FIG. 12B

INTERACTIVE TIMELINE INTERFACE AND DATA VISUALIZATION

DESCRIPTION OF RELATED ART

It is known to provide an on-board unit which uses technology such as GPS (Global Positioning System) to monitor a vehicle's positions and transmit wireless uploads to a central host system as well as manage of incoming data traffic without data losses or corruption and/or without database record locking. Such a unit may also upload vehicle status events such as engine fault events.

Conventional vehicle tracking systems and location based services are configured only for reporting on vehicle activity, i.e, vehicle centricity. Thus vehicle centric tracking systems, while they can report and log driver activity in specific vehicles, because drivers can change vehicles or use multiple vehicles, reporting is incomplete or inaccurate.

Furthermore, daily activity reports are a critical view for understanding what's happening in the field, but most activity reports contain rows of tiresome detail, turning what should be a simple story into a time consuming, intensive read.

SUMMARY

Described are systems and methods for driver and vehicle tracking and management configured to, inter alia, allows users of location based services to select information by either driver or vehicle, so that the user has the complete flexibility to organize the user account and all of the performance of the drivers and the vehicles by either vehicle or driver.

The present application discloses systems and methods for, inter alia, providing reports, alerts and dashboard metrics to reflect activity for a driver, creating groups to match fleet personnel to vehicle attributes, and keeping driver and vehicle assignment accurate with driver identification devices.

Also described are systems and methods for interactive graphic user displays that provide, inter alia, information dense intuitive interactive representations of vehicle activity over time. The systems and methods allow a user of location based services to, inter alia, easily scan activity for multiple vehicles at a time, quickly identify issues or exceptions and drill directly down to the details.

The present application discloses a computer system including at least one computer processor and computer readable storage medium or media including computer code and at least one storage device in which is stored GPS data for at least one vehicle. The system comprises a memory including a GPS event database including GPS event data transmitted from at least one GPS device, each GPS device associated with a vehicle, and stored over a period of time; one or more processors programmed at least to receive GPS event data transmitted from at least one GPS device, each GPS device associated with a vehicle, the GPS event data including location information for the vehicle; store the GPS event data in a GPS event database operatively coupled to at least one of the processors; and associate a driver to one or more vehicles; wherein the system is configured to provide information on each driver's activity derived from the GPS event data from one or more vehicle, including for a driver associated with a plurality of vehicles, and wherein the system is configured to generate an interactive display configured to display a visual representation of each driver's activity during a time period derived from the GPS event data for one or more vehicle, including for a driver associated with a plurality of vehicles.

Specifically, in an embodiment, the system is configured to associate a driver to a vehicle on a one-to-one basis for a particular period of time.

According to another embodiment, the displayed visual representation indicates a start time, an end time and duration of each driver's activity for the time period.

According to another embodiment, the displayed visual representation comprises a plurality of segments, each of the segments represents a segment time period during which the vehicle is under a same vehicle status based on the driver's activity.

According to another embodiment, the vehicle status of each driver's activity includes stop, idling and travel, and the displayed visual representation indicates different vehicle status with different graphic patterns.

According to another embodiment, when a segment is selected based on a user's selection, the system is configured to provide segment information for the selected segment.

According to another embodiment, the segment information includes a segment start time, a segment end time, segment duration and vehicle location during the segment time period.

According to another embodiment, the one or more processors are further programmed at least to store, in a memory operatively coupled to at least one of the processors, a record of a route from an origin location to a destination location during the time period represented by the displayed visual representation; and record the route for provision to a computer configured to display the route as a map.

According to another embodiment, the one or more processors are further programmed at least to store, in a memory operatively coupled to at least one of the processors, a record of a segment route from an origin segment location to a destination segment location during the segment time period; and record the segment route for provision to a computer configured to display the segment route as a map.

According to another embodiment, the GPS device is associated with a driver via input from a driver identification device.

According to another embodiment, the driver identification device is a Driver Keyfob, a Driver Assignment Module, a Driver Mobile Application, a Third Party Integrations, or a GPS device.

According to another embodiment, wherein the system is further configured to generate a data structure configured to associate a driver to one or more vehicles or a vehicle to one or more drivers.

According to another embodiment, the data structure is a lookup table (LUT).

Embodiments also comprise a method comprising, in at least one computer and a computer readable storage medium or media including computer code: receiving GPS event data transmitted from at least one GPS device, each GPS device associated with a vehicle, the GPS event data including location information for the vehicle; storing the GPS event data in a GPS event database operatively coupled to at least one of the processors; and associating a driver to one or more vehicles; providing information on each driver's activity derived from the GPS event data from one or more vehicle, including for a driver associated with a plurality of vehicles, and generating an interactive display configured display a visual representation of each driver's activity during a particular time period derived from the GPS event data from one or more vehicle, including for a driver associated with a plurality of vehicles.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIG. 4A-4C illustrate flowcharts depicting exemplary processes.

FIGS. 6A-6C show an exemplary flow showing GPS event data analysis.

FIG. 7 depicts a table including activation identifications for industry segments and geographical areas.

FIGS. 9A-9D depicts an exemplary display representations for mapping integration FIG. 10 depicts an exemplary display representation for a sequence of ground level representations of a route.

FIGS. 12A-12C depict a graph of examples of selected groups.

DETAILED DESCRIPTION OF THE EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments. The invention disclosed herein may be practiced using programmable digital computers and networks therefor.

Figure 1A:
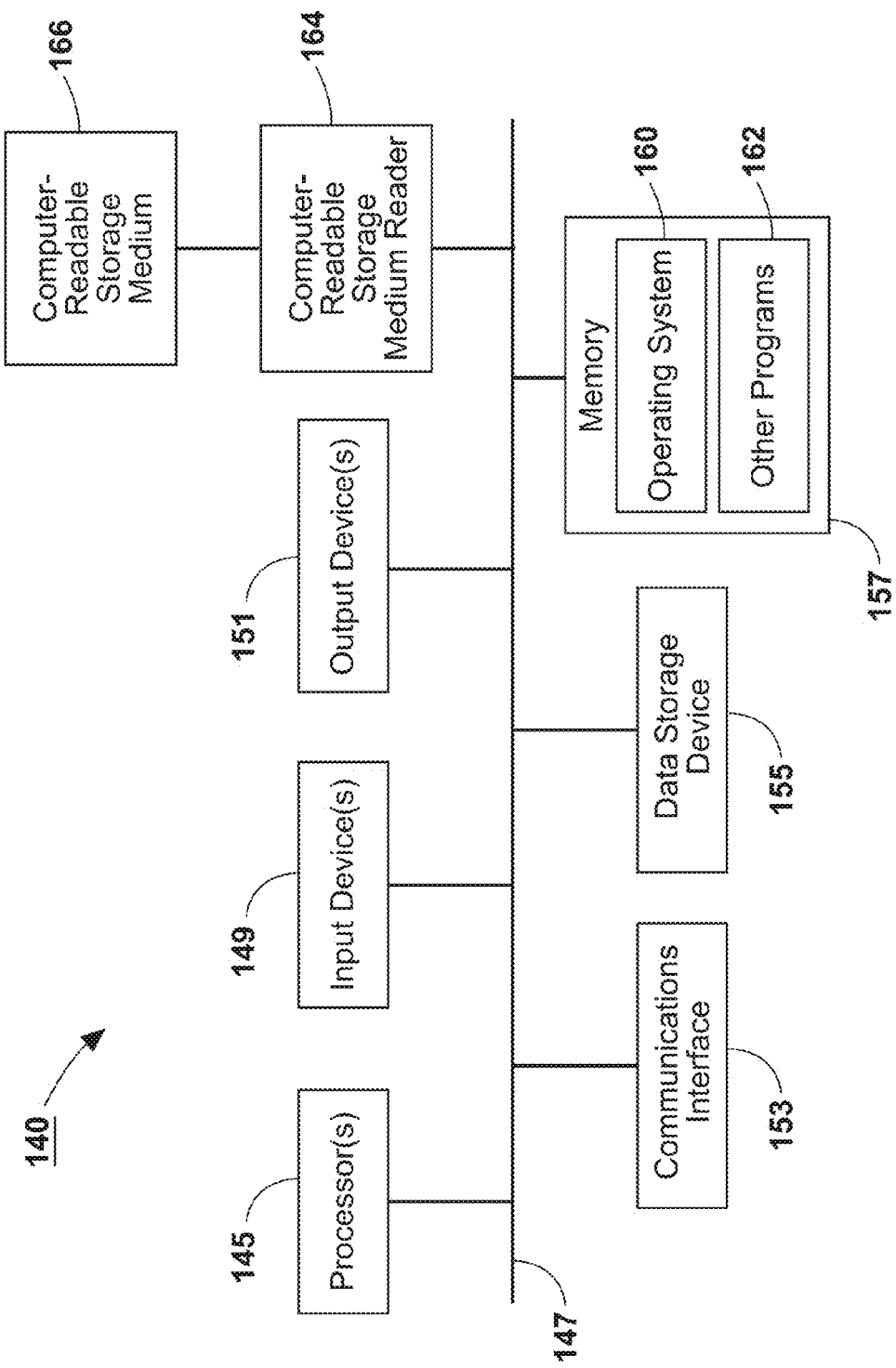
FIGS. 1A-1D are block diagrams of a representative computer system.
Figure 1B:
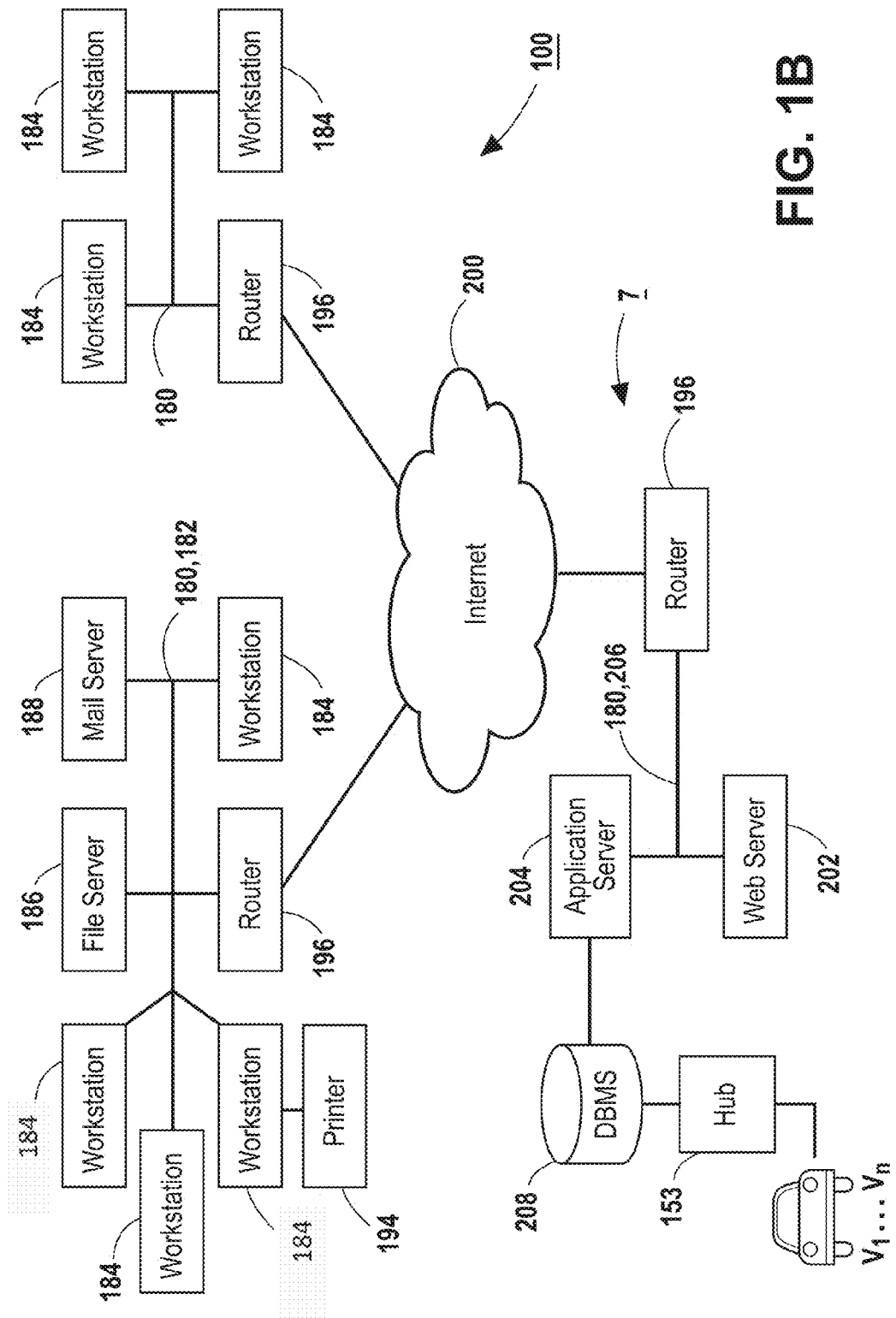

As shown in FIGS. 1A-1B, disclosed is a system 100, which includes a computer 140 containing a processor 145, memory 157 and other components typically present in general purpose computers.

FIG. 1A is a block diagram of a representative computer. The computer system 140 includes at least one processor 145, such as an Intel Core™ or Xeon™ series microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

Memory 157 stores information accessible by processor 145, including instructions that may be executed by the processor 145. It also includes data that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 145 may be any well-known processor, such as processors from Intel Corporation or AMD. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows 7®), Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified by processor 145 in accordance with the instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Two or more computer systems 140 may be connected, e.g., in one or more networks, via, e.g., their respective communications interfaces 155 and/or network interfaces (not depicted).

A computer system network is shown in FIG. 1B. A network 182 may, for example, connect one or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 184 on a network 180. A workstation 184 sends data including a request for a file to the file server 186 via the network 180 and the file server 186 may respond by sending the data from the file back to the requesting workstation 184.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

In one aspect, a computer is a server communicating with one or mote client computers 184. For example, the computer may be a web server or a hub and data storage service. Each client computer may be configured similarly to the server, with a processor, memory and instructions 240. Each client computer 184 may be a personal computer, intended for use by a person, having all the internal components normally found in a personal computer such as a central processing unit (CPU), display device 151 (for example, a monitor having a screen, a projector, a touch-screen, a small LCD screen, a television, or another device such as an electrical device that is operable to display information processed by the processor), CD-ROM, hard-drive, user input 149 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 184 may comprise a full-sized personal computer, the system and method may also be used in connection with mobile devices capable of wirelessly exchanging data with a server over a network such as the Internet. For example, client computer 184 may be a wireless-enabled PDA such as an iPhone, and Android enabled smart phone, a Blackberry phone, or another Internet-capable cellular phone. In either regard, the user may input information using a small keyboard (in the case of a Blackberry phone), a keypad (in the case of a typical cell phone), a touch screen (in the case of a PDA and/or smart phone) or any other means of user input.

Client computers 184, may include a component, such as circuits, to determine the geographic location of the device. For example, mobile device may include a GPS receiver. By way of further example, the component may include software for determining the position of the device based on other signals received at the mobile device, such as signals received at a cell phone's antenna from one or more cell phone towers if the mobile device is a cell phone.

Servers 186, 188, 202, 204 and client computers 184 are capable of direct and indirect communication, such as over a network 180, 200. Although only a few computers are depicted in FIGS. 1A-1B, it should be appreciated that a typical system can include a large number of connected computers, with each different computer being at a different node of the network 200. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 184 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network.

For example in one embodiment, an on-board GPS unit uploads information (e.g. via a hub 153) about a vehicle v1, v2 ... vn to a central host system 208. Information about the vehicle derived from the GPS information can be presented to a user on a display device 151, for example, as a layout shown in FIG. 2.

Figure 2:
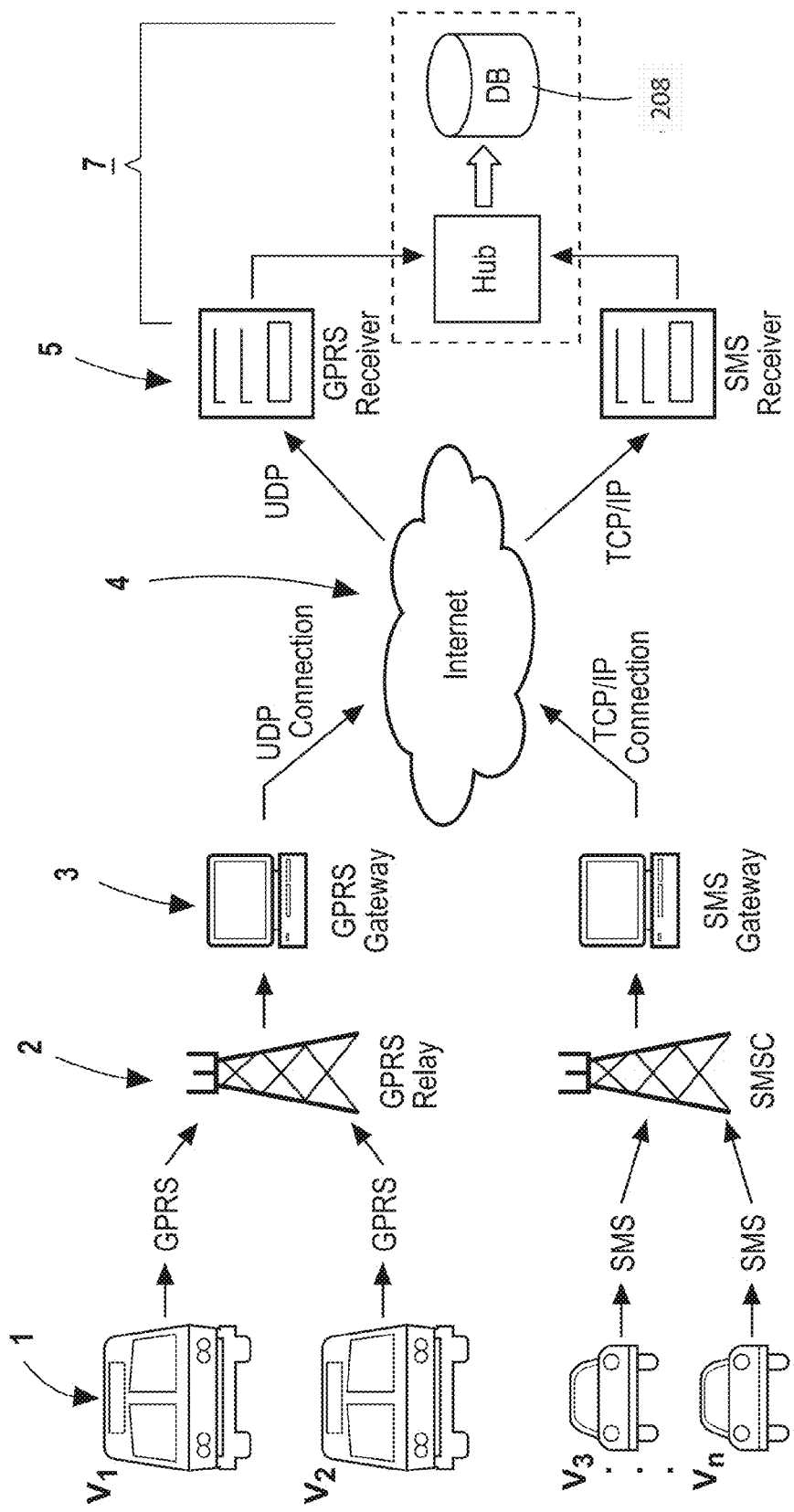
FIG. 2 depicts a representative GPS system.

In one embodiment, the system is programmed at least to receive GPS even data recorded by a GPS (Global Positioning System) device, for example, using an on-board unit which uses technology such as GPS to monitor a vehicle's positions and transmit wireless uploads to a central host system. Referring to FIG. 2 a vehicle tracking system comprises on-board units 1 in vehicles v1, v2, v3. . . vn, which communicate wirelessly via mobile networks 2 to gateways 3. In this diagram two wireless protocols are indicated, namely GPRS and SMS. However there are typically a variety of additional protocols. The gateways 3 communicate using protocols such as UDP and TCP via the Internet 4 with a host system 7 having receivers 5 which are operating system services, and a data storage system 6. The incoming data is written from the receivers 5 to the data storage system 6, which includes a communication hub 153 and database 208. GB2345824 and U.S. Pat. No. 7,388,518 describes such systems and methods therefor, the entirety of each of which are incorporated by reference herein.

Figure 1C:
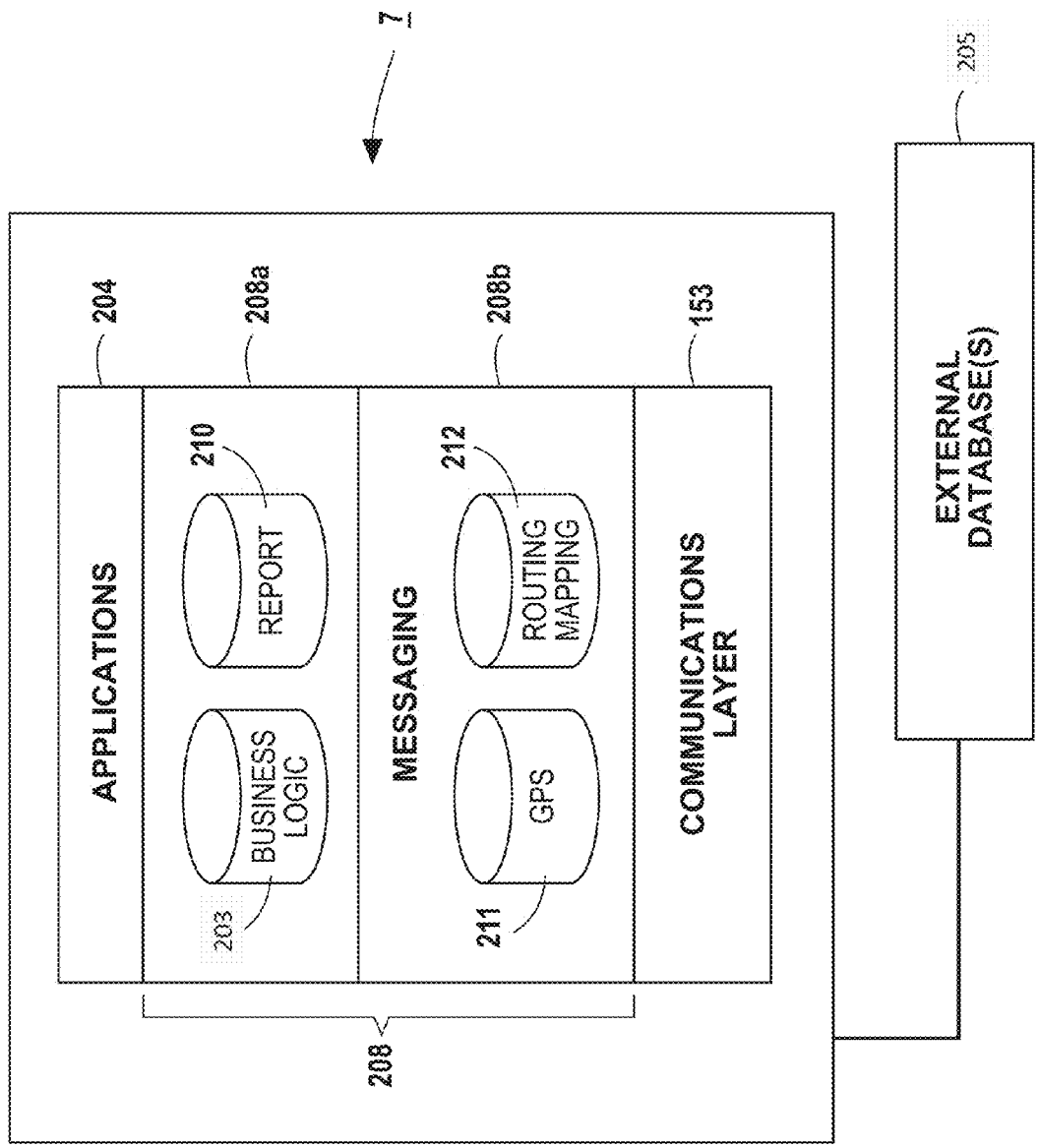

FIG. 1C is a block diagram of a host system 7 showing an exemplary system configuration for a host system 7. As shown therein, a communications layer 153 is operable to receive incoming GPS data and write data from the receivers 5 to the data storage system 208. The data storage system can be divided into any number of databases and logical layers for data analysis and storage. For example, a messaging layer 208b can be configured to store GPS event data from GPS on-board units 1 in a GPS event database 211. A separated routing database 212 could be provided to store mapping and route data based on, inter alia, GPS data to store routes traveled by vehicles. Another database layer 208a can include a business logic database 203 and a reporting database 210 to store rules for analysis of data and reports analyzed data respectively.

A database layer 208b can be operably connected to other databases, for example external databases 205. For example the system can be operatively connected to at least one speed database including speed data or traffic data. For instance, one or more speed databases can include speed data comprising, for example, a record of a posted speed limit for a route and/or a record of an average traffic/road speed for a route.

For example, an external database 205 can provide traffic data which shows congestion along routes to be traveled by a vehicle, which can be used in conjunction with GPS data 211 and business logic 203 to reroute vehicles or create reports as to congested routes.

In another example an external database 205 can provide speed and or traffic data which records data for posted speed limits along routes, or collects and stores data for average traffic speeds along routes. Exemplary databases include, for example, the TeleAtlas™ speed limit data, or Inrix™ average speed data. This data can be used in conjunction with GPS data 211 and business logic 203 to show speed violations of vehicles and drivers, compare average speeds of a driver's and/or a fleet's average traffic/road speed, and track performance and create alerts as described herein.

An applications layer, such as an application server 204, can be used to run applications processing, which may include, for example, sending data to and/or receiving data from one or more other data sources such as client workstations 184, as described above. For example the application layer can be used to provide a graphic user interface 151 of a client workstation 184, 194 a user-interactive interface.

In one embodiment, a system is configured to receive, store, and process GPS data to provide to a graphic user interface of a client a user-interactive interface for tracking and reporting on vehicles, drivers and vehicle fleets. When a driver is detected as being assigned to a vehicle, the system is configured to tracks the assignment change by associating the driver with the assigned vehicle via input from a driver identification device. A driver identification device comprises devices linking a driver to a vehicle's vehicle tracking device—a GPS device, for the duration the driver is using and assigned to that vehicle. Examples of a driver identification device include, for example, a driver keyfob, a driver assignment module, a driver mobile application, a third party integrations, or a GPS device, etc. For example, when a driver physically places his or her assigned keyfob device to a vehicle's keyfob reader, the relevant driver identification information may be associated with the vehicle identification information via the driver keyfob by attaching the driver's unique identifier to the tracked vehicles in a one-to-one relationship. Alternatively, by using driver assignment module in the system, or driver mobile application, a driver may manually assign a driver ID to a vehicle ID. The driver ID can be input directly into a location device such as GPS device such that it adds a Driver ID field to data packets used in GPS event transmissions. Additionally or in the alternative, Driver ID information giving time in and time out duration a vehicle can be transmitted to a central location and the data tagged or populated to GPS event data.

In one embodiment, the assignment information may be transmitted to a data storage system as a portion of the GPS event data, and stored in a database for a data storage system. The assignment information may be stored using an assignment lookup table. As shown in Table 1, the assignment lookup table includes assignment information of each driver D1, D2 . . . Dn, such as driver ID, vehicle ID, and timestamp information.

For example, as shown in the first row of the lookup table, driver D1 is assigned to vehicle Van 1 from 02:00:00 on January 1 to 10:00:00 on January 1. Similarly, assignment information of drivers D2, D3 . . . Dn may be obtained and stored in the data storage system.

TABLE 1

| Driver ID | Vehicle ID | Start Time | End Time |
|---|---|---|---|
| D1 | Van 1 | 02:00:00, Jan. 1 | 10:00:00, Jan. 1 |
| D2 | Van 2 | 04:00:00, Jan. 1 | 08:00:00, Jan. 1 |
| D3 | Van 3 | 10:00:00, Jan. 2 | 18:00:00, Jan. 2 |
| . | . | . | . |
| . | . | . | . |
| . | . | . | . |
| Dn | Van n | 18:00:00, Feb. 4 | 02:00:00, Feb. 5 |

In the embodiment, the lookup table associates each driver and vehicle such that one driver can only be assigned to one vehicle at any given point in time, and a vehicle can only have one driver at any given point in time. Therefore, based on this one-to-one relation between driver and vehicle at specific time durations, the system can accurately create a single representation of travel and stop activity from GPS event data or other location data for each driver that is vehicle independent, that is to say, regardless of how many vehicles the driver is assigned to or how many drivers a given vehicle has. For example, location information can be obtained from another database which includes vehicle data and location data, for example from a GPS event database including GPS event data or from data structures derived therefrom that roll up or summarize the data.

Accordingly, in an embodiment, for each driver and vehicle, GPS event data is stored for over an operation period. For example, the data can be stored and processed to show event data for at least one driver and vehicle for an operation period of a workday, a week, a month, a quarter, a year, the life of a service contract, or any desirable time period. The GPS event data can then be analyzed to derive a plurality of operational metrics for each vehicle. Exemplary operational metrics that can be derived from GPS data include: engine on/off, vehicle mileage, idling, number of stops, distance travelled, and speed (including high speed and average speed). For example, an on-board GPS device can be configured to be operational to transmit when a vehicle engine is on, thus engine on/off time can be derived. Idling (stopped while engine running) and speeding (distance/time), as well as vehicle mileage can also be derived from tracking via GPS. This data in turn can be used to derive a number of other operational metrics, including vehicle activity over a predetermined time period, vehicle operational reports, employee performance (e.g., working hours, deliveries per day), driver behavior (e.g.: speeding violations, idling over limits); and fleet performance (e.g., metrics based on data above derived for multiple vehicles). Accordingly any number of operational metrics can be derived from GPS data, either alone or in conjunction with data from other databases, including number of stops per vehicle, performance against a criterion, employee performance; driver behavior; and fleet performance, speeding severity, a speeding violation, average vehicle speed, vehicle speed versus a posted speed limit, vehicle speed versus a speed threshold, and an average road speed for a fleet or driver speed for a route versus average road/traffic speed for a route. A graphic user interface can be configured to display including a representation of at least one operational metric for each of a plurality of vehicles.

Figure 3A:
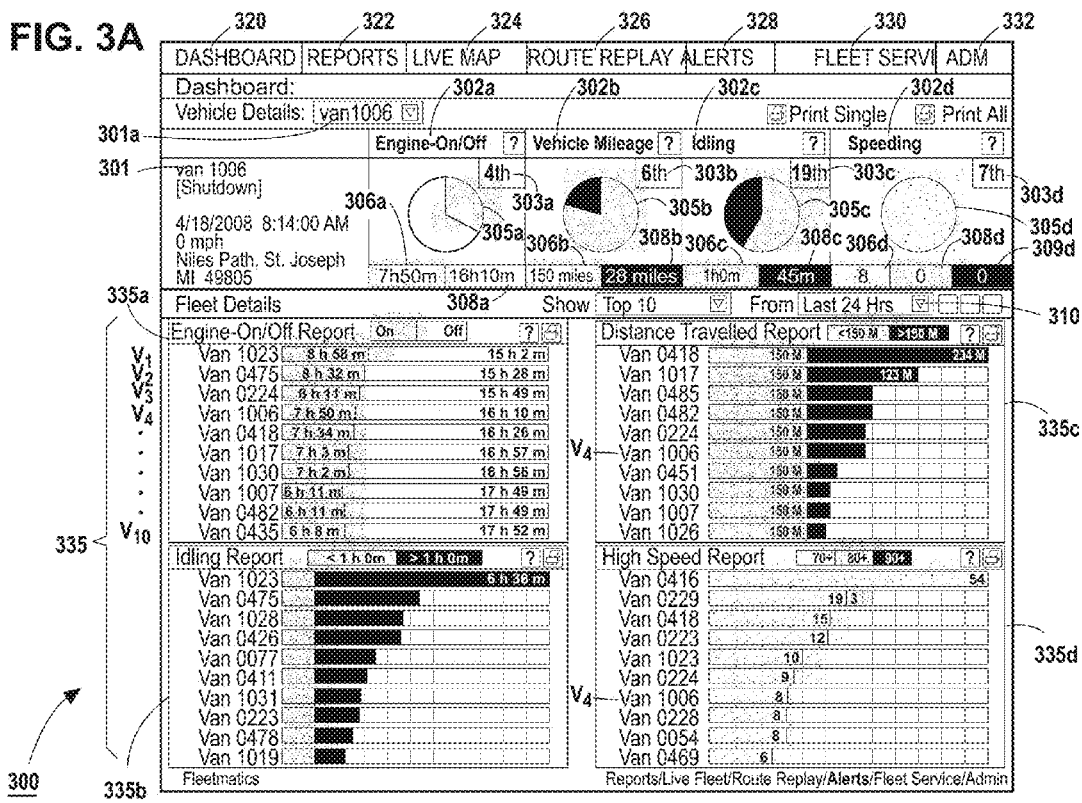
FIGS. 3A-3W depict exemplary representations for graphic user interfaces.
Figure 3B:
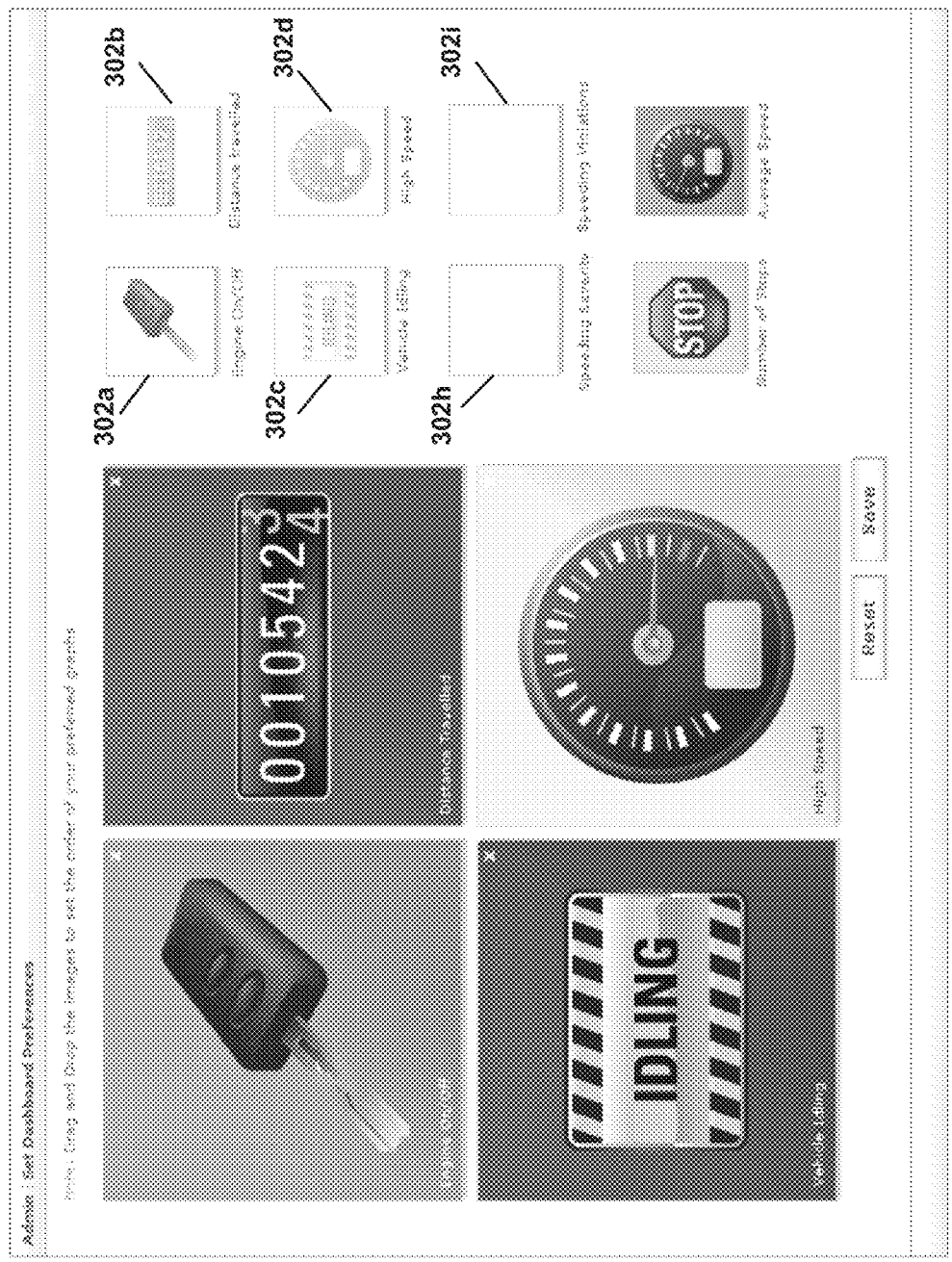
Figure 3C:
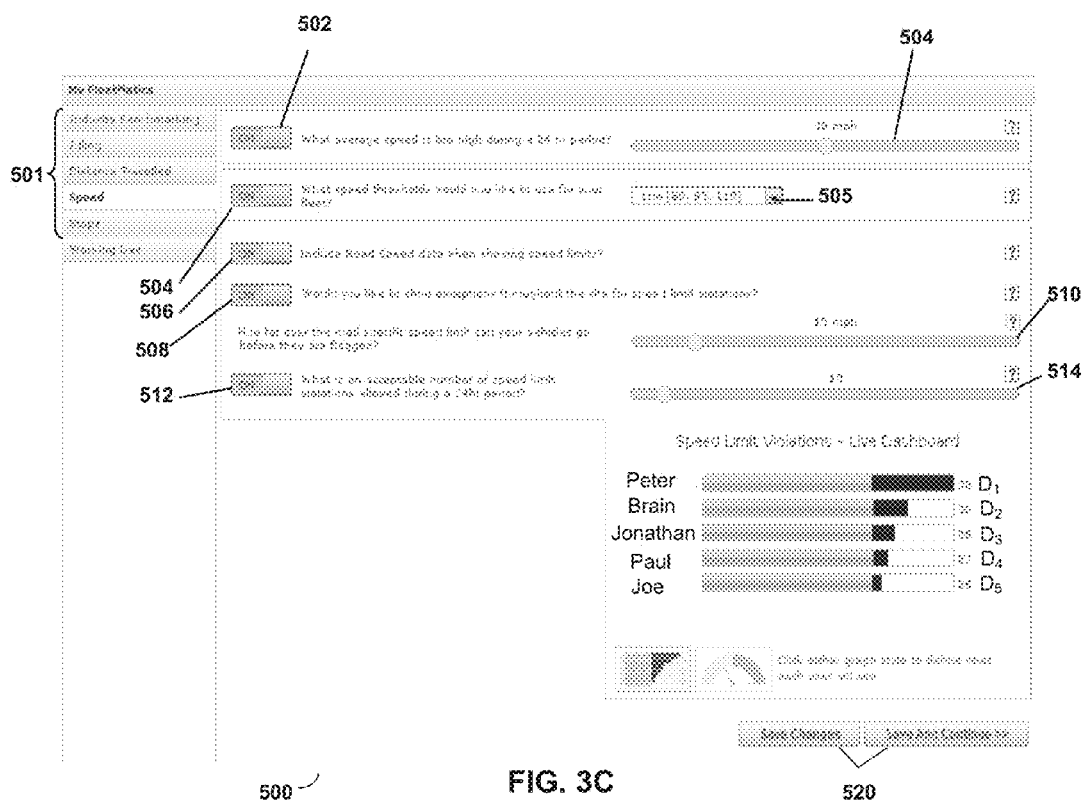
Figure 3D:
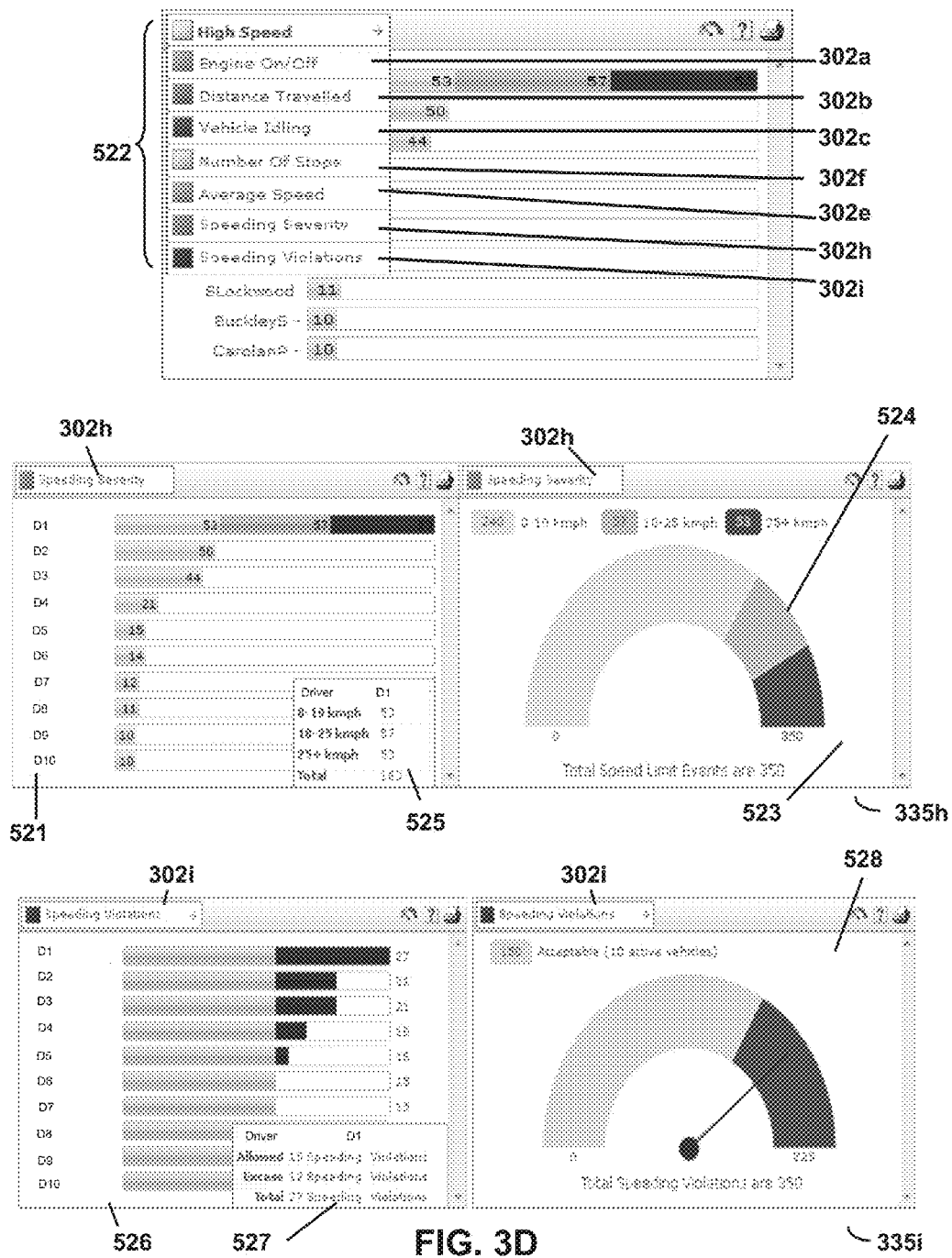
Figure 3E:
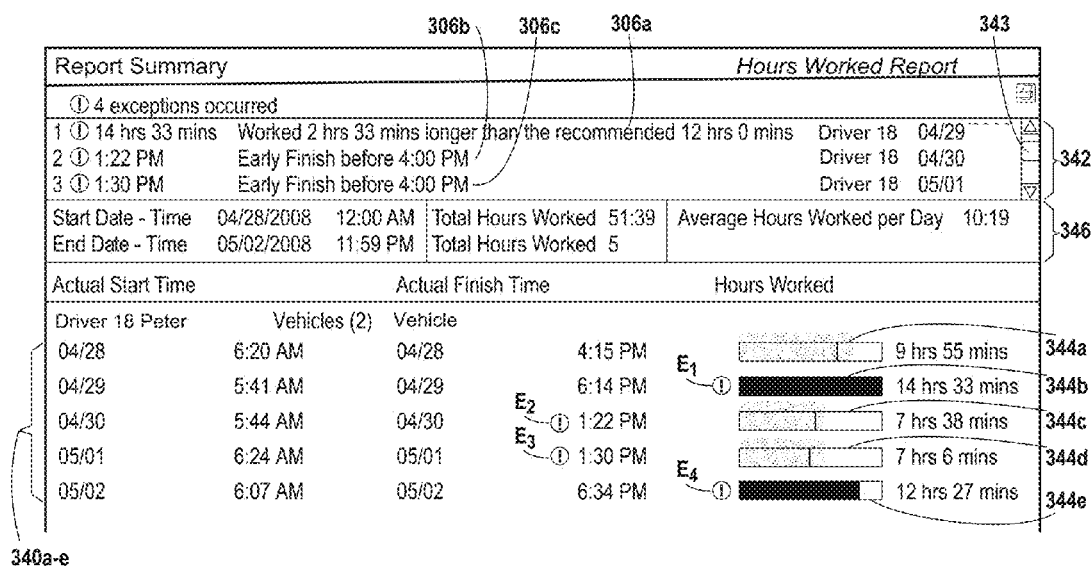
Figure 3F:
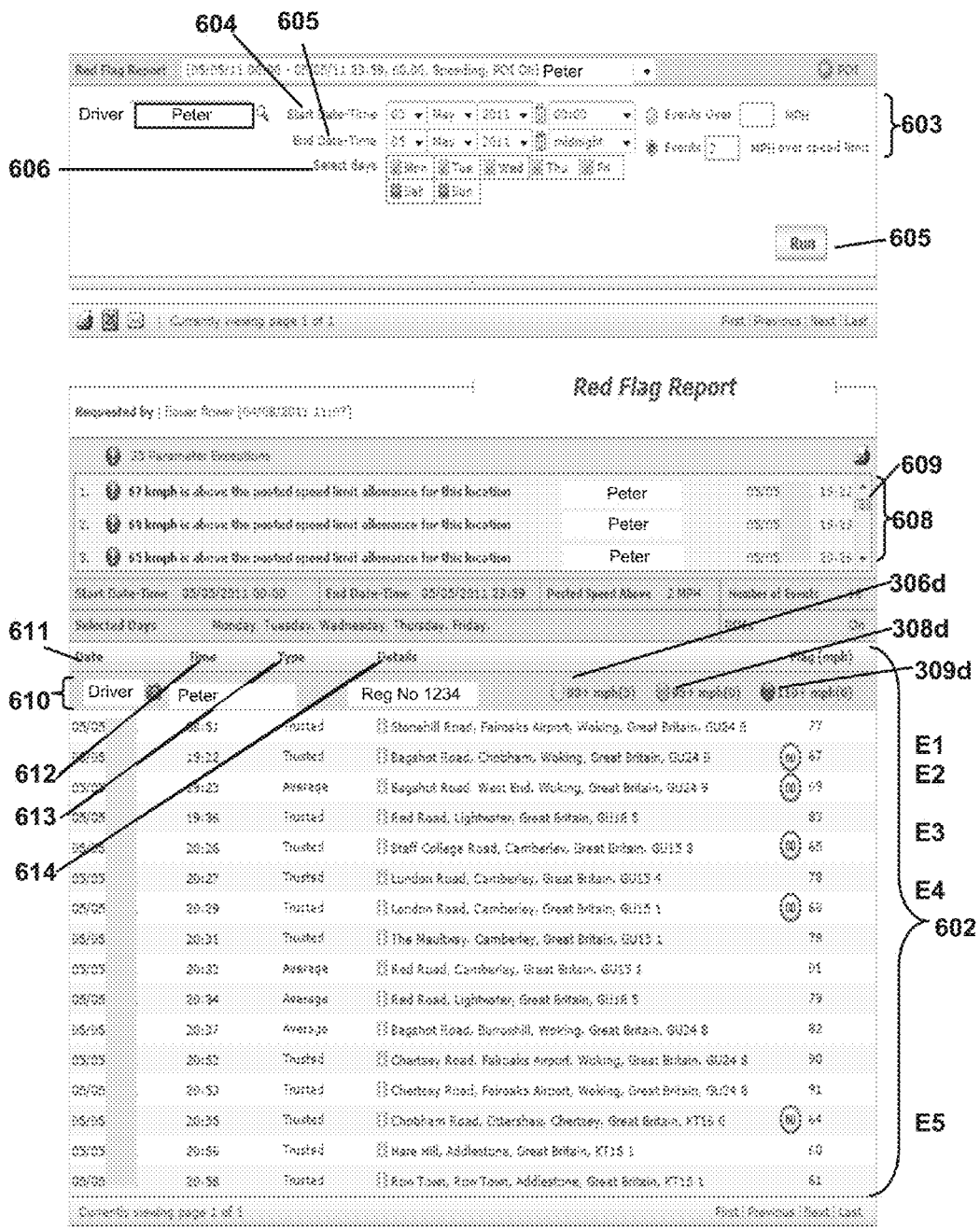
Figure 3G:
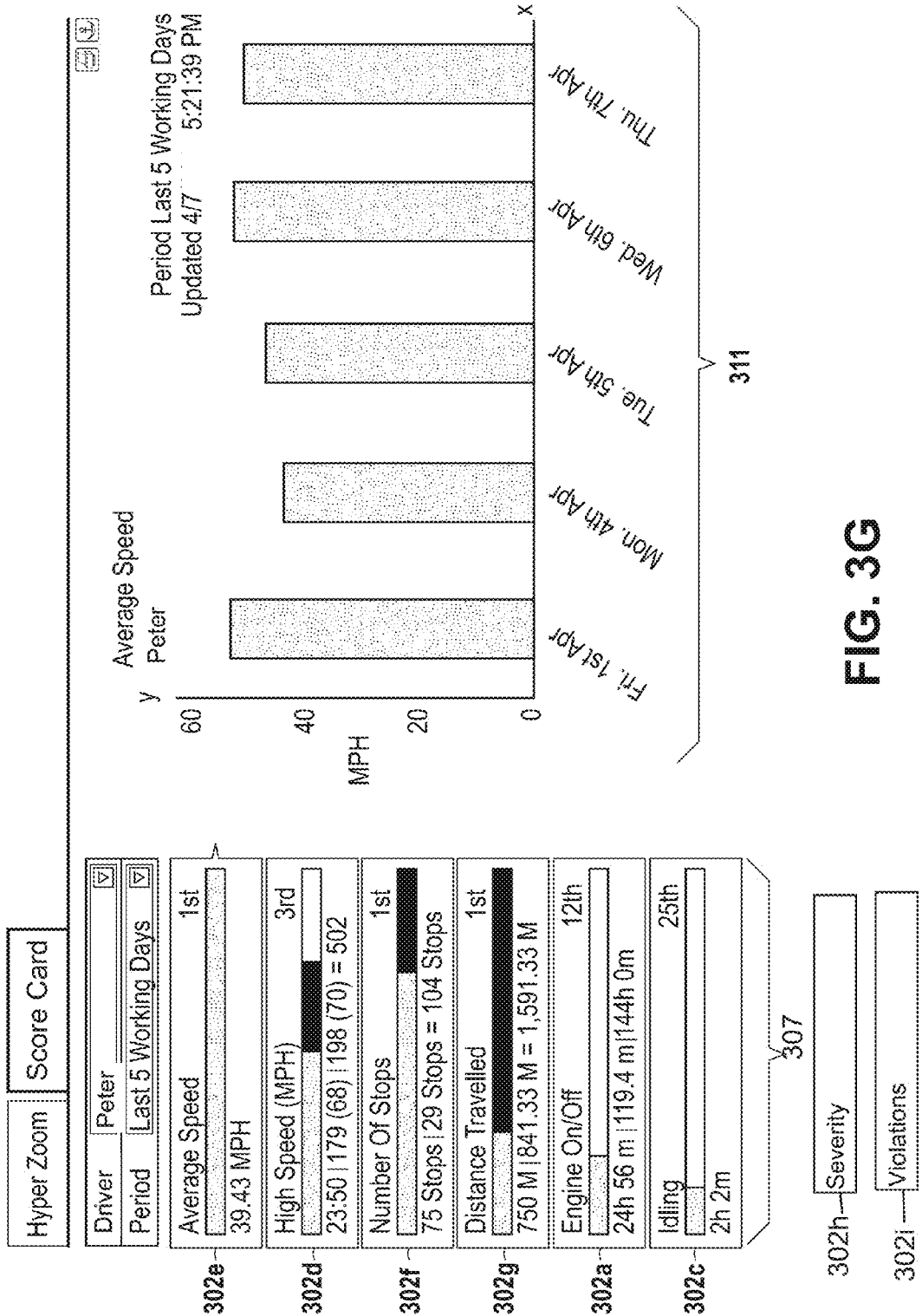
Figure 3H:
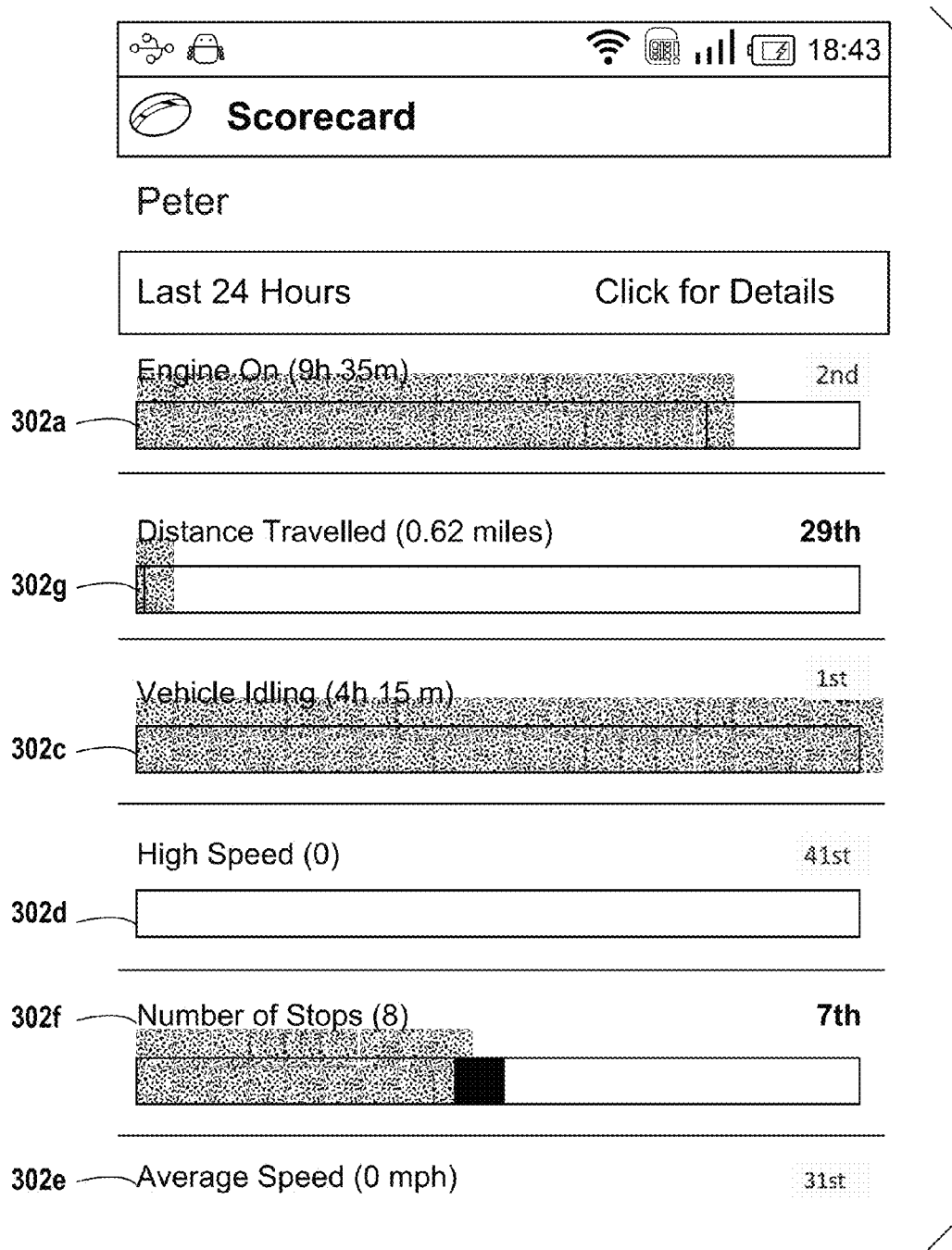
Figure 31:
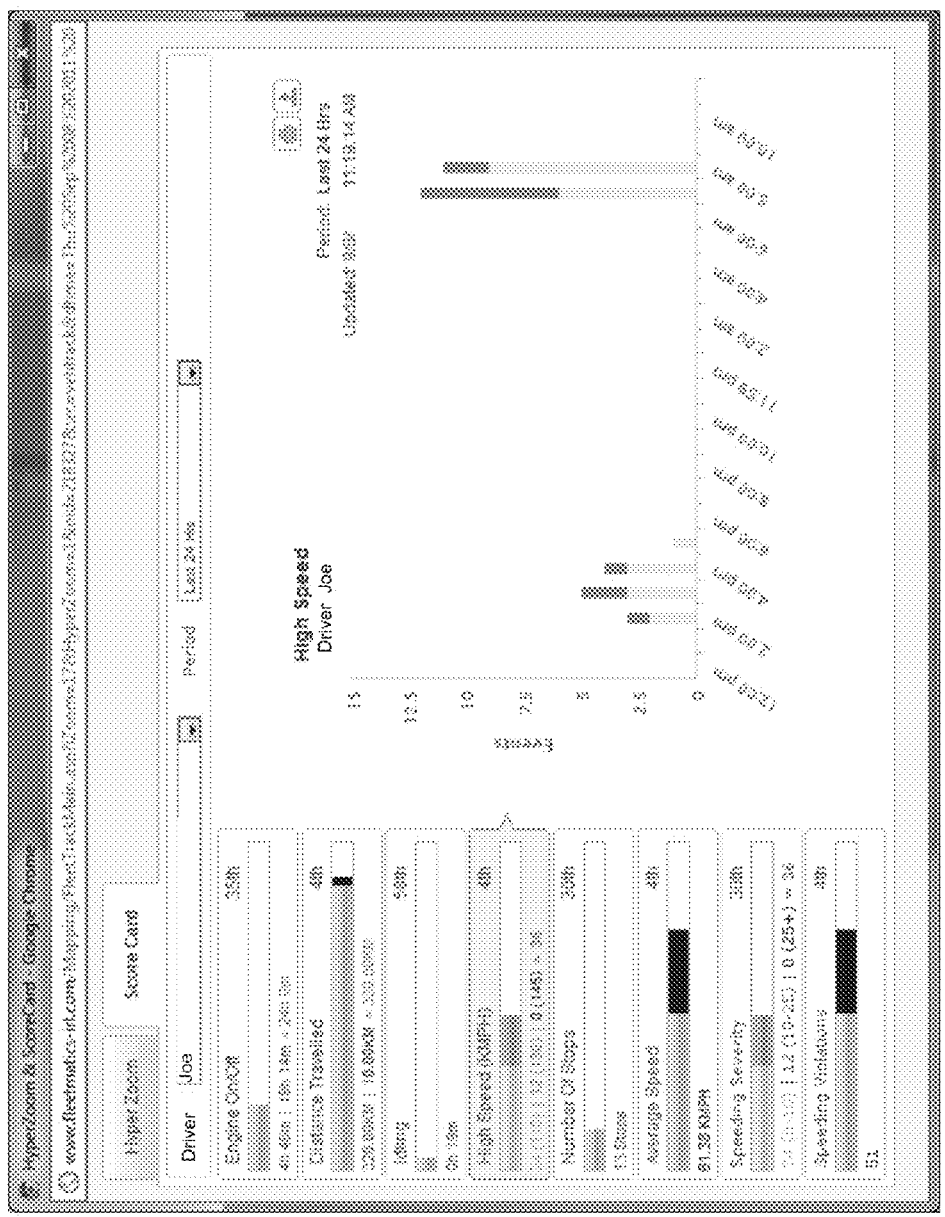
Figure 3J:
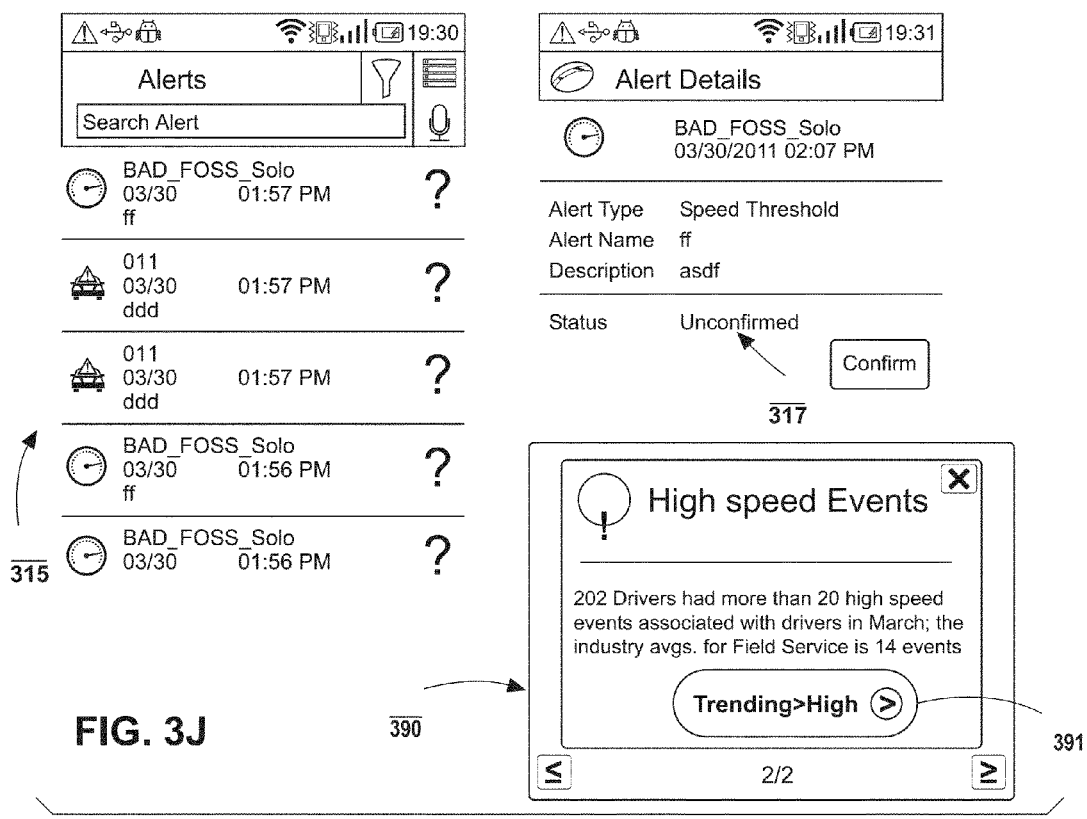
Figure 3K:
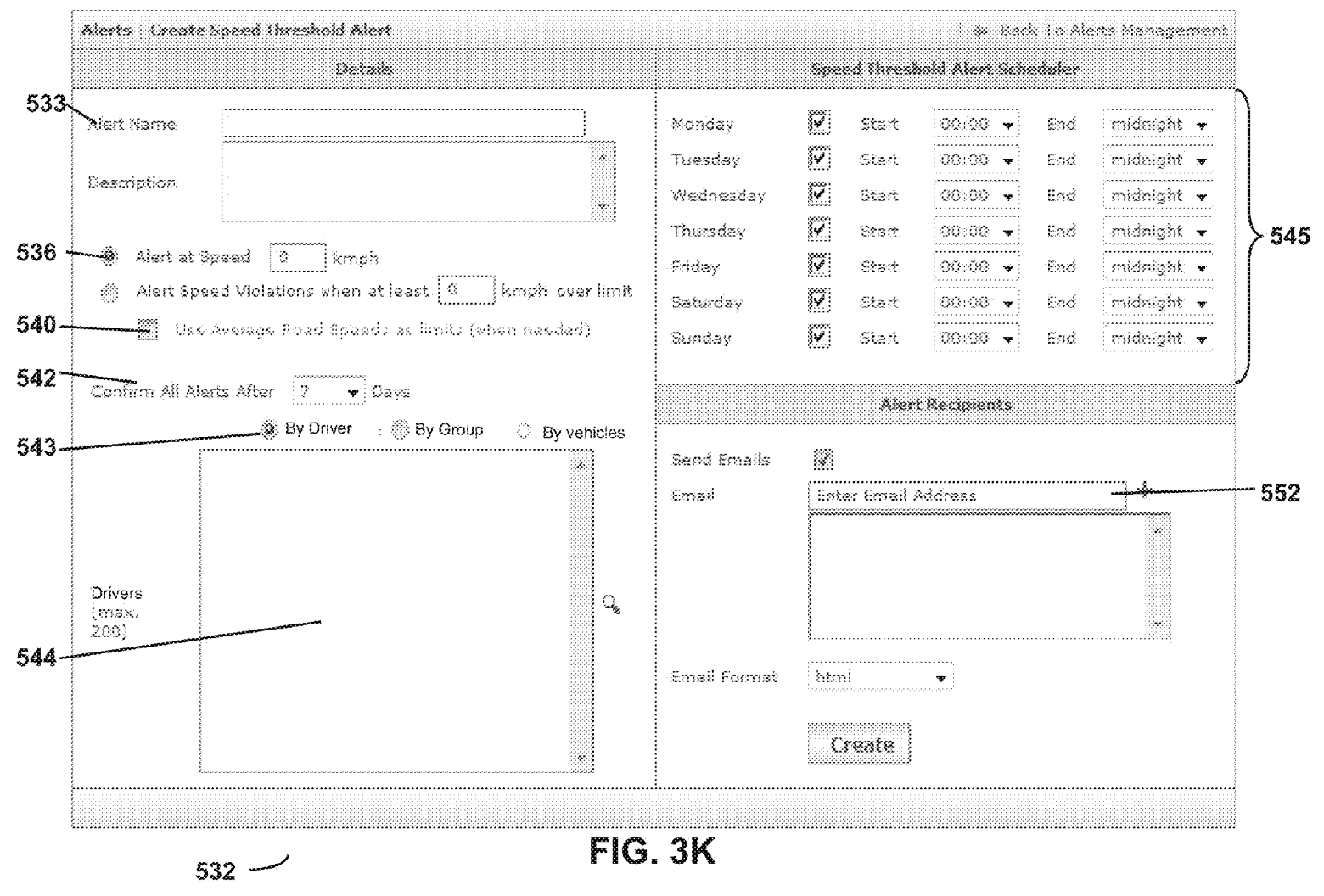
Figure 3L:
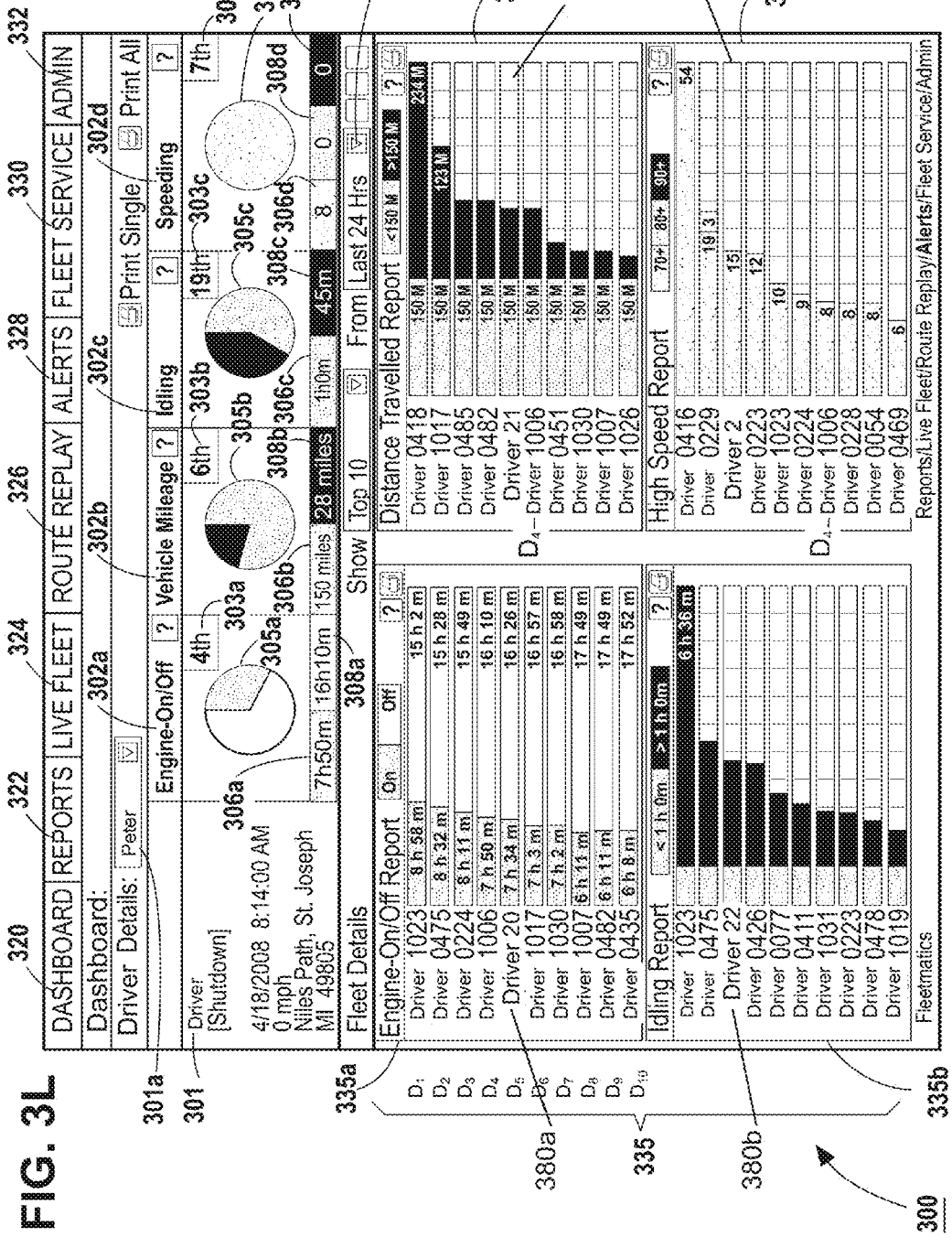
Figure 3N:
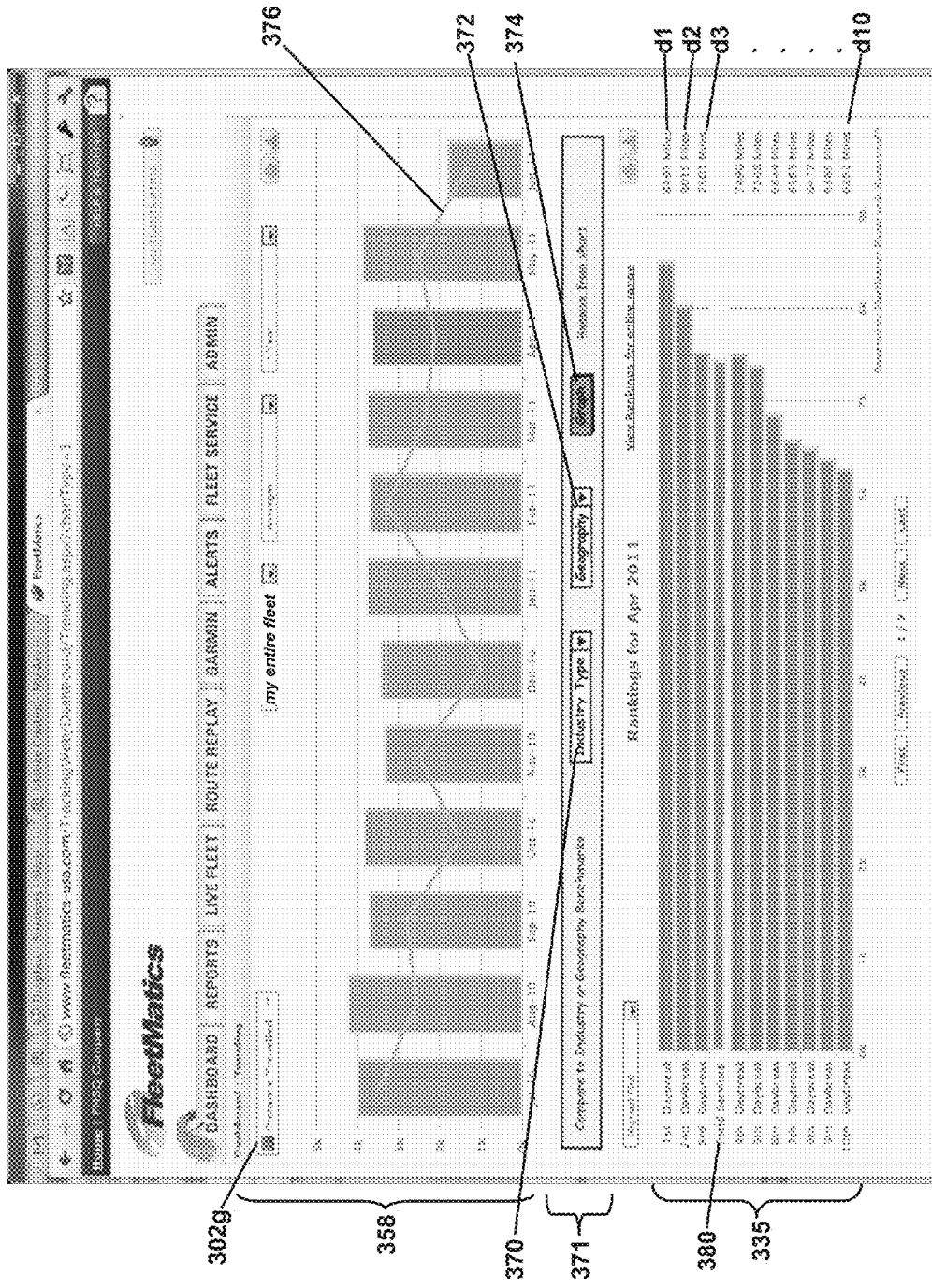
Figure 3P:
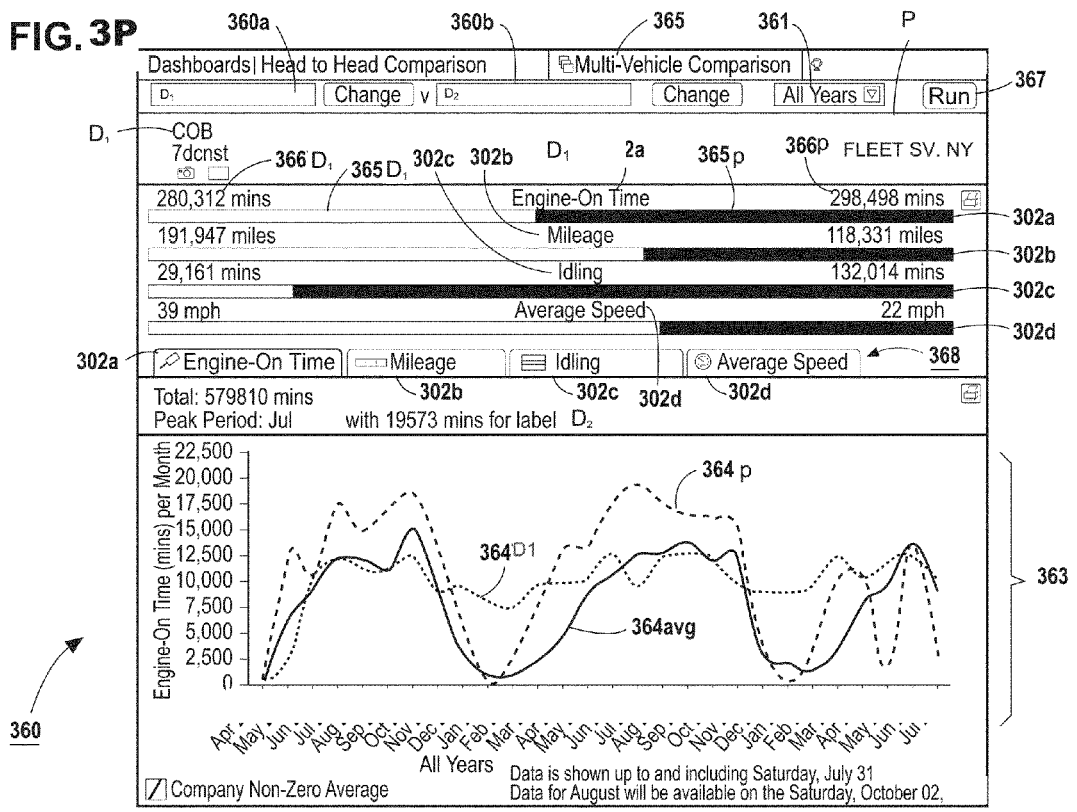
Figure 3Q:
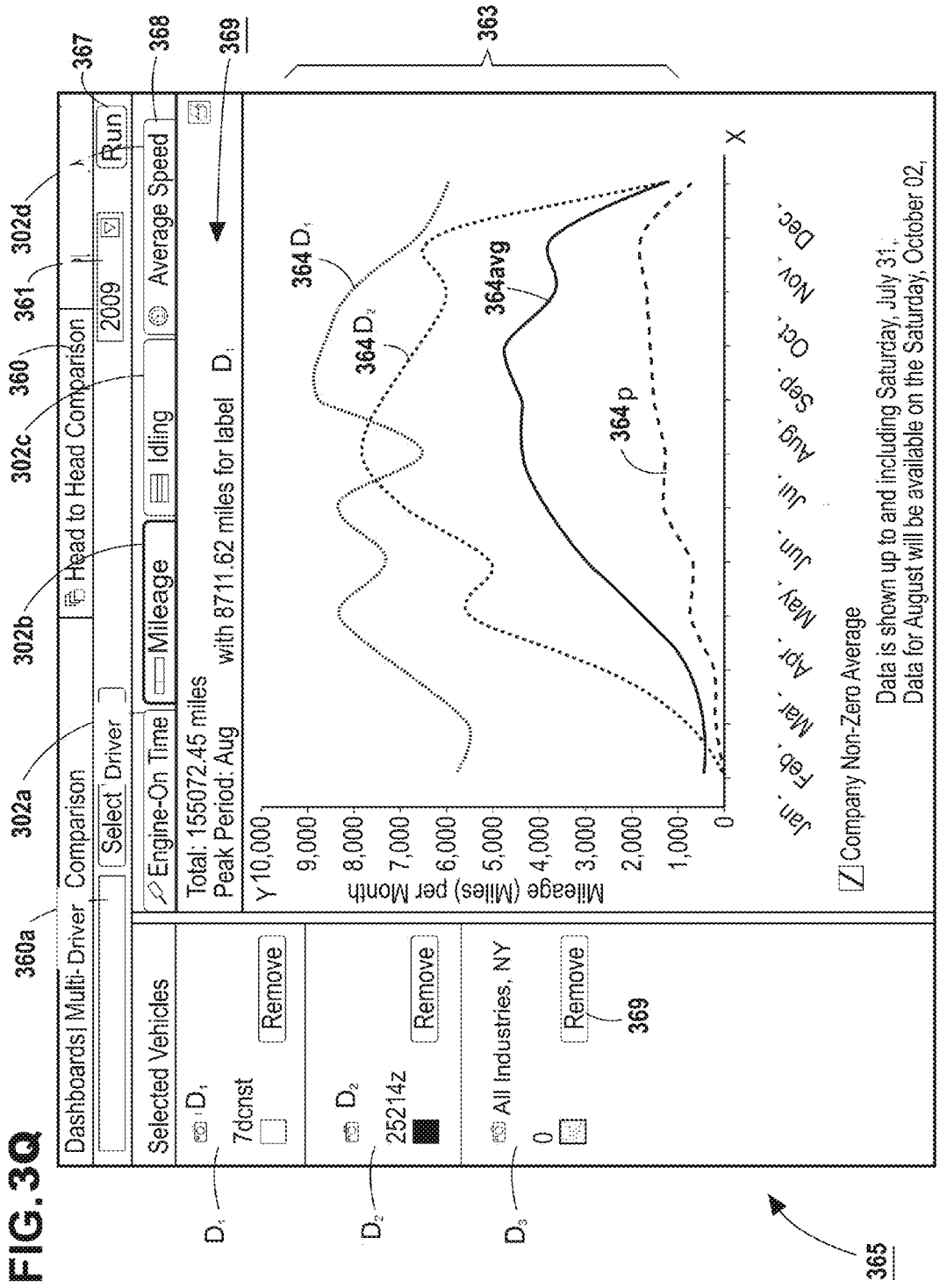
Figure 3S:
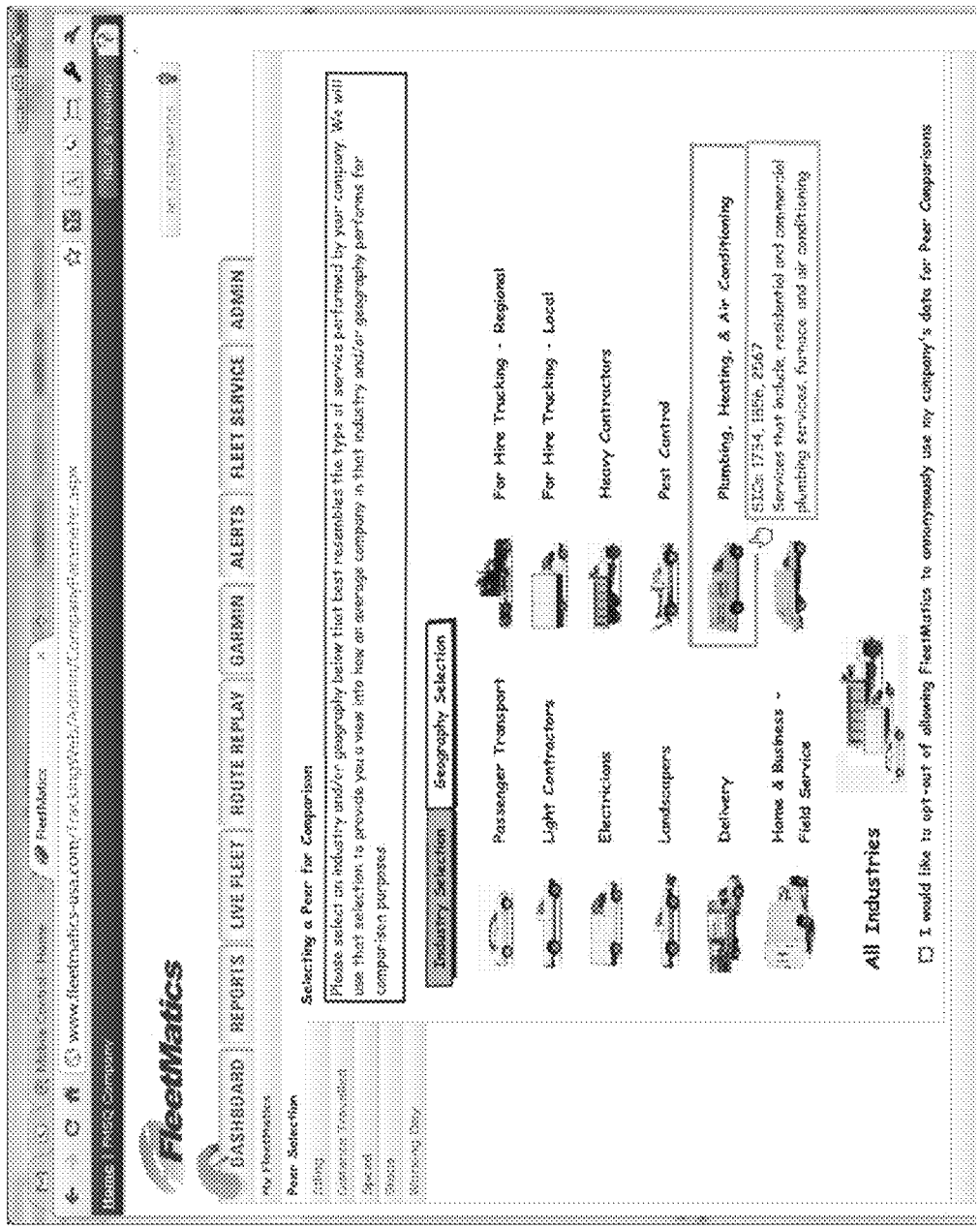
Figure 3T:
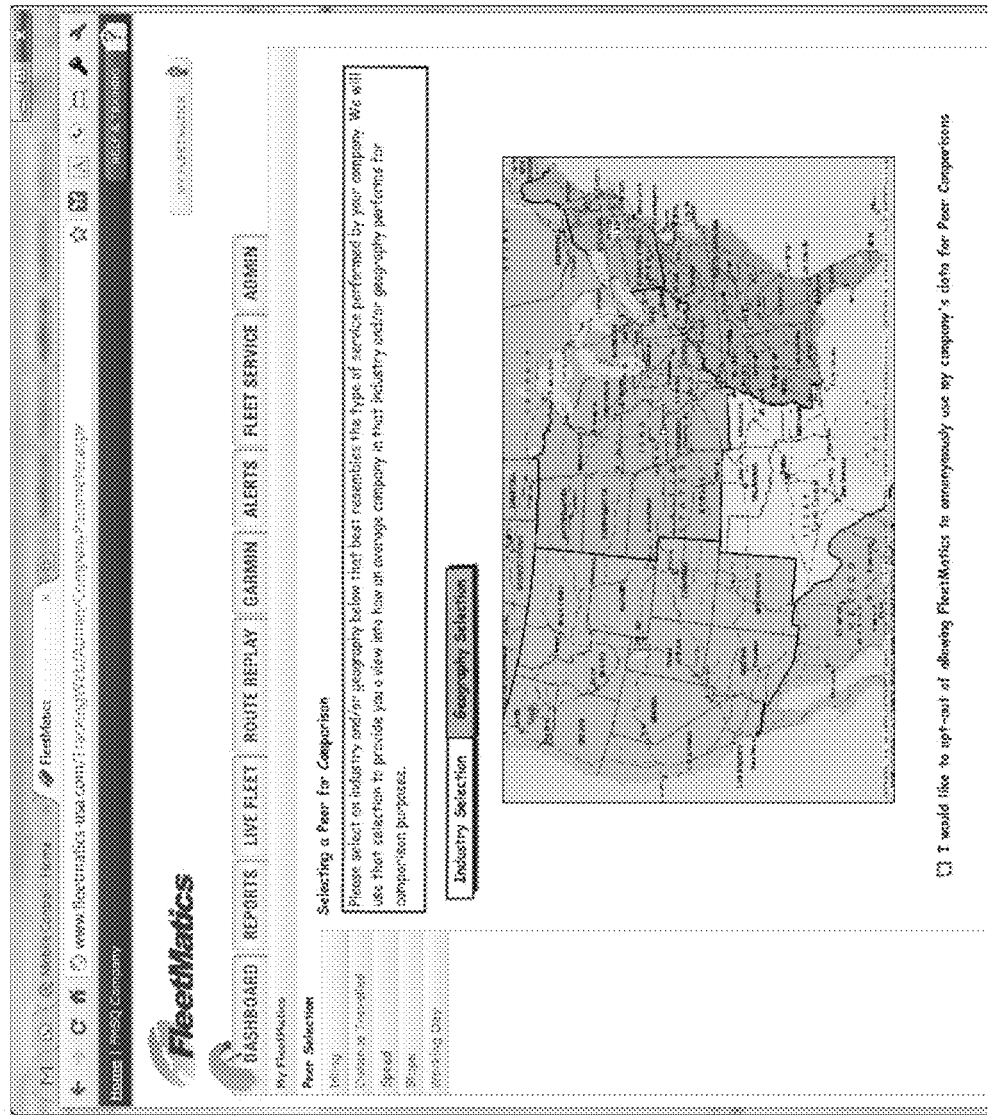

Exemplary graphic representations or interfaces 300 for a graphic user interface for a user is shown in FIGS. 3A-3T. Such interfaces could be in the form of application software for computer and digital devices as described above, or in the form of webpage accessed by a client from at least one host server, or any combinations thereof as broadly disclosed herein and without limitation. As shown in FIG. 3A, a "Dashboard" 320 page gives a user a first interactive screen to view GPS data and operational metrics. The top of the graphic user interface 300 has, in one embodiment, tabs for "Reports" 322, "Live Map," 324 "Route Replay," 326 "Alerts," 328 Fleet Service," 330 and "Admn" 332, which lead to other user interactive displays. Of course any number of tabs or links could be configured for the features as described herein, for example for "Speed" "Trending," "Score Card," and/or A "MyFleetmatics" or "My Fleet" page which can include user configurable fleet statistics and alerts, or can have default statistics personal to a user, or some mix of user configurable and default features and statistics.

For example, in one embodiment a user can select "Live Map" 324 using an input such as a keyboard or a mouse, which would lead to a page with GPS data and mapping software which tracks vehicles v1, v2 . . . vn. The page can allow a user such as a dispatcher to, for example, locate and dispatch the closest vehicle to any job site and reroute the nearest vehicle.

The Dashboard 320, as with any other screen, can be configured to offer preset modules or objects for a user to interact with or view, or in the alternative it can be configured to allow a user to customize the information, reports, alerts, etc most important to the user. For example, an exemplary "Dashboard Preferences" page is shown at FIG. 3B, which allows an administrator user to "drag and drop" icons to configured the order of graphs for operational metrics of Engine On/Off 335a, Idling Report 335b, Distance Traveled 335c, and High Speed Report 335d "Speeding Violations," 335i and "Speeding Severity" 335h as desired.

As shown in FIG. 3A, the Dashboard 320 screen includes various graphic representations of operational metrics, including reports and alerts, to aid a user in, among other things, vehicle, employee, and fleet management. For example, the operational metrics 302 for individual vehicles include operational metrics such as a engine on/off 302a, vehicle mileage 302b, idling, 302c, and speeding 302d. Other operational metrics could also be shown such as average speed 302e, number of stops 302f, speeding severity 302h, and speeding violations 302i. Such operational metrics are also shown for various fleet configurations as described below.

The Dashboard 320 shows at the top of the interface 300 a graphic information display for an individual vehicle 301, which can be selected from a drop down menu 301a. Other methods of selection can be used, for example, by selecting with a mouse, a graphic for the vehicle v4 (shown as "Van 1006") in a fleet report graphic 335. The graphic information display for the vehicle 301 includes a reporting and alerts for the vehicle v4, for example, operational metrics such as at least one engine on/off graphic 302a, vehicle mileage graphic 302b, idling graphic 302c, and a speeding graphic 302d.

As shown, the graphics 302a, 302b, 302c, 302d on the individual vehicle 301 is shown reporting graphic that shows a rating 303 under each operational metric comparing the vehicle performance against other vehicles in the fleet for a 24 hour period. For instance, an engine on/off rating graphic 303a puts the vehicle v4 in $4^{th}$ place in the fleet, a vehicle mileage rating graphic 303b puts the vehicle v4 in $6^{th}$ place, idling rating graphic at 303c at $19^{th}$ place, and a speeding rating graphic 303d puts the vehicle v4 at $7^{th}$ place. These markings for v4 are also seen in the fleet management graph 335a, 335b, 335c as described below.

The interface 300 also provides, for the graphic user interface, an alert when an operational metric for a vehicle exceeds a predetermined threshold established for the operational metric. For example, report graphic on the individual vehicle 301 shows the name of the driver, that the vehicle has shutdown (e.g.: for the end of the workday), the time for shutdown, and for each of the operational metrics, a pie chart graphic 305a, 305b, 305c, 305d, and a split-window graphic 306a/308a, 306b/308b, 306c/308c, 306d/308d/309d for the individual's engine on/off, vehicle mileage, idling, and speeding graphics respectively, each of which are designed to alert and report to a user when a vehicle has exceeded a predetermined criterion such as a predetermined threshold. Each of the pie chart 330 and split window graphics 306/308 show the time the vehicle spent within threshold 306, as well as a representation that alerts when the vehicle exceeded the threshold. For example, each metric has in the split window graphic 306/308 a predetermined criterion or threshold 306 established for the 24 hour period 8 hours for engine on/off 306a, 150 miles for vehicle mileage 306b/308b, 1.0 hours for idling 306c/308c, and three speeding thresholds of over 70 mph, 80 mph, and 90 mph under speeding 306d/308d/309d.

For example, the "Engine On/Off" split window 306a/308a has in a left-hand window, for vehicle operation within the predetermined threshold 306a, a graphic which includes a color (green) and text describing the vehicle's v4 operation statistic under the threshold, 7 hours, 50 m. The right-hand window 308a; shows a window with the time remaining in the 24 hour period (16 hours, 10 min.) Because this is time where the engine was not running, and thus within the threshold, the window 308a is configured to show neutral color or identifier (e.g. white, tan, clear). The pie chart 305a shows a visual with green and neutral coloring corresponding to the times in the split window 306a,308a which allows a user to readily visualize the percentages for the Engine On/Off time.

The "Vehicle Mileage" split window 306b/308b shows the predetermined threshold of 150 miles in the left-hand window 306b, which is in green as with Engine On/Off. However, the right-hand window 308b shows the driver has exceeded the threshold by another 38 miles. As this is in excess of the threshold, where the window 308b is configured to alert the user with a red color. The pie chart 305b shows a visual with green and red coloring corresponding the times in the split window 306b, 308b which allows a user to readily visualize the percentages for the vehicle mileage, as well as alert the user that the vehicle is excess of the threshold.

The Idling and Speeding graphics are similarly configured, thereby proving a user friendly view for all the metrics for the individual vehicle and driver. For example, Idling 302c includes an alerting threshold where of 1 hour, and alerts for excess of an hour of idling. Speeding 302d includes reporting and alerting for, among other things, speeds in excess of 70 mph 306d, 80 mph 308d, and 90 mph 309d, with different colors for each (e.g. green, yellow, and red).

It will be understood that other graphical displays could be used, such as bar graphs, gauge icons, whimsical graphics (e.g., a speedometer or a stopwatch), or any other such graphic as is useful.

For each vehicle v1, v2, v3 . . . vn, historical GPS event data can be stored, as for example, for a plurality of operation periods. Accordingly, while the graphics 302a, 302b, 302c, 302d on the individual vehicle 301 are over an operational 24 hour period, the graphics could be configured to show data for longer periods and/or a plurality of operational periods, such as a week, a month, a quarter, a year, or other periods as desired. Other thresholds could be implemented for each of these periods, as for example, by adding the criteria or thresholds for each operational period, e.g., for Vehicle Mileage 302b, or an 160 hour threshold for a 4 work-week period (a five day week), where each 24 hour period is 8 hours. Other reports can be generated based on the historical event data.

For example, report information can include one or more reports on: vehicle activity over a predetermined time period, speed (including high speed and average speed), number of stops, idling, vehicle operational reports, maintenance, employee performance, driver behavior; and fleet performance.

An exemplary, selectable "Top 10" fleet report 335 shows reports 335a, 335b, 335c, 335d for the top ten vehicles in each of operational metrics for a fleet of vehicles: Engine On/Off 335a, Idling Report 335b, Distance Traveled 335c, and High Speed Report 335d. As noted herein additional metrics for "Speeding Violations," 335i and "Speeding Severity" 335h can be added to the reports relating to speed. Operational metrics for one of the vehicles v4, "Van 1006" is shown at the top of the graphic user interface 301, and the vehicle rankings as shown for v4 are shown in three of the metrics 335a, 335b, and 335d where the vehicle is in the top 10, as described above. While the report shows the "Top 10," a selectable drop down menu 308b allows a user to select any number of options for reporting (e.g., top 20, 50) and another drop down menu 310 allows a user to select time periods (e.g. 24 hours, 5 days, a month), to obtain ranked vehicle performance for the fleet and vehicles therein.

The "Engine On/Off Report" 335 ranks the vehicles v1 . . . v10 from highest to lowest for "Engine On" time over the 24 hours. For example, a row for the top vehicle v1 shows the engine was on for 9 hours and 58 minutes and off for 15 hours and 2 minutes. The lowest ranked v10 (Vehicle 0435) shows engine operation for 6 hours and 8 minutes, whereas the off time is 17 hours and 52 minutes. A fillable bar graph shows on and off times, with "on" being green and off being blank or neutral, with the fill line visually showing the percentage of the 24 hour period. Text graphics write out the time. The rows of bar graphs for each vehicle are aligned in a columnar format so as to readily compare each vehicle's statistics with one another.

The "Distance Traveled" 335c reports and alerts are consistent with criteria for the "Vehicle Mileage" 302b for the individual driver described above, and ranks vehicles within the top 10 of the fleet from highest to lowest for distance traveled. A fillable bar graph shows the predetermined threshold of 150 miles in the left-hand bar graph, which is in green. However, the left-hand of the bar graph shows, with fill lines by percentage, where the driver has exceeded the 150 miles threshold. The top ranked vehicle of the fleet is in excess of the threshold by 236 miles, whereas the 10$^{th}$ ranked vehicle (Van 1026) is only a few miles over. A fillable bar graph shows distances limes, with the 150 mile threshold being green any excess mileage being red so as to alert the user, with the fill line visually showing the percentage of the 300 mile distance. Text graphics write out mileage at or under 150 miles on the left-hand side, and mileage in excess right hand side. Again, rows of the bar graphs for each vehicle are aligned columnar format so as to readily compare each vehicle's statistics with one another. The "Idling" 305c and "High Speed" 306d reports graphics are similarly configured, thereby proving a user friendly view for all the metrics for the ranked vehicles and drivers in the fleet. For example, "Idling" 335b includes an alerting threshold of 1 hour, and reports, bar graphs, alerts for excess of an hour of idling. As shown in FIG. 3C, such a Idling report can also be configured in a format for delivery to a PDA or smartphone, which shows bar graphs, rankings, and idling times for a plurality of drivers/vehicles over a 24 hour period. Returning to FIG. 3B, as with the individual report 302 above, speeding 335d includes bar graphs, reporting and alerting for, among other things, speed in excess of 70 mph, 80 mph, and 90 mph, with different colors for each (e.g. green, yellow, and red).

Figure 3U:
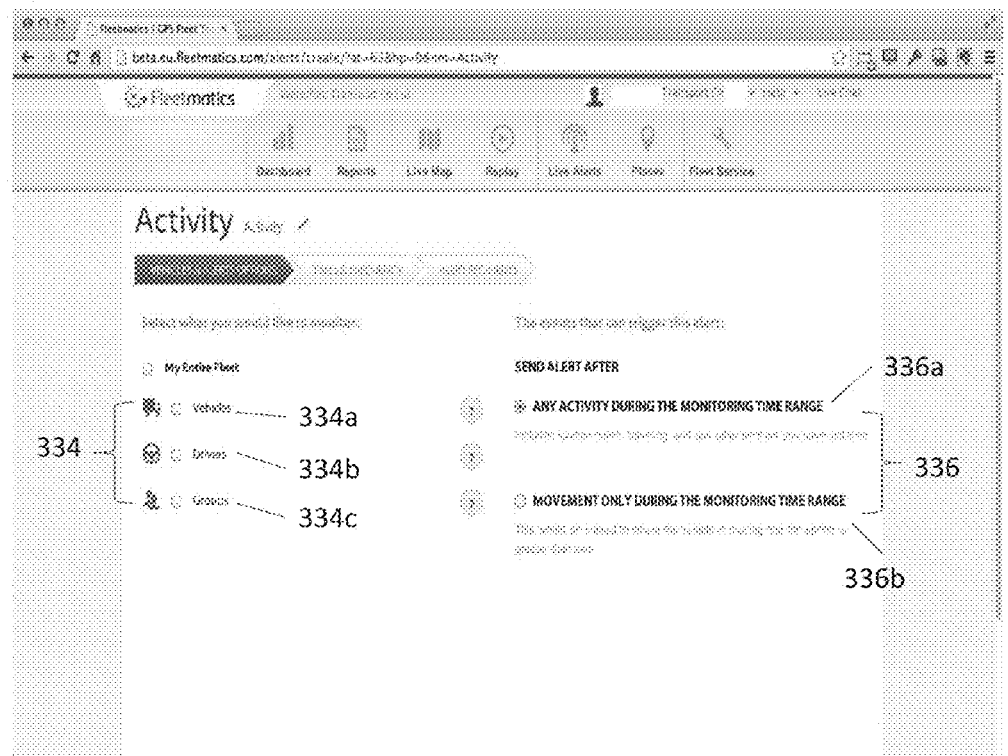
Figure 3V:
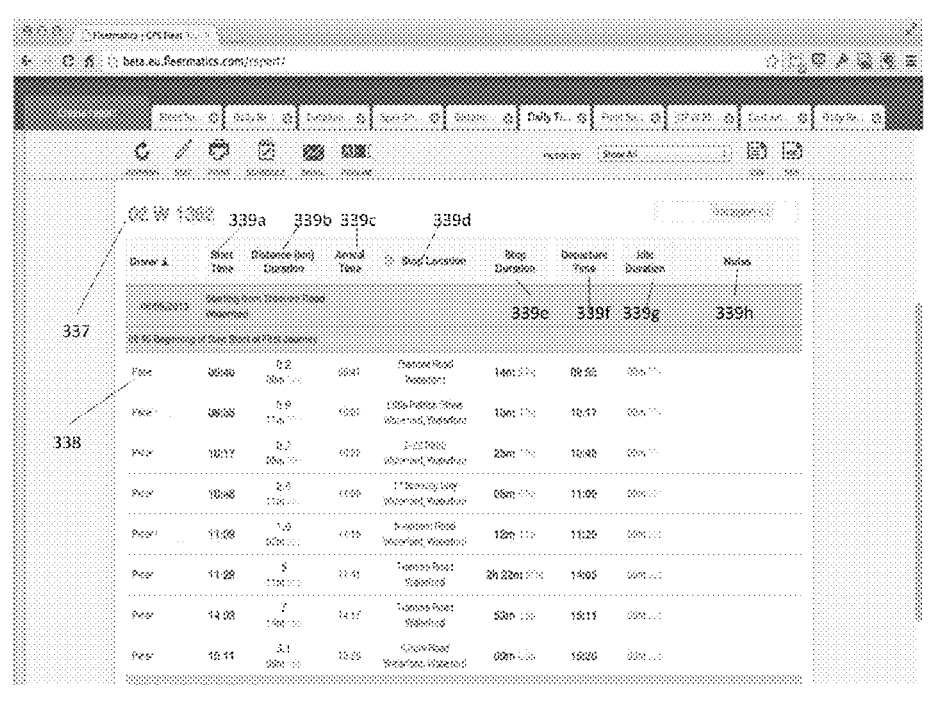
Figure 3W:
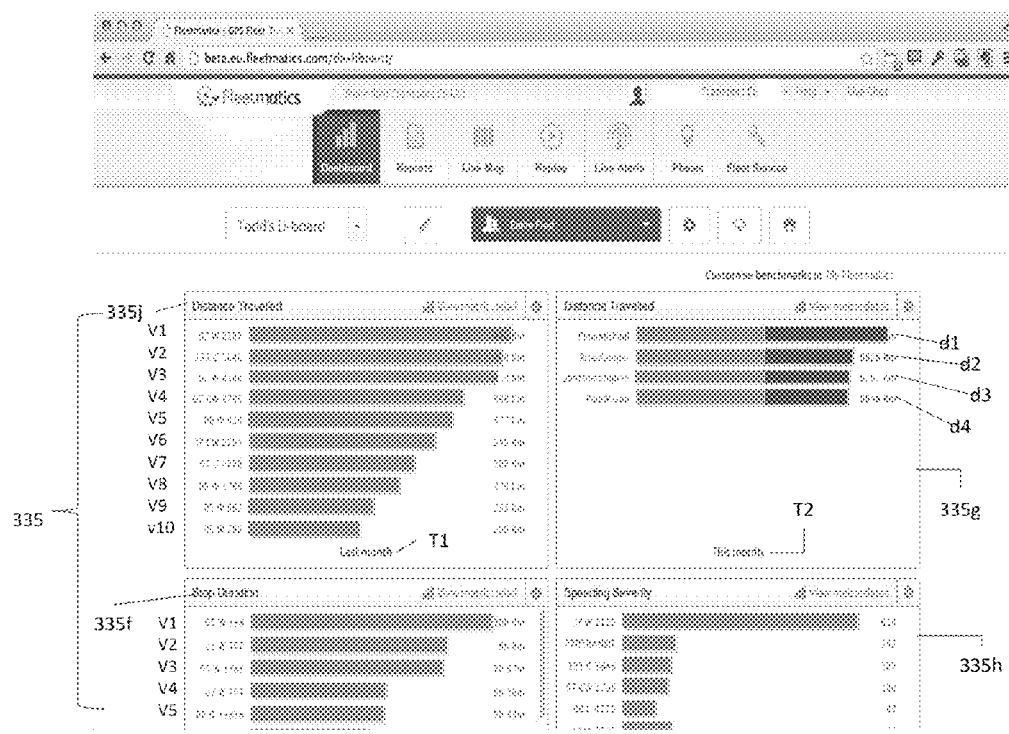

In another embodiment, as shown in FIG. 3W, selectable "Entire fleet" fleet report graphic 335 further shows reports 335j, 335f, 335g, 335h for the entire fleet's drivers and vehicles in each of operational metric reports: Distance Traveled for vehicle 335j, Stop Duration 335f, Distance Traveled for Driver 335g, and Speeding Severity 335h. The "Distance Traveled for vehicle" 335j ranks the vehicles within the entire fleet, and displays the top 10 vehicles V1, V2 . . . V10 from highest to lowest for distance travelled for time period T2, i.e., last month. The "Stop Duration" 335f ranks the vehicles within the entire fleet, and displays the top 10 vehicles V1, V2 . . . V10 (V6-V10 not shown in the figure) from highest to lowest for stop duration for a particular time period. The "Speeding Severity" 335h ranks the vehicles within the entire fleet, and displays the top 10 vehicles V1, V2 . . . V10 (V6-V10 not shown in the figure) from highest to lowest for speeding severity for a particular time period. It will be noted that the vehicle reports report on the Vehicles' statistical rankings, and not the drivers, as a vehicle may be associated with more than one driver.

As shown in FIG. 3W, the "Distance Traveled for Driver" 335g ranks drivers, and not vehicles, within the entire fleet from highest to lowest for distance traveled for a particular time period. For example, the report 335g shows that the top ranked driver of the fleet D1 (Peter)) has travelled 7911 km for period T1, i.e., for this month, whereas the 4$^{th}$ ranked driver D4 (Paul) has travelled 6648 km for this month. Similarly with Distance Traveled 335c, Distance Traveled for Driver 335g also shows a predetermined threshold of mileage in the bar graph. Because the Distance Traveled 335c graphic is vehicle independent, the statistics for each driver will include all the vehicles that driver used, even if the driver used multiple vehicles. As shown the FIG. 3W, the Distance Travelled for Vehicle report 335j has statistics for 10 Vehicles V1-V10, whereas these are associated with only 4 Divers d1-d4 in the Distance Travelled for Driver" 335g report.

It will be appreciated that Engine On/Off 335a, Idling Report 335b, Distance Traveled 335c, and High Speed Report 335d, Distance Traveled for vehicle 335j, Stop Duration 335f, Speeding Severity 335h, and any additional metrics report may be generated as a driver centric report, which is a report ranking the drivers in the fleet as opposed to the vehicles, and again, the statistics for each driver will include all the vehicles that driver used, even if the driver used multiple vehicles.

More detailed reports can be created and configured. In one embodiment, as shown in FIG. 3C, preferences for speed related metrics (e.g. high speed 302d, average speed 302e, speeding severity 302h, and speed violations 302i) reporting and alerting for the Dashboard can be configured by a user from a "Speed Tab." As shown in FIG. 3C, a user can select "Speed" from a preferences menu or side bar of links 501 to other pages (e.g. "Industry Benchmarking," "Idling," "Distance Travelled." The page comprises input interfaces 502, 504, 505, 506, 508, 510, 512 for activating and configuring the display of operational metrics 302 for speed and speed data, including speed data from speed databases and configuring thresholds. An upper graphic interface includes an input 502 for activating an average speed for drivers in a period, which asks "What average speed is too high during a 24 hour period. The input area for the average speed threshold also includes a slider bar 504 for configuring the desired average speed, although any known input method could be used. In a second input area, a user can activate 504 and configure 505 different speed thresholds for the fleet, for example a "low" 80 mph, 95 mph 308d, and 110 mph). The user can be given a dropdown list 505 with any number of preset thresholds, for example including higher speed thresholds (e.g., 95 kmph, 115 kmph, 125 kmph) along with the "low" one given above. A third input area allows a user activate and configure the system interface to include alerts using speed limit data, such as posted speed limits and/or or average road speeds. Activation interface object 506 allows the user to configure the system to include road speed data when showing speed limits Activation interface object 508 allow show exceptions on pages throughout the user's interface with the system 508, and another interface object 510, shown as a slider, allows the user to adjust the criteria or thresholds for showing exceptions, shown in FIG. 3C to allow the user to adjust the speed over the road specific speed limit is allowed before flagging an exception (e.g. 0-110 mph). Another activation interface object 512 and slider 514 allows a user to activate and adjust the threshold for the acceptable number of speed limit violations for a given period (e.g. 0-150 in a 24 hour period). Yet another input interface 518 allows a user to configure the type of graphic they would prefer to see for alerts, here shown as a speedometer graphic showing and a bar graphic for the speed reporting graphic, described below, along with a preview graphic 516 for the choice selected. Once the user has configured the system for preferred speed alerts and reporting via the speed tab 500, one or more interface objects 520 allow the user to save the changes for the configuration and, if desired, continue.

As noted above, the user the user is presented with a graphic 521 and a speedometer graphic 522 which display alerts for speeding severity of drivers 302h as well as speeding violations 302i shown in FIG. 3D.

An exemplary, selectable "Speeding Severity" 302h for fleet reporting graphics 521, 523 selected from a drop down menu 522 for operational metrics 302a . . . 302i shows the number of times drivers D1 . . . Dn (e.g., at "Top 10") violated the speed limit thresholds configured, for example, as set by the user (see FIG. 3C, 510, 512) "How far over the road specific speed limit can your drivers go before they are flagged?"). The report 521 ranks the drivers D1 . . . D10 from highest to lowest for speeding events over the 24 hours. Fillable bar graphs fore each driver D1 . . . Dn reporting and alerting for, among other things, speed limit events in excess of posted speed limits by 0-10 KMPH/0-5 MPH, 10-25 KMPH/5-15 MPH 25+KMPH/15+MPH, with different colors for each (e.g. yellow, orange, and red). A tally area 525 in the fleet speeding severity report 521 tallys the number of speed violations for a given driver (e.g. 53 0-10 mph violations, 57 10-25 mph violations, and 53 over 25 mph violations, and 163 total violations for driver D1), which can be populated when the user selects that driver on the graph, for example by a mouse click or mouseover. The speedometer graphic 522 shows the total number of speed limit events for a number of drivers in the fleet (e.g the top 5, top 10, all), which can be configured to correspond to the bar graphic 521 as shown. Speed limit events in excess of posted speed limits by the drivers are shown as 0-10 mph, 10-25 mph, and over 25 mph, with different colors for each (e.g. yellow, orange, and red) on a 0-350 "speedometer" semicircle. A tally area 523 at the top of the graphic in the fleet speeding severity report 521 tallies the number of speed violations for the driver group (e.g. 240 0-10 mph violations, 57 10-25 mph violations, and 53 over 25 mph violations, and 163 total violations for drivers D1 . . . Dn).

An exemplary, selectable "Speeding Violations" 302i for fleet reporting graphics 526, 528 selected from a drop down menu 522 for operational metrics 302a . . . 302i shows the number of times drivers D1 . . . Dn (e.g, at "Top 10") violated the speed limit thresholds configured this time showing the number of violations vs an acceptable number of violations, for example, as set by the user (see FIG. 3C). The first report 526 ranks the drivers D1 . . . D10 from highest to lowest for speeding events over the 24 hours. Fillable bar graphs fore each drivers D1 . . . Dn reporting and alerting for, among other things, acceptable speed limit violations and those exceeding the threshold (e.g. green red). A tally area 527 in the fleet speeding severity report 526 tallies the number of speed violations for a given driver (e.g. 15 allowed violations, 12 excess violations, and 27 total violations for driver D1), which can be populated when the user selects that driver on the graph, for example by a mouse click or mouseover. The speedometer graphic 528 shows the total number of speed limit events for a number of drivers in the fleet (e.g. the top 5, top 10, all), which can be configured to correspond to the bar graphic 526 as shown. Speed limit events in excess of posted speed limits by the drivers are shown as acceptable and in excess, with different colors for each (e.g. green and red) on a 0-350 "speedometer" semicircle. A tally area 529 at the top of the graphic in the fleet speeding violation report 521 tallys the number of speed violations for the driver group (e.g. 150 acceptable violations for 10 active drivers) and a pointer on the "speedometer" shows the level of violations.

FIG. 3E shows another example of a detailed report for a driver assigned to one or more vehicles, as could be accessed, for example, in a page for reports (see FIG. 3A 322). The report is an "Hours Worked Report" 350 for a driver (Driver 18, Peter) over a five day workweek, as shown in the lower table 340 portion of the graphic user interface 340. As explained herein, the Hours Worked Report reports accurately on the Driver 18's hours based on GPS event data, even though Driver 18 is assigned to two (or more) vehicles over a week, as Peter's Driver ID is associated with all the vehicles he has Driven on a one-to-one basis. Each day of the work week is given a row 340a, 340b, 340c, 340d, 340e on the report, and the table 340 which includes columns for day, start time, driver, finish time, and an "Hours Worked" bar graph 344a, 344b, 344c, 344d, 344e which shows a colored fill bar and text showing the hours worked. The report has alerting icons E1, E2, E3, E4, which show exceptions where a vehicle and driver have exceeded predetermined thresholds or criteria. The exception alerts are described in an upper window 342, which can be scrolled using a scrolling graphic 343 using a mouse, via touch screen, or other input. The upper window 342 reports and alerts the user as to the exceptions, which reports two alerts 306b, 306c that on 2 days a driver finished at 1:22 pm and 1:30 p.m., which is before predetermined time (before 4:00 p.m.). Another alert 306a shows that on one day the driver worked two hours longer than a predetermined time period (12 hours), as the driver worked 14 hours and 33 minutes. By scrolling down the upper window module 342, the user can see the fourth alert for the exception E4, where the driver exceeded the predetermined threshold of 12 hours by 27 minutes. The fill bars on the bar graphs 340a, 340b, 340c, 340d in the lower table 340 can also be colored to reflect an alert, such as where on days where a driver has exceeded the predetermined threshold for hours worked E1, E4. For example, the fill bar 344b, 344e can be colored red when the predetermined threshold is exceeded, whereas when under the threshold, the bar 344a, 344c, 344d is colored green. A week summary portion 346 of the graphic user interface 350 can give over all statistics for the week, such as start and finish dates and times, total hours and days, and average hours per day.

In an embodiment, the system can be configured to use the assignment information to generate reports, alerts, and exceptions for driver activity for a particular time period. When a user requests the system to ascertain drivers' contextual information from tracked vehicle data, after a reporting preference (vehicle, driver, or group) is selected by a user, the system refers to the Lookup Table containing the unique identifier of related objects with timestamps and location data for the time period specified by the user. Depending on the users selected method of presentation, the activity reports of the associated objects (vehicles, drivers, or group) may be generated and displayed by the system based on user selection.

Figure 11A:
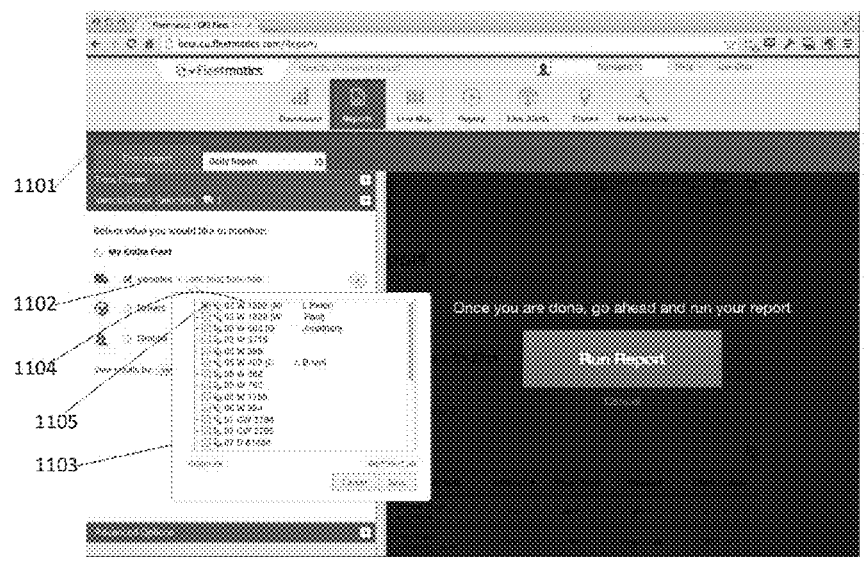
FIGS. 11A-11K depict exemplary display representations for activity reports.
Figure 11B:
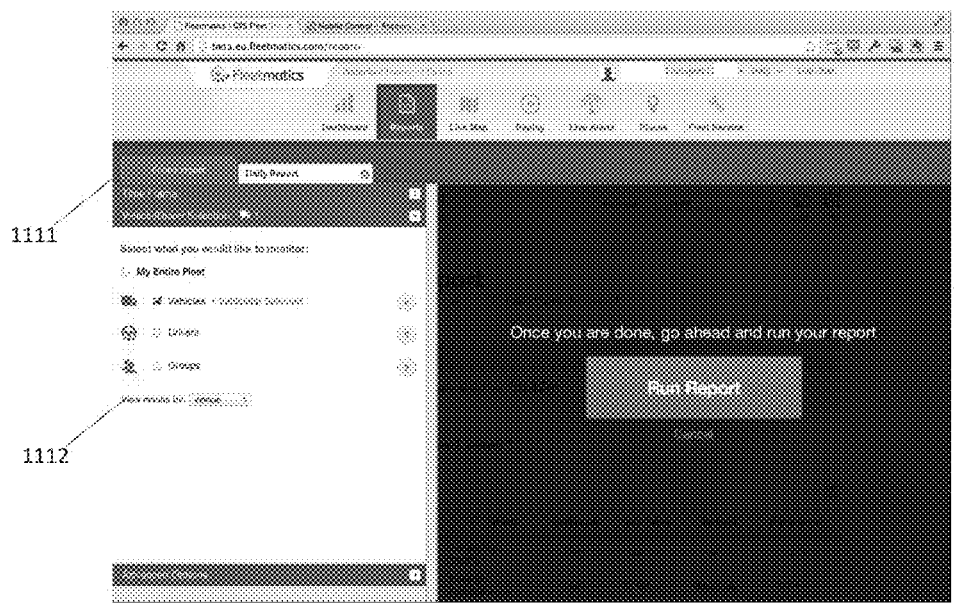
Figure 11C:
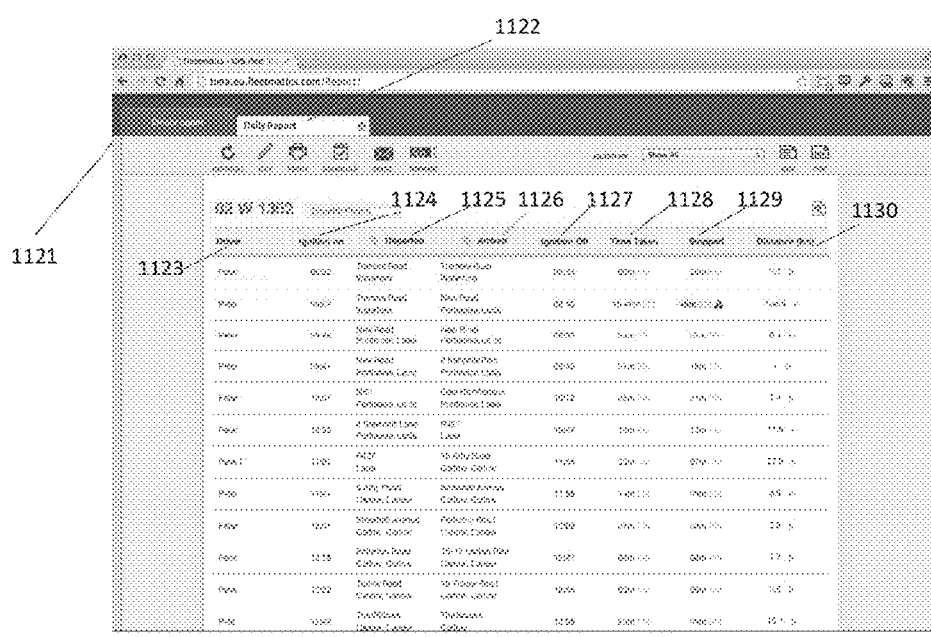

FIGS. 11A-11C illustrates an example of a series of interactive displays for a graphic user interface generating a report of vehicle activity based on user selection. As shown in FIG. 11A, in a report page 1101, after the user uses an input to select "Vehicles" 1102, a selection box 1103 is displayed and the user is requested to select desired vehicles among all of the vehicles of the entire fleet. After the user selects vehicle 1104 "02 W 1362 (Peter)" by clicking the check box 1105, the next interactive page 1111 is displayed on the screen as shown in FIG. 11B, in which the user selects "Vehicle" from a dropdown menu 1112 including options to view by Driver or Vehicle to view the report by vehicle.

Then as shown in FIG. 11C, the next interactive page 1121 displays a daily report 1122 for the activity of vehicle "02 W 1362" which is assigned to driver Peter currently. The daily report 1122 includes information for the one or more drivers assigned to this vehicle 1123, ignition on time 1124, departed location 1125, arrived location 1126, ignition off time 1127, time taken 1128 indicating the time period between ignition on time 1124 and ignition off time 1126, stopped time 1129, and distance 1130 indicating the distance between departed location 1125 and arrived location 1126.

Figure 11D:
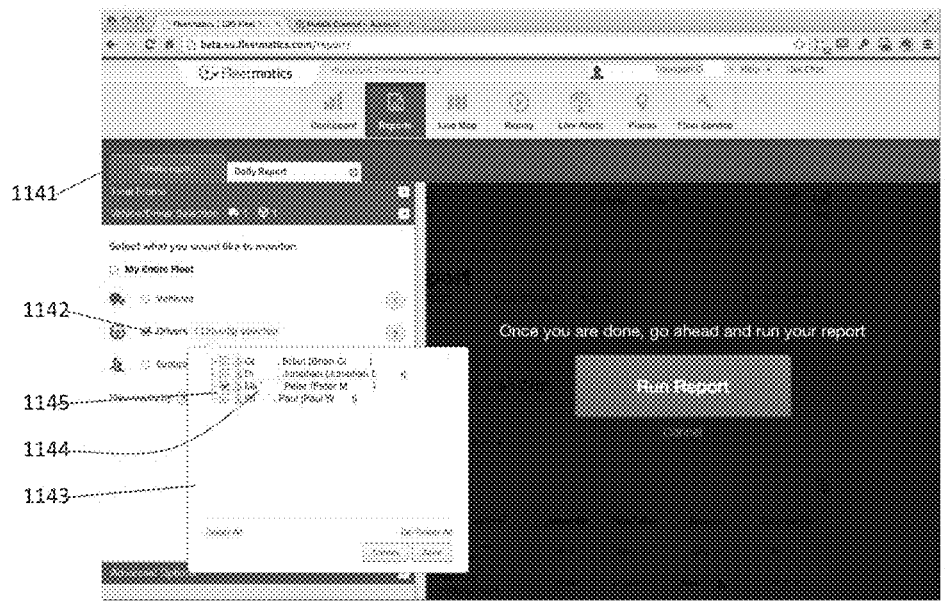
Figure 11E:
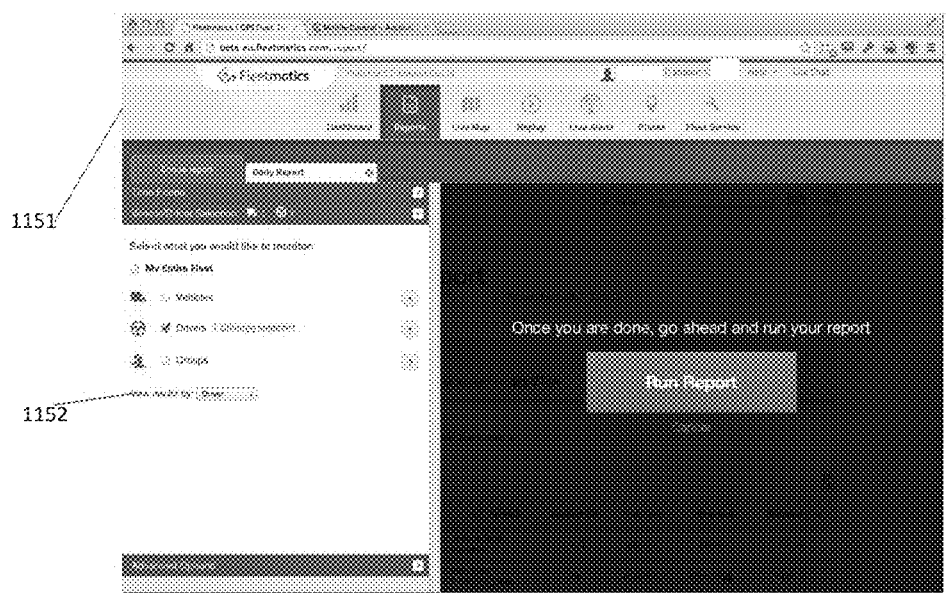
Figure 11F:
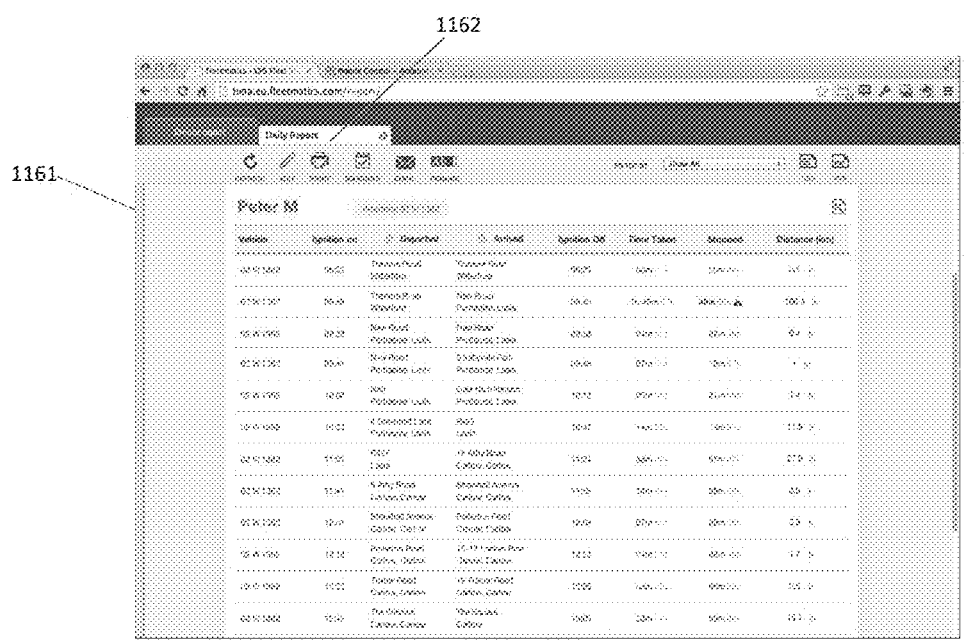

FIGS. 11D-11F illustrate an example of a series of interactive displays for generating a report of driver activity based on user selection. As shown in FIG. 11D, in a report page 1141, after the user click 1142 "Drivers", a selection box 1143 is displayed and the user is requested to select desired drivers among all of the drivers of the entire fleet. After the user selects vehicle 1144 "Peter (02 W 1362)" by clicking the check box 1145, the next interactive page 1151 is displayed on the screen as shown in FIG. 11E, in which the user selects 1152 to view the report by driver. Then as shown in FIG. 11F, the next interactive page 1161 displays a daily report 1162 for the activity of driver Peter, which is assigned to vehicle 02 W 1362 currently. If the desired driver drove multiple vehicles, the system will return all the activity for that driver regardless of which vehicle is used by the desired driver during the time period when the request for generating a report is made, and all the activity will be aligned automatically to make a single representation of travel and stop activity.

Figure 11G:
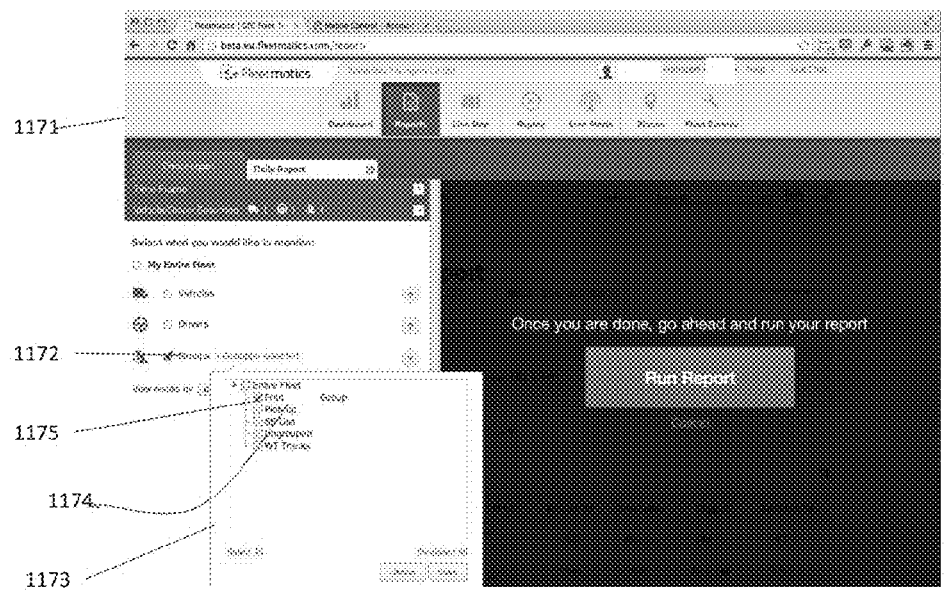
Figure 11H:
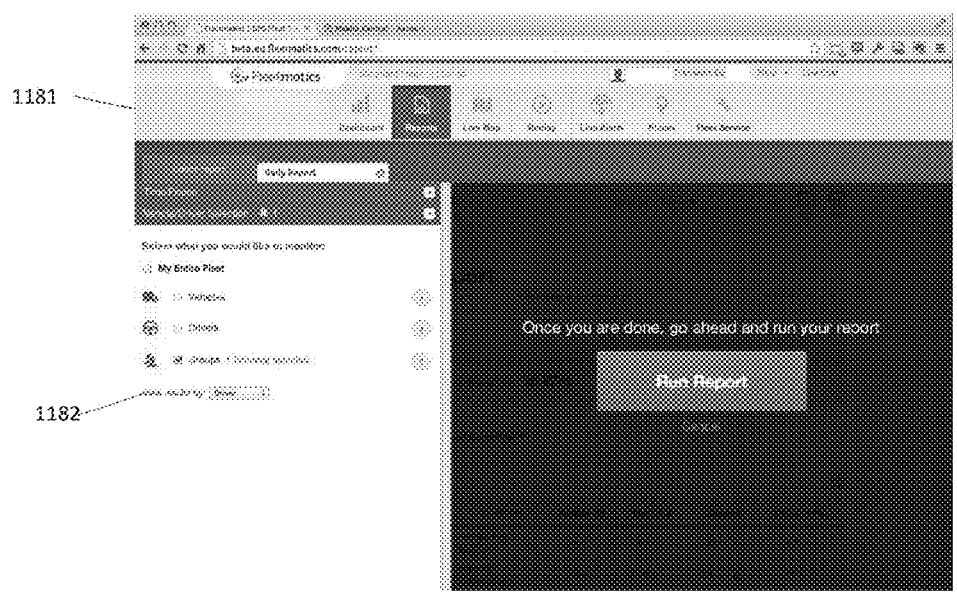
Figure 11I:
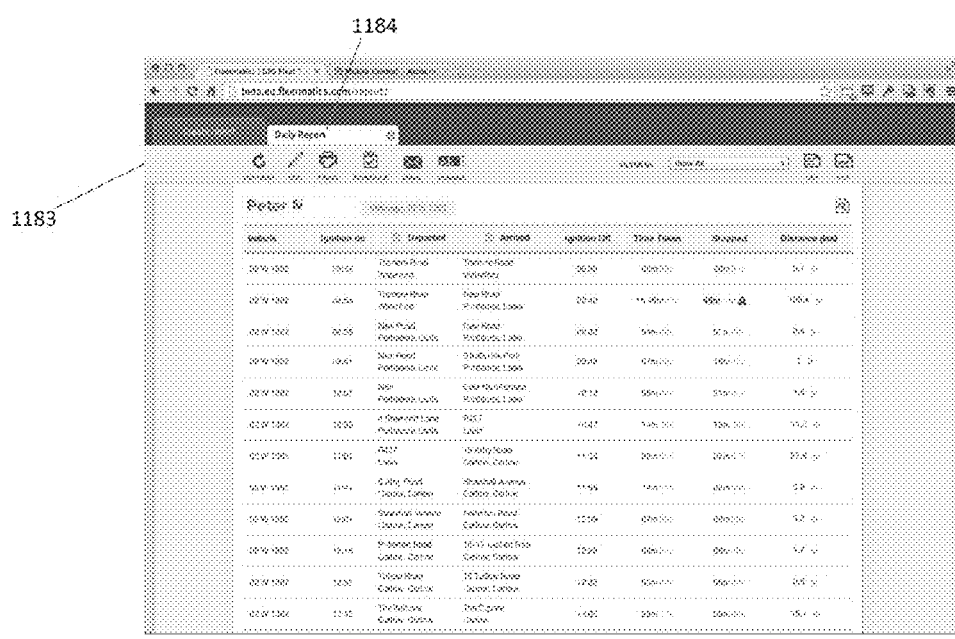

FIGS. 11D-11F illustrate an example of a series of interactive displays for generating a report of group activity and displaying the generated report by driver, based on user selection. As shown in FIG. 11G, in a report page 1171, after the user click 1172 "Groups", a selection box 1173 is displayed and the user is requested to select desired groups among all, of the groups of the entire fleet. After the user selects group 1174 "FrankTreacy Group" by clicking the check box 1175, the next interactive page 1181 is displayed on the screen as shown in FIG. 11H, in which the user selects "Driver" from the dropdown menu 1182 to view the report by driver. Then as shown in FIG. 11I, the next interactive page 1183 displays a daily report 1184 for the activity of group "FrankTreacy Group", which is viewed by driver "Peter," which is assigned to vehicle 02 W 1362 currently.

Figure 11J:
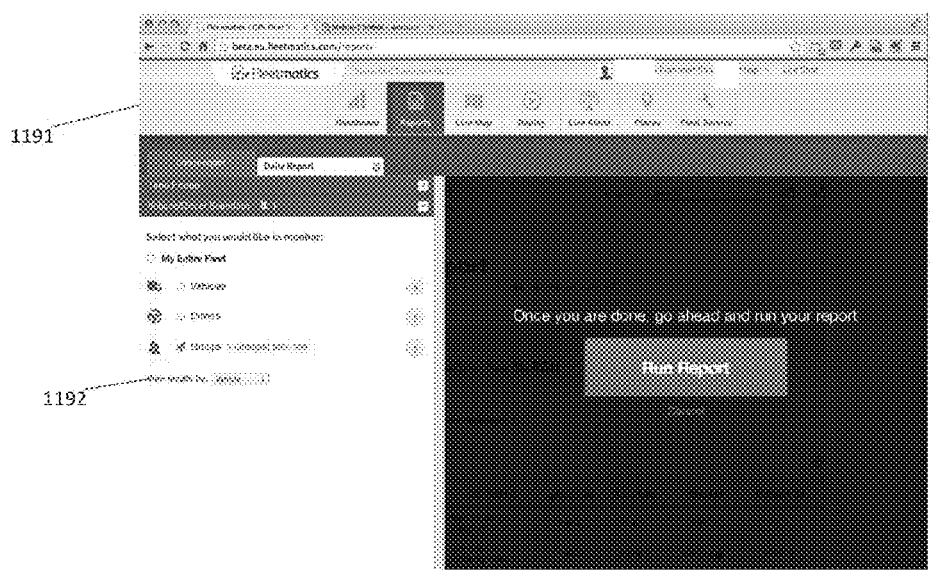
Figure 11K:
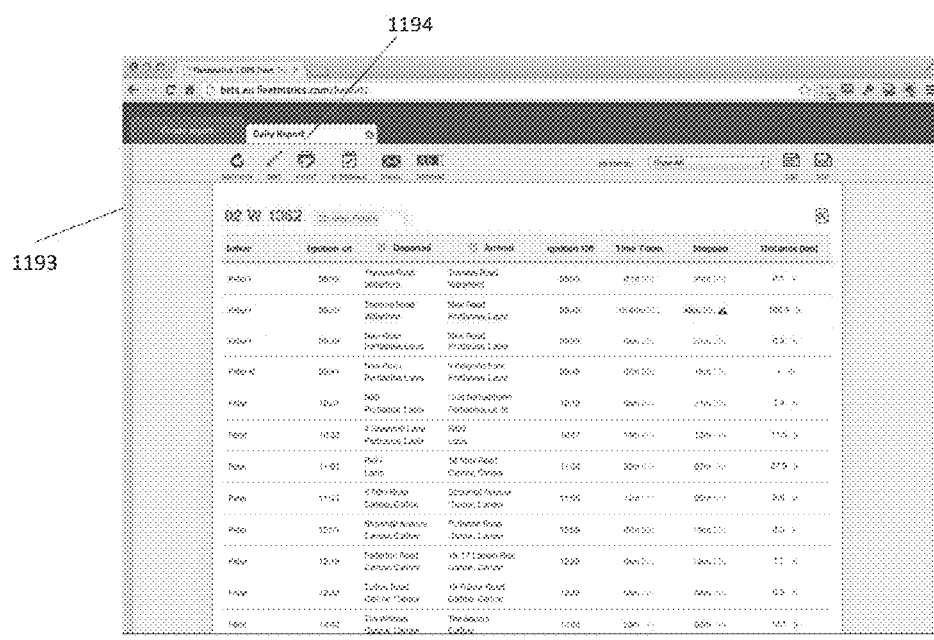

FIGS. 11J-11K illustrate an example of a series of interactive displays for generating a report of group activity and displaying the generated report by vehicle, based on user selection. As shown in FIG. 11J, in the interactive page 1191, if the user selects 1192 to view the report by vehicle, then as shown in FIG. 11K, the next interactive page 1193 displays a daily report 1194 for the activity of group "Frank Group", which is viewed by vehicle 02 W 1362, which is assigned to driver Peter currently.

In one embodiment, when the user selects to generate a report for group activity, the group activity report may include activity of directly related drivers and vehicles that have been assigned to the objects in the selected group. Alternatively, the group activity report may further include activity of indirectly related drivers and vehicles that have been assigned to the directly related drivers and vehicles. A description of directly related drivers and vehicles and indirectly related drivers and vehicles will be described below referring to FIG. 12A-12C.

FIG. 12A shows an example of a Group selected by the user. The selected group 1211 includes vehicles v11, v12 and v13. Drivers d11 and d12 have been assigned to vehicle v11, driver d13 has been assigned to vehicle v12, and driver d14 has been assigned to vehicle v13, so that the directly related objects of selected group 1211 include drivers d11, d12, d13 and d14. As shown in FIG. 12A, vehicle v14 has been assigned to directly related driver d11, and vehicle v15 has been assigned to directly related driver d12, so that the indirectly related objects of selected group 1211 includes vehicles v14 and v15. Therefore, if the system generates group activity report including activity of directly related objects, activity of 3 vehicles v11-v13, or activity of 4 drivers d11-d14, may be displayed based on the user' selection of "view result by vehicle" or "view result by driver". Alternatively, if the system generates group activity report including activity of both directly related objects and indirectly related objects, activity of 5 vehicles v11-v15, or activity of 4 drivers d11-d14, may be displayed based on the user' selection of "view result by vehicle" or "view result by driver".

FIG. 12B shows another example of a Group selected by the user. The selected group 1221 includes drivers d21, d22 and d23. Vehicles v21 and v22 have been assigned to driver d21, vehicle v23 has been assigned to driver d22, and vehicle v24 has been assigned to driver d23, so that the directly related objects of selected group 1221 include vehicles v21, v22, v23 and v24. As shown in FIG. 12B, driver d24 has been assigned to directly related vehicle v21, and driver d25 has been assigned to directly related vehicle v22, so that the indirectly related objects of selected group 1221 includes drivers d24 and d25. Therefore, if the system generates group activity report including activity of directly related objects, activity of 4 vehicles v21-v24, or activity of 3 drivers d21-d23, may be displayed based on the user' selection of "view result by vehicle" or "view result by driver". Alternatively, if the system generates group activity report including activity of both directly related objects and indirectly related objects, activity of 4 vehicles v21-v24, or activity of 5 drivers d21-d25, may be displayed based on the user' selection of "view result by vehicle" or "view result by driver".

Figure 12C:
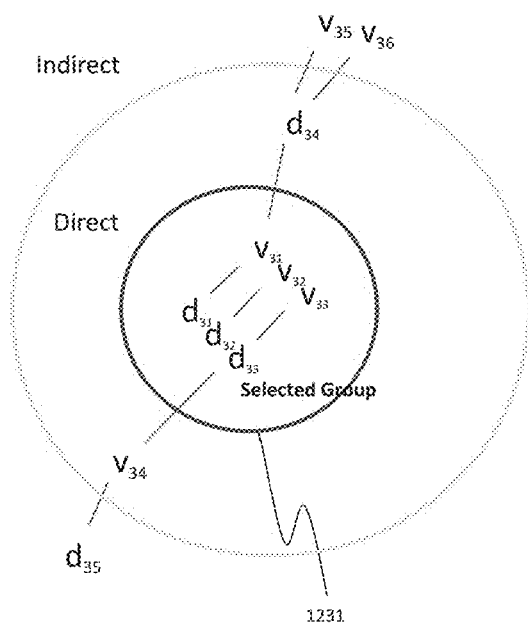

FIG. 12C shows another example of a Group selected by the user. The selected group 1231 includes drivers d31, d32 and d33, and the associated vehicles v31, v32 and v33, that have been assigned to driver d31, d32 and d33, respectively. Vehicle v34 has been assigned to driver d33, and driver d34 has been assigned to vehicle v31, so that the directly related objects of selected group 1231 include vehicle v34 and driver d34. As shown in FIG. 12C, driver d35 has been assigned to directly related vehicle v34, and vehicles v35, v36 have been assigned to directly related driver d34, so that the indirectly related objects of selected group 1231 includes driver d35, and vehicles v35, v36. Therefore, if the system generates group activity report including activity of directly related objects, activity of 4 vehicles v31-v34, or activity of 4 drivers d31-d34, may be displayed based on the user' selection of "view result by vehicle" or "view result by driver". Alternatively, if the system generates group activity report including activity of both directly related objects and indirectly related objects, activity of 6 vehicles v31-v36, or activity of 5 drivers d31-d35, may be displayed based on the user' selection of "view result by vehicle" or "view result by driver".

Therefore, when running reports or building alerts, the user has complete flexibility in selecting desired objects and generating reports and alerts for Vehicles, Drivers, and Groups.

FIG. 3V shows another example of a timecard report, which provides accurate hours of work for a vehicle associated with a driver, so that the user can have a complete view of vehicle assignment for a driver. As shown in FIG. 3V, the timecard report for vehicle "02 W 1362" 337, which is assigned to Driver "Peter" 338, indicates the work hours information of the vehicle on June 9, such as "Start time" 339*a*, "Distance duration" 339*b*, "Arrival time" 339*c*, "Stop location" 339*d*, "Stop duration" 339*e*, "Departure time" 339*f*, "Idle duration" 339*g* and "Notes" 339*h*. It will be appreciated that the system may also run a timecard report providing an accurate report providing hours of work for a driver or a group based on the user selection.

FIG. 3F shows an example of a detailed report for a driver and vehicle, as could be accessed, for example, in a page for vehicle speeds and violations. The report is a "Red Flag" report 600 for points of interest (POI) for a driver ("Peter") over a workday, as shown in the lower table 602 portion of the graphic user interface 340. The report can be configured by a user to cover any time period by a number of drop down menus 604, 605*f* or selecting a begin date time 604 and an end date- and time 605, each including drop-down menu for month, date, and time. Also included is an option 606 to select or deselect Monday-Sunday, so as to exclude or include specific days (e.g. to include only the driver's working days). Also included is an interface graphic 603, for example radio buttons, for selecting the parameters for the report, shown as being configured to show events over a given mph input by the user, or events where the report is a given MPH over a speed limit. It will be noted that the display can be configured to KMPH where that is the proper or desired metric. As shown in FIG. 3F, the report is run for events that are 2 mph over a speed limit for a workday. If the first radio button option is checked the text in the Type column results should read "Speed Above X MPH (or KMPH)". If the second radio button option is checked, then the text should read "Posted Speed" or "Road Speed" or "Average Speed" or "Traffic Speed," or "Trusted" or other such name as may be chosen, depending on the type of posted speed limit available. Once the report inputs are set, the report is run via a "Run" 605 tab, which shows all locations for that time range for which the driver went at least two mph over a posted speed or an average traffic speed.

On the list, the table 602 which includes columns for day 611, time 612, "Type," 613 "Details" 614 and a "Flag" 615 for MPH. The day 611, time 612, and details 614 columns show the date, time, and location of the driver (Phil) at points along a route. In the "Type" 613 column is a designation showing the type of criteria for the Red Flag report 600 alerting, in this embodiment, shown as "Trusted," indicating a trusted posted speed limit for this route, or "Average," indicating the report and/or alert is for the average traffic/road speed for the location. The report has alerting icons E1, E2, E3, E4, E5 which show exceptions where a vehicle and driver have exceeded predetermined thresholds or criteria, shown here as speeds in excess of a "posted speed" for a route or the average road speed for the location. The exception alerts E1 . . . E5 are described in a window 608 above the table 602, which can be scrolled using a scrolling graphic 609 using a mouse, via touch screen, or other input. The window 602 reports and alerts the user as to the exceptions E1 . . . E5, which reports the 5 exception alerts explaining that the speeds (1.) 67 (2.) 69 and (3.) 65 MPH are each above the posted speed for that location. By scrolling down the upper window module 609, the user can see the fourth and fifth alert for the exceptions E4, E5, where the driver exceeded the speed limit (68 mph and 64 mph).

The "Flag(mph)" 615 column in the table 602 shows the driver's mph at a list of locations, shown in the "Details" column. Speeds in the "Flag" column can be rounded up/down. Also shown for each exception E1 . . . E5 is the driver's mph at the location in red and an icon, a red circle with the number "60," indicated that the posted speed for that location is 60 mph. A "mouse-over" can also display text with further details when a pointer is placed on an exception.

Other icons can include reporting and alerting for, among other things, speeds in excess of speed thresholds 70 mph 306*d*, 80 mph 308*d*, and 90 mph 309*d*, with different colors for each (e.g. green, yellow, and red) for as shown in a driver's speed graphic 610.

FIGS. 3G-3J shows another example of a detailed report for an driver and vehicle, shown as a "Scorecard" for a driver. As shown in FIG. 3G, a left hand graphic 307 includes finable bars like those in FIG. 3A that show, for a driver, a score card for operational metrics Average Speed 302*e*, Distance Travelled 302*g*, Engine On/Off 302*a*, Vehicle Idling 302*c*, High Speed 302*d*, Number of Stops 302*f*, Average Speed 302*e*, Speeding Severity 302*h* and Speeding Violations 3*i* for the individual driver. A ranking for each metric as compared to other drivers in the fleet is also given. The GPS data analysis is given for a time period, for example 5 days (FIG. 3G) or 24 hours (FIG. 3I). As shown in FIG. 3G, on a right-hand graphic 311, a bar graph shows, for each day of the 5 days, an average speed, where the X-axis has each day, and the Y-axis shows miles per hour (0-60 mph). As shown in FIG. 3I, on a right-hand graphic 311, a bar graph shows, for each hour of the 24 hours, an acceptable and an excess speed over a speed limit (e.g., posted or average), where the X-axis has hours, and the Y-axis shows miles per hour in excess (0-15 mph); bars are colored as described herein to distinguish speeding thresholds. FIG. 3H shows a scorecard graphic configured for an application for a PDA such as a smart phone, similar to the left-hand graphic 307, showing a score card for operational metrics 302*a*, 302*g*, 302*c*, 302*d*, 302*f*, 302*e*, 302*h*, 302*i* for the individual driver, as well as a ranking for each metric as compared to other drivers in the fleet, for a time period of 24 hours.

Still other reports based on GPS data and tracking could be provided, such as driving behavior including vehicle speed, engine start-up and shut-down and idling time, or any others including as described herein which can be used to enforce driving policy and curb unwanted behavior like excessive speeding, tardiness and extended vehicle idling.

Similarly, alerts based on GPS data and tracking could be generated such as alerting a user immediately if a vehicle is used during off-hours, which can indicate a vehicle theft. Other exemplary alerts include late deliveries, vehicle care or maintenance is needed, or area reporting and/or need for rerouting. For example, alerts can be triggered for excessive speeding, excessive idling, engine start-up or shut-down during off-hours unauthorized vehicle usage and when a vehicle enters or exits specific geographic areas. Alerts can also be configured to alert when vehicles are due for scheduled maintenance (e.g., based on a specific length of time, miles driven, or engine-on time). Alerts can also be segregated from reporting on a separate page of a graphic user interface (e.g. accessible by a tab 328 as shown on the Dashboard 328 at FIG. 3A).

Alerts can be flagged in relevant reports as shown above, and users can also be notified of any alerts as soon as a violation occurs via email or mobile device. As shown in FIG. 3F, it will be noted that in some embodiments, a portable device such as a smart phone or PDA can be configured to receive alerts that need urgent attention, such as an off-hours use alert or an alert indicating rerouting is needed. For example, as shown at FIG. 3J, an application is configured to show a number of alerts 315 received over a course of time, including for example, alerts showing a speed criterion or threshold has been met or exceeded. By selecting one of the alert indicators, a separate details screen 317 is accessed which describes the alert. As shown at FIG. 3K is a page for allowing a user to configure speed threshold alert. User interface icons, shown as radio buttons 536, 543 in place for users to decide how to display the alerts, "Alert at Speed X mph/kmph 536 and "Alert Speed Violations when at least X over limit 538. If the "Alert Speed Violations" 538 is checked a second option (check box) will activate; "Use Average Road Speeds at limits when needed." This option will use average speeds for a route if the exact posted speeds are not available. A scheduler 545 area allows a user to schedule days and times for the alert, and an "Alert Recipients" 552 area allows a user to designate recipients and can further be configured to designate the method of contact (e.g e-mail, text, etc.).

In one embodiment, as shown in alert options page FIG. 3U, the selection area 334 allows the user to select objects to be monitored from Vehicles 334a, Drivers 334b and Groups 334c. The selection area 336 allows the user to select the event that may trigger the alert. For example, if the user selects "Any activity during the monitoring time range" 336a, the event including ignition on/off, travelling and any other installed sensors may trigger the alert. If the user selects "Movement only during the monitoring time range" 336b, the event that may trigger the alert will be limited to where the vehicle is moving and the speed is greater than zero.

Reports or alerts can also be configured to how fleet alerts 390 for a fleet trending data 390, as described below.

As explained above, the computer system includes GPS event database. The GPS event data is analyzed to derive a plurality of operational metrics for each of a plurality of vehicles; and identify, from the analysis, at least one trend for a GPS event history using the GPS event data. The system can be configured to provide to a graphic user interface an interactive display configured display a representation (e.g., a graphic presentation of the trend). Reports and alerts based on GPS data and tracking and trending is provided, including for driving behavior including vehicle speed (including average speed and high speed), engine start-up and shut-down, idling time, number of stops or any others including as described herein which can be used to enforce driving policy and curb unwanted behavior like excessive speeding, tardiness and extended vehicle idling.

A description of systems and methods for accumulating and presenting data for GPS data for a fleets and vehicles, including for operational metrics and trends, can be found in U.S. patent application Ser. No. 13/097,689 entitled SYSTEM AND METHOD FOR PROVIDING VEHICLE AND FLEET PROFILES AND PRESENTATIONS OF TREND, the entirety of which is incorporated by reference herein.

Figure 6B:
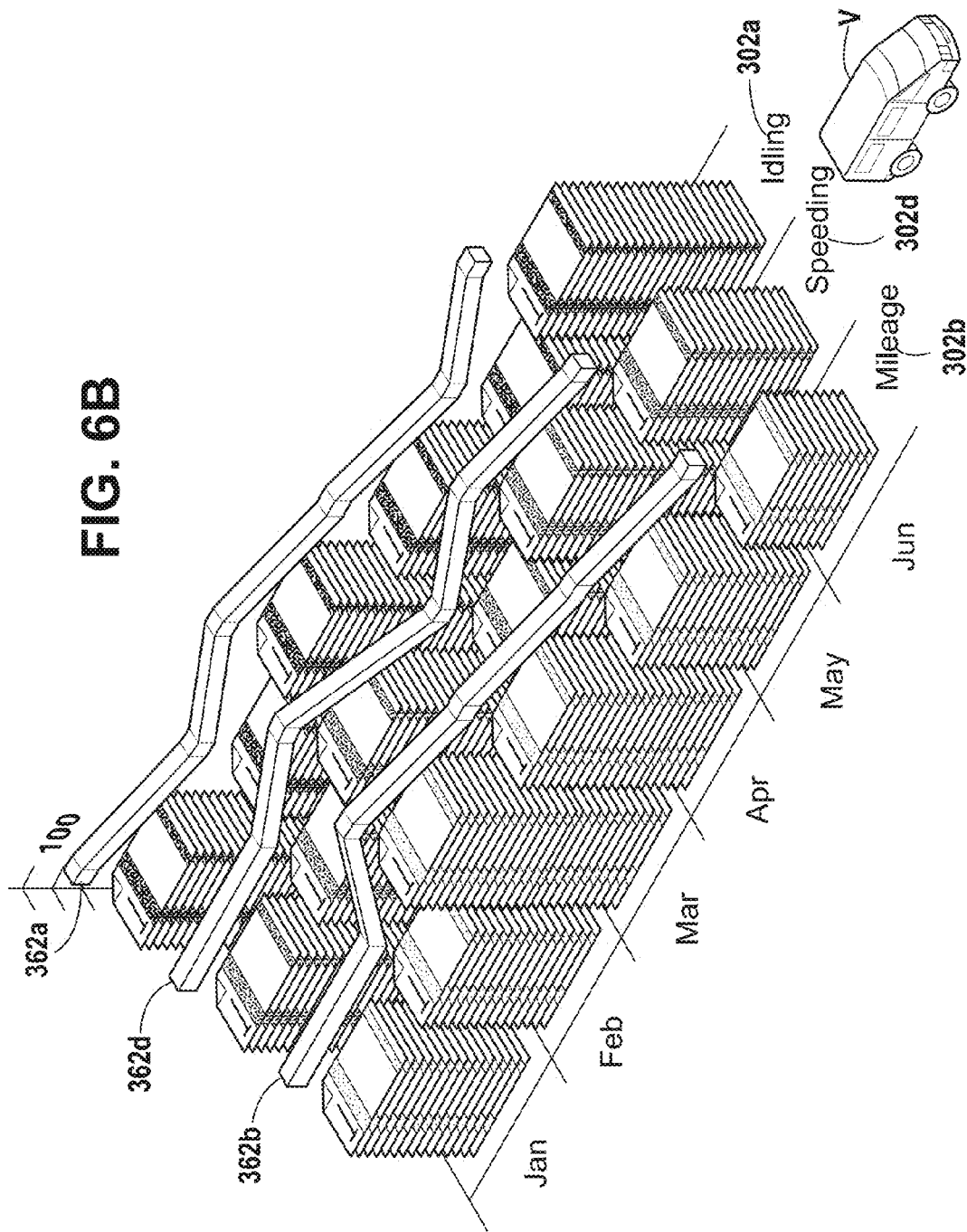

FIGS. 6A-6C shown a graphic flow for analyzing received GPS event data and GPS data stored over time to identify, report, and display trending. As shown in FIG. 6A, GPS event data for each vehicle, which as described herein include information associating each GPS event with a driver, is gathered over a period of time. The data is analyzed for over time (shown over 6 months) derive operational metrics 302, for example, mileage 302b, speeding, 302d and idling 302a. Trending can also be derived and displayed for other operational metrics as described herein, including speed severity 302h, speed violations 302i, number of stops 302g, or other such metrics as are or become available using data from GPS events and external databases. Such data can be analyzed for each month to identify statistics for each operational metric, for example, for each vehicle or employee, as well as to derive statistic for the fleet (e.g. averages under each operational metric, or averages for defined groups under each metric). Such data can be collected and stored indefinitely.

As shown in FIG. 6B, the analyzed historical event data for each operational metric 302 shows trend data 362, for example, the performance of a vehicle/driver v over the 6 month period, for example, a mileage trend 362b, a speeding trend, 362d and an idling trend 362a for each month. As shown in FIG. 6C, the trend data 362 for each operational metric can then be extrapolated from the GPS event data. This trend data is extrapolated for each vehicle in a fleet, as well as for each employee, and can be used in conjunction with other databases to provide trending and statistical data as described herein. Trend data includes not only the direction in which performance and behavior move under operational metrics, but also identifiable changes in those movements and comparisons therebetween, as well as statistical data drawn from GPS data and other databases, as described herein.

In one embodiment computer system the GPS event database includes a peer comparison database including peer comparison data associated with the vehicles. The system also includes a credibility criterion. The GPS event data includes location information for the vehicle, which is stored in the GPS event database. Operational metrics for the GPS event history are derived for a trend including a trend for peer comparison. A representation including a representation of the peer comparison for at least one operational metric can then be provided to a graphic user interface. The operational metric can include metrics described herein, including those selected from the group of engine on/off, vehicle mileage, idling, speed, performance against a criterion, employee performance; driver behavior; industry segment performance, geographical area performance, and fleet performance. In one embodiment the peer comparison data comprises geographic data associated with the vehicles; and industrial data associated with the vehicles.

In one embodiment, the computer system comprises: a threshold credibility criterion for GPS event data used for a peer comparison. Data acquisition is as follows. GPS event data is acquired and stored from GPS devices with vehicles as described herein. GPS event data for the vehicle is associated with a peer comparison parameter. When GPS data for a statistically significant number of vehicles for a peer comparison parameter is reached, the system can then elevate that peer comparison metric for display for a user. Both previously stored historic GPS event data can be associated with a parameter, as well as incoming GPS event data.

In one embodiment the threshold criterion for statistical significance of peer comparison is a Standard of Full Credibility of at least 1,082 vehicles. This number indicates a 90% probability (P) that estimate is within tolerance K=5% of a true value. The Standard of Full Credibility is based on a unique vehicles count for a period of time. In one embodiment, the period of time is a calendar month, excluding a current day (as described in more detail below). The criterion can also include a maintenance credibility criterion. For example, after the threshold criterion has been met in a given period, the system can be configured to maintain showing peer comparisons for users in subsequent periods so long as the maintenance criterion is met. In an embodiment, a maintenance criterion can include a Minimum Criteria of at least 60% of the threshold criterion, for example, a Standard of Full Credibility (SCF)=390 vehicles.

Processing frequency as in one embodiment is now described. The computer system creates a periodic record of the GPS event data stored for the vehicle. For example, in one embodiment, GPS event data as received and processed daily. The system can further process the data to show an average operational metric for a plurality of the vehicles over a period of time, for example monthly or quarterly averages on trending of operational metrics. In one embodiment, peer comparison average values are updated as follows, in a "Current Month," current month values will are updated with daily processing A Current Month can begin to be published starting with a given day, for example day 7 of a week. Filter criteria can be applied to, for example round out to a week or to offset for holidays and weekend, as described below.

As explained herein, previously stored historic GPS event data can also be associated with a parameter. In one embodiment, historic peer comparison values are processed. In "Historic Months," Historic month values do not change once published at month-end. Month-end final average values will be reviewed before they are published to prevent illogical values. In one embodiment, once a decision has been made to make available a specific peer comparison for a Historic Month(s), at the point of initial elevation there are published at least 3 data points (3 monthly averages) to make trending comparisons relevant. After a peer comparison has been elevated, monthly averages will be published without any gaps even if the number of vehicles during a month falls below the maintenance criteria (e.g. the Minimum Criteria described above).

In one embodiment the computer system comprises a filter criterion such as a filter rule. For example, in an embodiment the system comprises a filter rule and/or includes an outlier exclusion. The filter criterion can be configured to filter any periodic records meeting a filter criterion.

In one embodiment, a filter rule excludes vehicles from the criterion calculation. For example, in an embodiment, a rule excludes outlier vehicle-day records from a monthly average calculation. For example, a rule is configured to exclude vehicle-day records where a vehicle drove very little or too excessively relative to a vehicle Mean for the month. In an embodiment, a Local_Ratio of vehicle-day driving is used as the MEAN metric; which gives a measure of meaningful driving and considers both driving radius and mileage (mileage/"Distance_Between_POINTS": i.e., which tends to exclude excessive long range or very short driving using a Local Ratio concept.

Figure 5A:
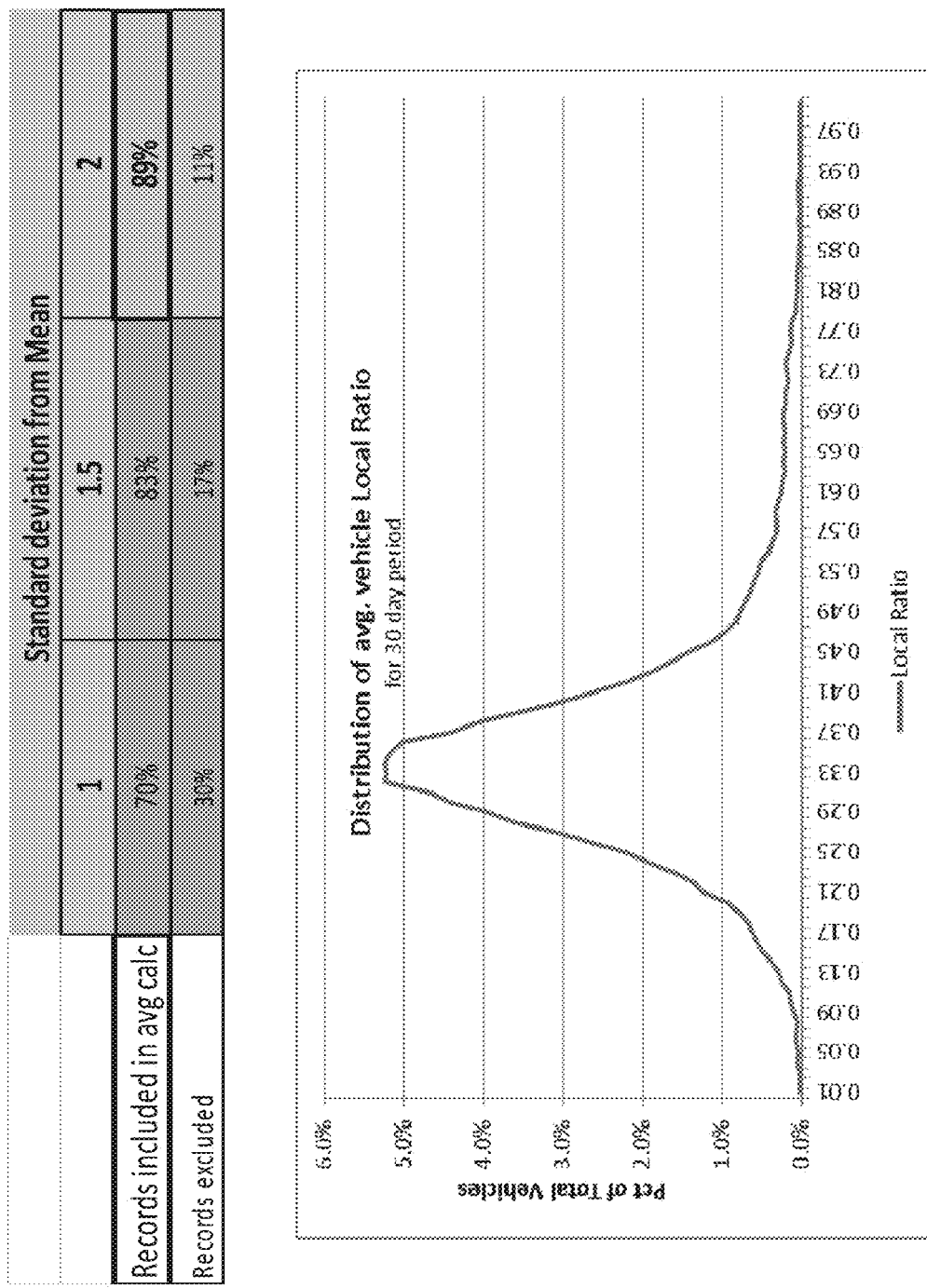
FIGS. 5A-B depict a graph and table for determining a Standard Deviation from mean for vehicle inclusion.
Figure 5B:
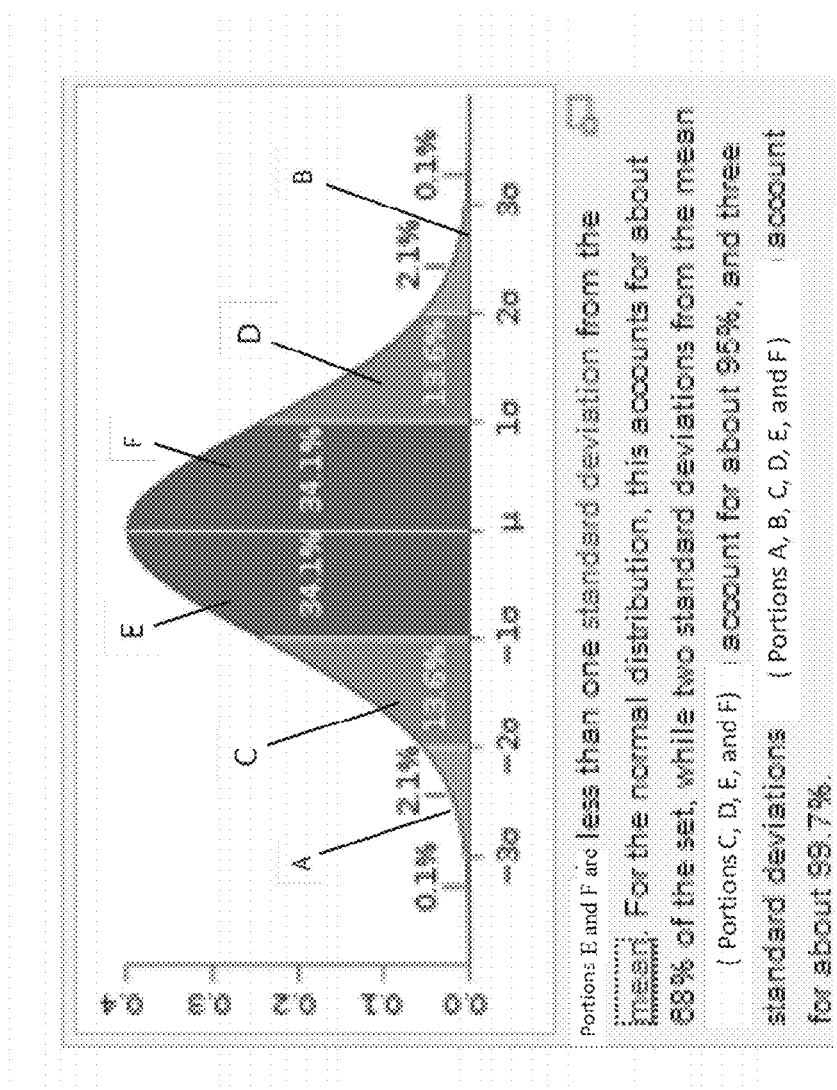

Filter rules can exclude periodic records (described below) based with the following attributes: Idle time— vehicle-day records with more than 10 hours of idle time; and On/Off engine—vehicle-day records with more than 20 hours. An outlier calculation is configured as follows: On a daily basis, for Current Month obtain a "Local Ratio" values for each available vehicle-day that passes the Filter Rules. For Current Month—if available, use the vehicle-day mean and standard deviation calculated at end of previous month (as described herein); else, if there is no mean and standard deviation available use all records from current month (i.e., for a new or seasonal business). At month-end the MEAN and Standard Deviation for Local Ratio for all the observations available for the month are calculated for vehicles that had at least 5 days of driving activity Outlier records that have Local Ratio greater or less than 2 STD DEV from the Mean; around 89% of records would still remain in the dataset, as shown in FIGS. 5A-5B.

For example, in one embodiment, a rule engine is configured as follows:

Stage 1
01. Does company want to share data? (Default—Yes)— User table flag check.
02. Local Ratio>1Local Ratio=Null
03. Idle Time>10 Hours
04. Engine On Time>20 Hours
If a periodic summary fails any of the above, the vehicle day summary is not included, and the analysis moves to the next vehicle.

Stage 2
01. Check last month's number of days≥5 (if the vehicle summary fails this one, it is to be included in the statistically significant sample.)
Finally, the local ratio is compared with last month's mean. If a daily record is 2 STD outside of the mean it is excluded. Otherwise, the vehicle is included in the count.

In one embodiment the system is configured to identify a trend for an operational metric for the plurality of vehicles, the operational metric including an operational metric selected from the group of engine on/off, vehicle mileage, idling, speed, performance against a criterion, employee performance; driver behavior; industry segment performance, geographical area performance, and fleet performance. The computer system is configured to identify at least one trend for a peer comparison for the operational metric from the periodic records. The peer comparison includes a peer comparison metric. The peer comparison metric includes a peer comparison parameter selected from the group consisting essentially of a geographical parameter and an industrial parameter.

In an embodiment the industrial parameter is an industrial segment. Exemplary industrial segment data is data associated with a vehicle, such as an SIC code associated with a fleet of vehicles. For example, the system can be configured to the use an SIC match to associate vehicle activity with a specific Industry Segment. In one embodiment, the system includes a number of different industry segments. For example, as shown in Table 2, the system includes 12 different Industry Segments & All Industries combined. However, as will be understood, industry segment definitions can include and be further broken down into subspecies or combined into broader genus or parent segments to process accumulated GPS event data.

TABLE 2

| | INDUSTRY SEGMENT |
|---|---|
| 1 | 1. Plumbing, Heating, Air-conditioning |
| 2 | 1. Electrical Work |
| 3 | 1. Disinfecting and Pest Control Service |
| 4 | 1. For-Hire Truck, Except Local |
| 5 | 1. For-Hire Truck, Local |
| 6 | 1. Landscapers |
| 7 | 2. Delivery |
| 8 | 2. Home & Business Field Service |
| 9 | 2. Passenger Transportation |
| 10 | 3. Contractors Heavy |
| 11 | 3. Contractors Light |
| 12 | 3. Specialty Transport |
| 13 | 4. All industries |

In an embodiment a periodic record is created of the GPS event data stored for the vehicle, and an industry segment identifier associated with the vehicle is linked to the periodic record. A plurality of the periodic records for vehicles are processed to determine if a number of vehicles meets a credibility criterion for a peer comparison analysis. For example, periodic records such as daily summary records are linked to an SIC code, and that SIC code is matched to a single industry segment. In one embodiment, a single SIC code comprises its own peer comparison industry segment, however, it may also be linked to a broader "Parent" industry segment for use (e.g., for later use). For example, an SIC code SIC 1711 "1. Plumbing, Heating, Air-conditioning" is one of the 12 industry segments identified in Table 2, but it could also be linked to a broader "Home & Business—Field Services," to be used for a geographical area, such as a state or region as described below, for present or later use. A broader industry segment can be defined by and/or configured to cover a number of "species" industry segments, such as a plurality of SIC codes.

In one embodiment, a filter criterion excludes vehicles from the criterion calculation. For instance, in an embodiment, a rule excludes outlier vehicle-day records from a monthly average calculation, as described above.

In an embodiment a periodic record is created of the GPS event data stored for the vehicle, a bounding area is associated with the periodic record of the GPS event data for the vehicle and a geographical area associated with the bounding area is identified. An industry segment identifier associated with the vehicle to the periodic record and a plurality of the summary records are processed to determine if a number of vehicles meets a credibility criterion for a peer comparison analysis.

For example, a location is determined for each vehicle for each day. The location (state or region) for that day should be what is used and rolled up when obtaining a value for a particular Region or State. The value that is stored with each record is a shape file, for example, a rectangle of lat/long coordinates of a bounding box of the vehicle's activity for that day. From that rectangle a center point to use and find the particular geographic Region or State for that vehicle. A determination is made whether the lat/long coordinates are inside the shape file. Default rules can be implemented for illogical results, as for example if the lat/long coordinates of the bounding box of the vehicle's activity for that day are within a body of water, then the system can be configured to default to a physical address for the geographical area (State or Region).

In one embodiment, the specific geographic areas used for comparison include 5 regions and 6 large states. For example, as shown in FIG. 3T, shows for "Regions" that there are 5 regions: North East, South East, South Central, Midwest and West, and for "States" there are 6 large states anchor the regions: CA, TX, FL, NY, NJ, IL For example, regions and states for the accumulation, processing and presentation of GPS event data can be as shown in exemplary Table 3 shown below.

TABLE 3

| State | St_cd | Region |
|---|---|---|
| Alabama | AL | South East |
| District of Columbia | DC | South East |
| Delaware | DE | South East |
| Florida | FL | South East |
| Georgia | GA | South East |

TABLE 3-continued

| State | St_cd | Region |
|---|---|---|
| Maryland | MD | South East |
| Mississippi | MS | South East |
| North Carolina | NC | South East |
| South Carolina | SC | South East |
| Tennessee | TN | South East |
| Indiana | IN | Midwest |
| Michigan | MI | Midwest |
| Ohio | OH | Midwest |
| Wisconsin | WI | Midwest |
| Arizona | AZ | West |
| Colorado | CO | West |
| Idaho | ID | West |
| Montana | MT | West |
| New Mexico | NM | West |
| Nevada | NV | West |
| Utah | UT | West |
| Washington | WA | West |
| Connecticut | CT | North East |
| Massachusetts | MA | North East |
| Maine | ME | North East |
| New Hampshire | NH | North East |
| New Jersey | NJ | North East |
| New York | NY | North East |
| Pennsylvania | PA | North East |
| Rhode Island | RI | North East |
| Vermont | VT | North East |
| Arkansas | AR | South Central |
| Louisiana | LA | South Central |
| Oklahoma | OK | South Central |
| Texas | TX | South Central |
| Washington | WA | West |
| Connecticut | CT | North East |
| Massachusetts | MA | North East |
| Maine | ME | North East |
| New Hampshire | NH | North East |
| New Jersey | NJ | North East |

In one embodiment, the system is configured to provide peer comparison metrics including a peer comparison parameter selected from the group consisting essentially of a geographical parameter and an industrial parameter. For example the system can be configured with an Industry Segment-Geography Switchboard. Separate switchboards can be made for different countries or geographical areas.

Based upon the credibility analysis described above, Industry Segments can be activated when enough vehicles meet a credibility criterion. For example, as shown in FIG. 7, industrial segments are active for peer comparison for specific large States and Regions. In one embodiment, all Industry Segments will be turned on for both the large States and Regions, with certain exemptions. The exceptions are "For Hire Truckling Local and non-Local" are not available for states because these are segments with regional profiles; all Regions and FL (the only state) have available the Disinfecting and Pest Control Service segment; and all Regions and FL, NJ and NY will have available the "Passenger Transportation" segment.

FIG. 3L shows one example of a detailed trend report 355 for a fleet and employees from trending analysis as described above, including a peer comparison. As will be understood, the trending analyses can be shown with or without peer comparison options in various embodiments.

As shown, a "Trending" page could be accessed, for example, in a page from the "Dashboard." The trending 355 is an "Average Speed" report 355 for the average speed 302e for at least one fleet group 357 over a time period 364, for example 3 months, 6 months, a past year, a selectable year (e.g. 2010, 2011) or "all" (e.g. a full time period for which data was collected for a given user). It will be noted that the time period available to a given user depends on how much GPS event data stored for the fleet for that user. For example, a user whose fleet data is collected starting Jan. 1, 2011 would not have options for data before that time.

A drop down menu 359 is configured to allow a user to select any number of operational metrics 302 as described herein, for example Average Speed 302*e*, Distance Travelled 302*g*, Engine On/Off 302*a*, Vehicle Idling 302*c*, High Speed 302*d*, Number of Stops 302*f*, or Average Speed 302*e*, Speeding Severity 302*h*, and Speeding Violations 302*i*. While a fleet group 357 is shown as "entire fleet," a fleet group can include any subset of drivers and vehicles, and can be configured to allow a user to set up custom groups a fleet. For example, a user may have fleets for different geogmphical locations (e.g. a Bronx Fleet, Brooklyn Fleet, Queens Fleet, a New Jersey Fleet, a Dublin Fleet etc.) then the groups can be so defined. GPS data can then be filtered and analysed for this group for drivers and vehicles within in the group selected in the manner described above. The system can also be configured to permit a user to view the type of statistical data within the operational metric For example another drop down menu 364 allows a user to select either "Averages" or "Totals." The graphs can represent either totals across the fleet or subset selected, or non-zero averages across the fleet. A non-zero average discounts, for example drivers who had no data for the period, e.g. for fleets who have added new drivers and vehicles or decommissioned driver and vehicles periodically in their contract.

As shown in a graph 358 in a top portion of the user interface 355, a fleet report for entire fleet 364 breaks down the average speed for all drivers in a fleet for that year 364 by each month (May, 2010 356-5, June 2010 356-6 . . . April, 2011 356-4). As shown, the months are along and x-axis whereas the speeds (from 0-10 mph) are along a y-axis. Each of the bars 356-5, 356-6 . . . 356-4 along the y-axis show average speed for each month. Bars 356 can be colored to convey information, for example, bar showing the month with the highest average speed 356-9 of about 9 mph, is a different color (e.g. blue) than the bars for the other months (e.g. green).

The trend data can include operational performance against at least one criterion, the at least one criterion including a criterion selected from at least one of: a user-configurable criterion; a criterion derived from GPS event data; a criterion derived from data other than GPS event data; a criterion derived from traffic data; and a criterion derived from peer comparison data. As shown, the system is configured to show a peer comparison metric, which can be used as a criterion or benchmark.

While such a criterion can be derived from GPS event data from the fleet from that user, it can also be derived from other data such as industry standard data derived from, for example GPS data of other users or external databases that hold data related to operational statistics as described herein. Incorporating peer comparisons into the trending information allows a user to compare the performance of a fleet to that of an industry or geographic region/type in the same manner as comparing a driver to the overall fleet. A user would thereby be able to compare a group of drivers, individual drivers, and an industry or geographic region.

In one embodiment, the system is configured to provide a peer comparison as described above. Positioned below a trending graph is an interface 371 providing options for comparing the trending that has been chosen for an Industry or Geographic region/type that is selected from dropdowns.

An "Industry Type" dropdown 370 provides a user with the ability to select an Industry they wish to use for the comparison. The options in this dropdown can include: "All Industries"—an option that allows the user to only select a Geographic region/type if desired. A list of Industries that should be available depending upon Industry selected is shown in FIG. 3L, as described herein.

A "Geography" dropdown provides a user with the ability to select a geographic region/type to use for the comparison. In an embodiment, this option can be used in addition to the Industry selection or as a stand-alone option (for example if "All Industries" is selected). The options in this dropdown include a combination of regions as well as types. There may be some separators used within the list to distinguish regions from types. An "All Regions" option allows a user to only select an Industry to compare. In an embodiment shown at FIGS. 3L-3M a list of Geographies are available depending upon the Industry selected. In certain embodiments, not all Geographies will be available for each Industry segment. Therefore, the Geography dropdown 372 should be sensitive to the Industry that was selected in the first dropdown. Only the Geographies that are available for the Industry that was selected should be shown.

In an embodiment, between the Industry and Geography dropdowns is a "switch" icon (for example, arrows going left and right), that when clicked would switch the two drop downs allowing the user to first select a Geography and the Industry dropdown would be sensitive to what was selected as a Geography. Once the user has selected the Industry and/or Geography they desire, they can click the "Apply" button to have that information populated in the Trending Graph and adding to the Ranking List.

As shown in a graph 358 in a top portion of the user interface 355, a fleet report for entire fleet 364 breaks down the average speed for all drivers in a fleet for that year 364 by each month (May 2010 356-5, June 2010 356-6 . . . April, 2011 356-4). As shown, the months are along and x-axis whereas the speeds (from 0-10 mph) are along a y-axis. Each of the bars 356-5, 356-6 . . . 356-4 along the y-axis show average speed for each month. Bars 356 can be colored to convey information, for example, bar showing the month with the highest average speed 356-9 of about 9 mph, is a different color (e.g. blue) than the bars for the other months (e.g. green).

At the bottom of the trend report 355, a fleet report 335*c* similar to the fleet reports 335*a*, 335*b*, 335*c*, 335*d* in FIG. 3A shows ranked speeds for the drivers in the group 357 in the month with the highest average speed 356-9 in the graph 358 in a top portion of the user interface 35. Each driver D1, D2 . . . Dn is ranked from highest to lowest for that month, with bar graphs for miles per hour for each driver shown along the x-axis and rank from highest to lowest in along the y-axis. The display could be configured to allow a user to select any month for a breakdown.

Within the Ranking List of drivers shown below the graph, the Industry and/or Geography that a user selects can be added as a ranking graphic 380 in the correct ranking position. The system is configured such that if the Industry and/or Geography ranking graphic 380 (e.g., Field Services, New York) has a value that is the fourth highest compared to the drivers in that fleet, then the ranking graphic 380 should be in the fourth position of the list and should resemble a driver or daily average as it appears in the list, but distinguished from the other rankings D1, D2 . . . Dn by a distinguishing indicia, such as being in a different color or highlighted. In one embodiment, the color of the ranking graphic 380 can match the color in the peer comparison trending graphic 376 overlay in the graph. The system can be configured to allow a user to remove the graph from the chart, as for example with a "Remove from chart" link 374 to the right of the "Graph" button 374 that removes both the graph as well as the item from the Ranking list.

The trend data can include operational performance against at least one criterion, the at least one criterion including a criterion selected from at least one of: a user-configurable criterion; a criterion derived from GPS event data; a criterion derived from data other than GPS event data; a criterion derived from traffic data; and a criterion derived from industry data. FIG. 3J shows at 390 another example of trend report and alert based on a trend analysis. As shown, a "Stories" 390 report shows that in a fleet of vehicles, 202 drivers had more than 20 high speed events in a given month, whereas the industry average is 7 per month. As shown, the alert 390 shows, based on a criterion derived from the GPS event data, which shows that the Trending for the operational metric is high 391. While such a criterion can be derived from GPS event data from the fleet from that user, it can also be derived from non-GPS event data such as industry standard data derived from, for example GPS data of other users or external databases that hold data related to operational statistics.

In the embodiment shown in FIG. 3L a Trending Graph 358 is shown including a peer comparison trending graphic 376. The peer comparison graphic trending 376 can be overlaid on top of the trending graph for the fleet. In an embodiment, the color used for the overlay matches the color used for an "Apply" or "Graph" button 374 within the peer comparison selection, although other graphics or identifiers can be used to correlate the overlay with the peer comparison selection area.

In one embodiment, the system is configured such that a user can add only one graph 376 to the chart 358 for peer comparison. The system is configured such that when a user selects a different option within either of the dropdowns 370, 372, the existing graph should be replaced with one for the new selection.

FIGS. 3L and 3M show examples of a detailed trend report 355 for a fleet and employees from trending analysis as described where the trending includes a peer comparison. As shown, a "Trending" page could be accessed, for example, in a page from the "Dashboard." In FIG. 3M the trending 335 is an "Distance Travelled" report 335 for the average mileage 302b for at least one fleet group over a time period 364, for example 3 months, 6 months, a past year, a selectable year (e.g. 2010, 2011) or "all" (e.g. a full time period for which data was collected for a given user). It will be noted that the time period available to a given user depends on how much GPS event data stored for the fleet for that user. For example, a user whose fleet data is collected starting Jan. 1, 2011 would not have options for data before that time.

At the bottom of the trend report 355, a fleet report 335e shows a ranking list 335e ranked daily average mileages of the fleet 357 in a given month (April 2011). Each day d1, d2 . . . dn is has bar graphs for averages for daily distances for the fleet shown along the x-axis. The display could be configured to allow a user to select any month for a breakdown.

Similar to the description above, within the Ranking List of vehicles shown below the graph, the Industry and/or Geography that a user selects can be added as a ranking graphic 380 in the correct ranking position. The system is configured such that if the Industry and/or Geography ranking graphic 380 has a value that is the fourth worst compared to the drivers in that fleet, then the ranking graphic 380 should be in the fourth position of the list and should resemble a driver or daily average as it appears in the list, but distinguished from the other rankings d1, d2 . . . dn by a distinguishing indicia, such as being in a different color or highlighted. In one embodiment, the color of the ranking graphic 380 can match the color in the peer comparison trending graphic 376 overlay in the graph. The system can be configured to allow a user to remove the graph from the chart, as for example with a "Remove from chart" link 374 to the right of the "Graph" button 374 that removes both the graph as well as the item from the Ranking list.

In one embodiment, an "Average per Day" sub-metric is configured to allow a user to see Trending based on the average per day per driver or whichever metric is selected. As shown in FIG. 3N a sub-metric dropdown includes an "Average per Driver" and "Average per Day" options.

In an embodiment, if summarized data is a row for each day for each driver, then the Average per Day value can be found by getting the average value for each metric. The system is configured such that if a driver does not have any driver activity for that day, then that day is not included. If, however, a driver does have driver activity, but the value for that particular metric is 0 (e.g. 0 for idling if the driver did not idle), that 0 value is included.

In an embodiment including an Average Speed metric, the data is the same as that of "Average per Driver" and "Average per Day." Accordingly, the system can be configured to include an "Average per Day" option in the dropdown have the data be the same for both "Average per Day" and "Average per Driver." In an embodiment, the option is not removed from the dropdown when "Average Speed", as that causes the selected sub-metric to change as the driver metric changes.

Described are calculations for the Industry/Geography Segment for the various sub-metrics.

In an embodiment, data points are used from both the segment comparisons that are being calculated on a periodic basis as well as GPS event data being transmitted for a given user's fleet.

Segment data points include average per vehicle per day for industry/geography segment. A given fleet's data points include total number of active unique vehicles for that fleet, and total number of vehicle days for that fleet (i.e. the number of rows). The average number of days a vehicle from a fleet was active in that month is found by taking the total number of vehicle days for that fleet divided by the total number of active unique vehicles for that fleet.

For the "Average per Day" the average per vehicle per day calculated for the industry/geography segment that was selected is used. The Average per Vehicle is calculated by taking the [Average per vehicle per day for selected segment] times [Average number of days a vehicle from that customer was active in that month]

Figure 8:
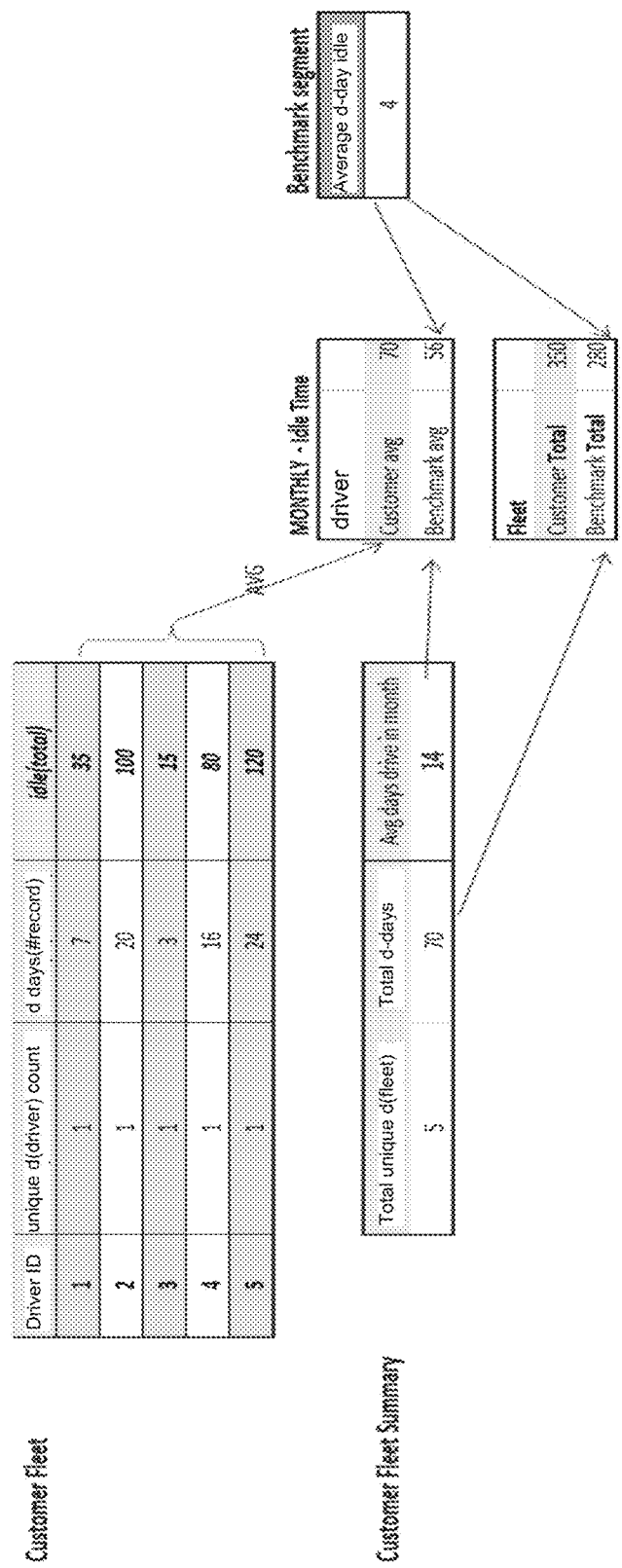
FIG. 8 depicts a flow for fleet benchmarking.

Exemplary benchmark input for the Average Vehicle-Day value is shown at FIG. 8. As shown at FIG. 8, a total is calculated by taking the [Average per vehicle per day for selected segment] times [Total number of vehicle days for that fleet (i.e. the number of rows)]. As the Average Speed metric is viewed as the average per vehicle, the Peer Comparison value is the same for each of the three sub-metrics and it would always show the average per vehicle.

In another embodiment, the system is configured to allow users to set defaults and contribute to peer comparisons. As shown in FIGS. 3S and 3T pages can be created allowing the user to setup a default Industry and/or Geographic Region/Type that will be used as context in other areas when the user is setting company parameters. For example, in an embodiment a page could be set up which describes peer comparisons and how they can be used within the application. In an embodiment, the page can include a number of buttons, allowing the user to toggle between selecting an industry and a Geographic Region/Type. The Industry area can include a graphic such as a picture or identifier for the common vehicle type that goes along with each of the different Industries. For example, mousing over each industry highlights that industry in yellow and shows a floating box that describes the industry and the SIC codes within that industry. For each company parameter that is shown in the application, a horizontal scale can be used to control and set the value. In one embodiment, a Peer Comparison that that the user chooses can be shown as a vertical tick mark with a label underneath it stating that is the peer comparison. The page(s) can offer options to opt-in or out to providing GPS data for the industry or region.

Other metrics may be included, such as indications of speeding incidents (severity, violations, thresholds), or fuel related metrics.

In another embodiment, the system is configured to integrate peer comparisons into a fleet's drivers operational parameters. GPS event data such as GPS-based accelerometer data can be collected as the system is implemented.

For example, in an embodiment a fleet's average idling duration can be compared to peers with using peer metrics as described herein. The number of drivers that are above and below the peer's idling duration can also be included. The fleet's average distance traveled can also be compared to peers using peer metrics. The number of drivers that are above and below the peer's distance traveled can also be included. Also the fleet's average hours worked in a day can also be compared to peers using peer metrics. The number of drivers that are above and below the peer's daily hours worked are included.

The fleet's average idling duration compared to peers using peer metrics. The number of drivers that are above and below the peer's idling duration can be included.

The fleet's average distance traveled compared to peers using peer metrics. The number of drivers that are above and below the peer's distance traveled can be included.

The fleet's average hours worked in a day are compared to peers using peer metrics. The number of drivers that are above and below the peer's daily hours worked can be included.

FIGS. 3O and 3P show other examples of a detailed trend report 360 for a fleet and employees from trending analysis as described above. The display shows a "head to head" analysis of two drivers d1, d2, each of which can be selected by drop down menus 360a, 360b, which can also be configured to be searchable. The head to head analysis can be selected using a drop down and/or searchable menu 361 for over any over a time period, for example 3 months, 6 months, a past year, a selectable year (e.g. 2009, 2010, 2011, 2012, 2013) or "all" (e.g. a full time period for which data was collected for a given user). Again, it will be noted that the time period available to a given user depends on how much GPS event data stored for each driver and/or vehicle. For example, a user whose fleet data is collected starting Jan. 1, 2011 would not have options for data before that time. Similarly, data would not be available for a given vehicle or driver for any time period where data was not collected from a GPS device associated with that user or driver. Once the drivers D1, D2 and the time period are selected, a user can, via an input 367, run the comparison. As described below, the trend report can be configured for a "head to head" comparison between a driver (or fleet) and a peer metric.

A top section 362 of the page shows a "versus" trend comparison, which presents graphics comparing a driver's D1 performance against a peer performance metric P (e.g., an industry segment and/or geographic comparison) under operational metrics 302 as described herein, for example: Engine On/Off 302a, Vehicle Mileage 302b, Vehicle Idling 302c and Average Speed 302e. As shown in FIG. 3O, each operational metric 302 includes a bar graphic 365, where the left-side 365d1 of the bar corresponds to one driver d1 and the right side 366P of the bar corresponds to another the peer metric P. A visual indicia for the bar, for example a color, is given for each the driver and the metric d1, P, which allows a user to readily compare performance trends and statistics under each operational metric 302 for driver d1 and the peer P metric for the time period selected (e.g., 2009). A text graphic 366d1 may also give statistical trend data. For example, as shown in FIG. 3O, driver d1 has under "Engine-On Time" 302a, a green color on the left-side 365d1 of the bar that is not as long as the peer performance metric P red color on the right-hand side of the bar 365P. Text graphics 366d1, 366P at the left and right hand extremes of the bar show respectively that driver 1's d1 engine-on time is 5,234 minutes 366d1, whereas the peer performance metric's P engine on time is 7,556 minutes 366P. In the example shown in FIG. 3P, driver d1 has under "Engine-Time" 302a, a green color on the left-side 365d1 of the bar that is again not as long as the peer performance metric's P red color on the right-hand side of the bar 365d2. In FIG. 3P, text graphics 366d1, 366P at the left and right hand extremes of the bar show respectively that driver 1's d1 engine on time for all years is 280,312 minutes 366d1, whereas the peers' P engine on time for all years is 298,498 minutes 366P. The statistics are given in the same layout for Vehicle Mileage 302b, Vehicle Idling 302c and Average Speed 302e, thus allowing a user to readily see and compare how the driver d1 and the peers P performed for the time period selected (e.g. the year of 2009, "all years").

A bottom section 363 of the page shows an XY graph which plots the statistics for each driver in increments for the "versus" trend comparison. Page tabs 368 for the graph report 363 allows the user to see XY graphs 363 for each of the operational metrics Engine On/Off 302a, Mileage 302b, Vehicle Idling 302c and Average Speed 302e. As shown in FIG. 3Q, Mileage 302b for a year is presented, whereas in FIG. 3P, Engine-On Time 302b for "all years" is presented. In FIG. 3Q, along the X-axis are increments of months, and along the Y-axis is vehicle mileage in 1000 minute increments. In FIG. 3P, along the X-axis are increments of years for "all years", and along the Y-axis is Engine-On time in minutes per month. The driver d1 and the peer performance metric P has a bar graph 364d1, 364P plotted along the XY axis showing their performance over time. A visual indicia for the bar, for example a color, is given for the driver d1 and the peer P, which allows a user to readily compare performance trends and statistics for the operational metrics 302 for the time period selected, and can be configured to correspond to the colors assigned to the driver and the peer performance metric in the top portion 362 of the report.

Also, one or more trend bar graphs can be added to show a comparison for at least one criterion, for example a criterion selected from: a user-configurable criterion; a criterion derived from GPS event data; a criterion derived from data other than GPS event data; a criterion derived from traffic data; a criterion derived from traffic data; and a criterion derived from industry data. For example as shown in FIGS. 3O and 3P, a fleet average bar 364 avg shows a fleet average performance for the operational metric 302 selected (e.g., Vehicle Mileage in FIG. 3Q, Engine-On Time in FIGS. 3O-3P). Accordingly, a user can readily see a comparison of a selected driver (or drivers) d1 and a peer metric P against one another (e.g. industry segment), and also as against the selected criterion or criteria such a fleet performance. In another embodiment (not shown), the criterion can be drawn from industry data as described herein, and the representation of the trend can be, for example, graphic presentations such as a bar graph shown showing performance against an industry benchmark derived from the industry data (e.g. industry averages for operational metrics as described herein, best-of-class industry averages, goals met/unmet vs. industry standards). For example, a graph could show an average of the top percent of industry performers for which there is industry data. The screen could also show goal benchmarks set by a user, as could be developed from industry data, and whether the drivers or fleet are meeting those goals.

As shown in FIG. 3Q and FIG. 3R, any number of vehicles or drivers D1, D2 . . . Dn can be added to the graphics to permit comparisons as described above. For example, FIG. 3Q shows a multi-driver graphic 365 where a user is presented with an XY axis 363 for the operational metric Mileage 302b for the year 2009, similar to those described above with respect to FIGS. 3Q-3R, which includes an input area 360a for adding as many drivers D1, D2 . . . Dn as a user desires, as well as allowing addition of one or more peer comparisons P1, P2.

As shown in FIG. 3Q, 3 vehicles/drivers D1, D2 and peer comparison P for "All Industries, New York" are compared for the year 2009. In another embodiment, the system can be configured to analyze GPS data and other criteria data (e.g., industry segment data) to allow for intelligent reporting. For example, as shown in FIG. 3Q, a text graphic 369 also shows the totals for all drivers selected, as well as a "Peak Period" which the month with the peak driving mileage (August 2009), as well as the monthly mile total for the vehicle/driver with the highest mileage that month (v1 with 8711.62 miles in August 2009). Thus the system thus shows trend data along with, for the drivers selected, the driver who was the largest cause. The system can be further configured to analyze the GPS event history for at least one driver's performance for at least one operational metric, identify a change in performance in at least one operational metric over a time period; provide, for the graphic user interface, the representation of the trend, the trend including a trend showing the change in performance for the operational metric.

FIG. 3R shows a multi-driver comparison graphic 390 where a user is presented with an XY axis 363 similar to those of FIGS. 3O to 3P and FIG. 3G for the operational metric "Idling" 302c for the year 2009. The graph plots the minutes spent idling for the "top 3" drivers D1, D2, D3 for the year 2009. Also shown are two peer comparison trending graphics, "All Industries, New York" P1 and Field Services, New York" P2. As will be understood, the comparison 390 may show either the least amount of minutes spent idling, which is a positive performing statistic, or the "top 3" could be configured to show those in the fleet with the highest minutes spent idling, which would be a negative performing statistic. A text graphic 369 also again shows the totals for the top 3 driver, as well as a "Peak Period" which the month with the peak idling time (September 2009), as well as the idling minute total for the vehicle/driver with the highest idling minutes that month (v3 with 11,349 mins. in September 2009). Thus the system thus shows trend data along with, for the top 3 drivers, the driver who was the largest cause.

In another embodiment, system can be configured to proactively generate reports or alerts based on, inter alia, analyses of GPS event data and non-GPS event data as described herein. The system can be configured to analyze the GPS event history for at least one driver's performance for at least one operational metric, identify a change in performance in at least one operational metric over a time period; provide, for the graphic user interface, the representation of the trend, the trend including a trend showing the change in performance for the operational metric. For example, in a current time period where GPS vehicle data is showing that an operational metric is trending above or below from a prior time period, the system can be configured to report and/or alert the user. For instance, in a current month where idling is up X % over the prior month, the system can be configured to deliver an alert showing the total idling for the present month and the vehicle(s)/driver(s) with the highest idling minutes that month, thereby pinpointing a cause. Similar alerts could be configured for any operational metric, (average speed, mileage, speeding, etc.) and for any time period (day, week, month, quarter, year, etc.) Comparisons could be run on other bases as well, for example, a delta for an operational metric from another time period (e.g., idling is up or down X % from the same month of the previous year, or the same week of the previous month, etc.) Such analyses can be performed for a single driver up to an entire fleet.

Criteria developed from GPS event data and non-GPS event data such as industry data or historical GPS event data can be used to develop criteria to configure such benchmarks. For example, where historical GPS data and/or industrial data show peak periods for certain operational metrics, a higher percentage threshold could be established before sending an alert than in a non-peak period. The system could also be adapted to incorporate goal benchmarks, and to alert a user when a driver is or is not meeting or exceeding benchmarks.

In another embodiment, the system can be configured to develop criteria using industry data from industry databases and/or historical GPS event data. For example, industrial and/or historical GPS data may show driver or fleet performance metrics and trends for given operational metrics. The system can be configured to facilitate a user in understanding and developing internal goals as against benchmarks developed from industrial and/or historical GPS data. For instance, the system could be configured to alert the user that it should set up an idling report for a given driver/vehicle, or that a mileage report should be set up for the fleet, based on the trending data from past performance.

In another example, the system could be configured to allow the user to set monthly fleet goals for a plurality of operational metrics. In setting each goal, the system could send a facilitating message, alerting the user as to how the goal compared against a criterion such as an industry benchmark from industrial data and/or a benchmark based on historical GPS event data. For example, a user enters a goal for the fleet in a goal entry field (not shown) of keeping average minutes per driver for idling in a peak month to 5000 miles. The system can be configured to access historical GPS data and industry data to compare that goal against industry benchmarks and send a facilitating message, such as: "Only X % of fleets keep average idling per driver under 5000 miles." Analysis of fleets and drivers for that use can be filtered by any number of factors to target the goal-setting benchmarks, for example, by geographical region or other relevant filtering data. (e.g. state, city, zip code, service area, comparable cities), fleet size, types of vehicles (truck, car, vehicle class), operational period (year, month), type of business (food delivery, furnishings delivery, package delivery), and so on. The system can further be configured to allow such goal settings for fleet subsets or selected drivers.

As will be understood, as more GPS data events are accumulated, accuracy and options for reporting can become more robust as well.

As explained above, any of the presentations above could be configured such that criteria trend graphics can be added to show a comparison for at least one criterion as described herein (e.g.: a user-configurable criterion; a criterion derived from GPS event data; a criterion derived from data other than GPS event data; a criterion derived from traffic data; a criterion derived from traffic data; and a criterion derived from industry data).

In one embodiment, the computer system is configured to identify a trend for at least one operational metric for a first period; provide a criterion for the operational metric; identify a trend for the at least one operational metric for a second period; compare the trend for the first period against the second period to identify a change of performance for the trend; and determine if the change of performance for the trend meets the criterion. For instance, a user could identify a trend of high idling (e.g. up 7%) for a given month, and set a criterion for idling. For example, the user may input a benchmark of reducing idling by 5%. The system could then analyze GPS data to identify the idling trend for the following month, and determine if the fleet idling is or is not meeting the 5% reduction. As will be understood, the data can be provided over any selected time period(s), per driver/vehicle, a select set of drivers, fleetwide, and for any operational metric, and so on.

Figure 4A:
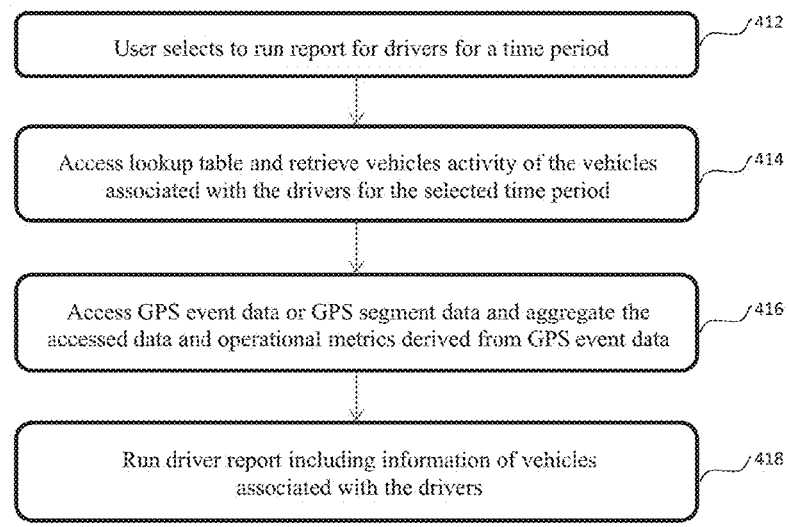

FIG. 4A shows a flow chart for a method of providing a driver report using GPS event data in accordance with embodiments as described herein. As shown in block 412, the user selects to run report for drivers for a particular time period. At block 414, the system accesses the assignment lookup table and retrieves vehicles activity of the vehicles associated with each of the selected drivers for the particular time period. At block 416, the system accesses GPS event data or GPS segment data, and aggregates the GPS event data or GPS segment data, or operational metrics derived from GPS event data. At block 418, the system provides driver report including activity of the vehicles associated with the drivers for a graphic user interface.

Figure 4B:
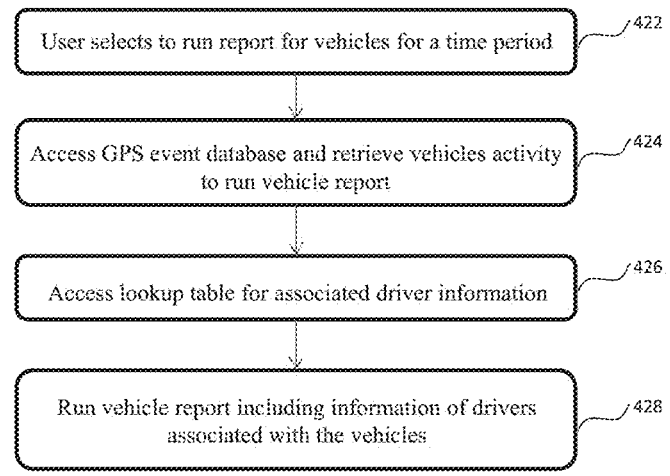

FIG. 4B shows a flow chart for a method of providing a vehicle report using GPS event data in accordance with embodiments as described herein. As shown in block 422, the user selects to run report for vehicles for a particular time period. At block 424, the system accesses GPS event database and retrieves vehicles activity to run vehicle report. At block 426, the system accesses the assignment lookup table to obtain associated driver information. At block 428, the system provides vehicle report including information of drivers associated with the vehicles for a graphic user interface.

FIG. 4C shows a flow chart for a method of presenting GPS event data for a graphic user interface, including in accord with embodiments as described herein. As shown in block 402, the system receives GPS event data transmitted from a plurality of GPS devices, each GPS device associated a vehicle. At block 404, the system stores, for each vehicle, in a memory operatively coupled to at least one of the processors the GPS event data over an operation period. At block 406, the GPS event data is analyzed to derive a plurality of operational metrics for each vehicle. At block 410, the system provides, for a graphic user interface, an interactive display configured display a representation of at least one operational metric for each of a plurality of vehicles.

In one embodiment the system is can be configured to correct GPS event data to provide accurate tracking data for a vehicle. The system corrects, using at least one correction algorithm, GPS event data from a vehicle. At least one correction algorithm, when executed comprises identifying at least one GPS location event for a vehicle 407, and then as shown at step 408 determines if the event is accurate for the vehicle. In one example, up to date mapping may place the vehicle in an impossible or inaccessible location, such as on the top of a building or in the middle of a body of water with no nearby bridge or road. In such a case, the event is determined to be inaccurate, and the event data is corrected, for example, by excluding it from the tracking and reporting data, or by recalculating a trajectory from a prior position. In another example, a plurality of GPS location events for a vehicle can be identified, where, upon comparing at least one of the plurality GPS location events with a different one of the plurality GPS location events, it can be determined that at least one of the location events is inaccurate for the vehicle. For example, a GPS signal may indicate to the system that a vehicle distance from a prior position is too far (e.g., a 5 mile radius) from its prior position as reported 60 seconds prior and when accounting for the maximum possible speed for the vehicle, or some other criterion. Or, in another example, a series of GPS signals may shown for events that the next signal, if in the next 60 seconds, must be in a range (e.g., a 0-3.5 mile radius from the prior point), and if the signal is not in that range, the GPS event is false. In such a case, the event data is corrected, for example, by excluding it from the tracking and reporting data, or using some other correction recalculation.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

The system can also be configured to provide mapping and tracking functions, as described above. The system can be configured to interface with mapping systems, for example, such as Google Maps. Also see U.S. Pat. Nos. 4,974,170, 5,682,525 and 6,148,260, the entirety of each of which is incorporated by reference herein. The system can also be integrated with systems to able to get real-time traffic information via the mapping in order to help drivers avoid traffic congestion.

In one embodiment, the system is configured to receive GPS event data for at least one vehicle; derive speed and location data from the GPS event data analyze the GPS event history database for the vehicle's historical GPS event data; compare the GPS event data and the event history against traffic data from a traffic database; identify a traffic condition for the location; and remodel at least one solution to optimize performance based on the traffic condition and the GPS event data. Remodeling the solution can include at least one of a time shift and rerouting the vehicle. For example, the system can receive GPS event data from a vehicle/driver, which sends location and speed information for that vehicle. For example, GPS event data signals that a vehicle V is moving slowly or stopped on Route 20 in Anytown, USA at 9:15 am. The system then accesses traffic data for Anytown, USA and GPS historical data for vehicle V against which to compare the GPS event data. Traffic data can show, for example the times at which the Route 20 is congested (7:30 am-9:30 am on weekdays), and the GPS historical data can show the times at which that driver starts and ends its daily operations (e.g., 7:30 am on Tuesdays). The system can then remodel a solution which allows the vehicle to avoid the traffic condition. For example, the system may indicate that if the vehicle V starts its weekday run at least 30 minutes later, it will avoid the congestion on Route 20. Or the system may reroute the vehicle along route that data analysis shows is less congested. The system can also be configured to combine such solutions (e.g., configure a route with a number of route changes and that starts 20 minutes later to avoid a number of congested areas, including Route 20). The system could be further configured to provide such road profiling and route profiling in the form of alerts and reports as described herein. For example, the system could, upon receiving GPS event data signaling that a vehicle V is moving slowly or stopped on Route 20 in Anytown, USA at 9:15 am, send an alert based on the analysis such as: "Vehicle 1 should start its Tuesday shift 30 minutes later (8:00 am)."

In another example, the system is configured to analyze GPS event data and data from external databases to provide reports or alerts for driver behavior or vehicle behavior. For instance, a database can show the types of fuel a driver purchases (e.g. from a credit card) and where and when a driver refuels. For example, the GPS data and fueling data may show that a driver of a vehicle V, "Steve," fills up with 20 Gallons on Tuesdays and Thursdays at "Ritz Gas" on Park Avenue, Anytown, USA. External databases on gas prices show that this station is particularly high priced, and moreso still on Tuesdays and Thursdays. The system could be configured to send an alert or give a report indicating that Steve is paying more for gas than needed. The system could also be adapted to model a solution to avoid the higher priced gas. For example, the system may indicate that if Steve refuels on Monday and Wednesdays at Acme Gas, on Poverty Lane, Anywhere USA, Steve will pay less for gas. Therefore, the system may determine fuel purchase discrepancies based on driver/vehicle assignment at timestamp and location of purchase.

The system can also be configured to send an alert if the GPS event data and data from external databases indicates an inconstancy. For example, where Steve fills up with 20 Gallons on Tuesdays and Thursdays, the GPS data combined with data about the vehicle type and fuel data may show that Steve's gas consumption is greater than the vehicle's capacity, indicating that Steve purchasing more gas (i.e. for another car) than he is using.

In another embodiment, the system can be configured to store a record of a route from an origin location to a destination location and record the route for provision to a computer configured to display the route as a map. A mapping integration including functionality to replay traveled routes such as a "Route Replay" function is described in U.S. patent application Ser. No. 13/083,222 entitled "System and Method for Providing an Electronic Representation of a Route," the entirety of which is incorporated by reference hereby.

Figure 1D:
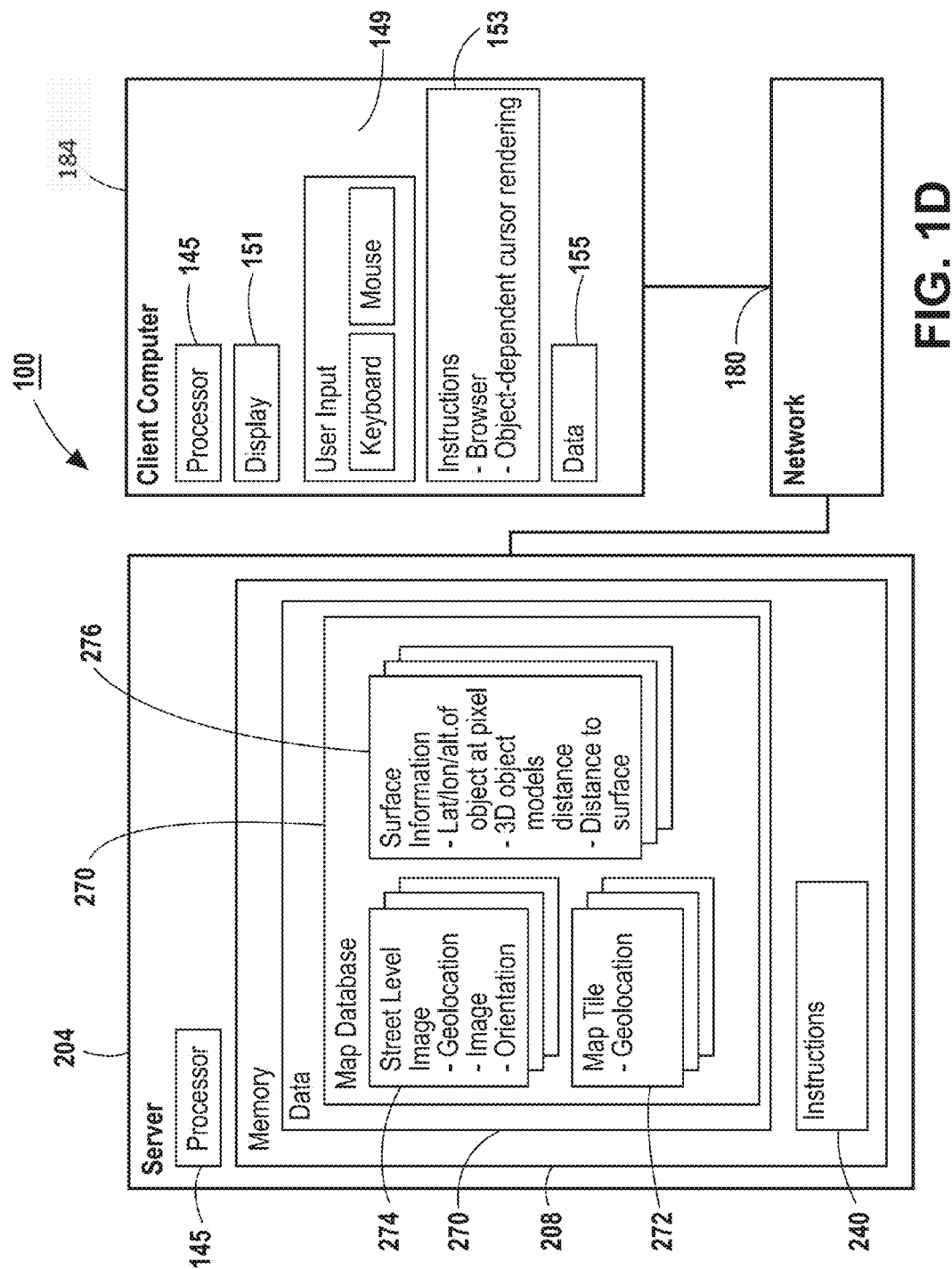

FIG. 1D shows one embodiment of a computer system 10 is configured to provide an electronic representation of a route. The system is programmed to store in a memory operatively coupled to at least processor, a record of a route from an origin location to a destination location. A client computer 184, 194 may be configured, for example, to have software programmed to store a record of a route locally, or the client may access a server 204 of a service provider that stores and maintains records of such routes in a DBMS 208.

The system 100 is configured to provide a user with a plurality of ground level area representations of locations corresponding locations along the recorded route including an origin location and a destination location. A description of exemplary embodiments of systems and methods for generating and providing ground level area representations can be found at in U.S. patent application Ser. No. 12/391,516, the entirety of which is incorporated by reference herein.

In one embodiment, a map database 270 of server 204 stores map-related information 272, 274, 276 at least a portion of which may be transmitted to a client device 184,194. As shown in FIG. 1D, for example, map database 270 may store map tiles 272, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 204 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

The map database may also store ground level images 274 such as "street level" images. Ground level images 274 comprise images of objects at geographic locations, captured by cameras at geographic locations, in a direction generally parallel to the ground.

Figure 9A:
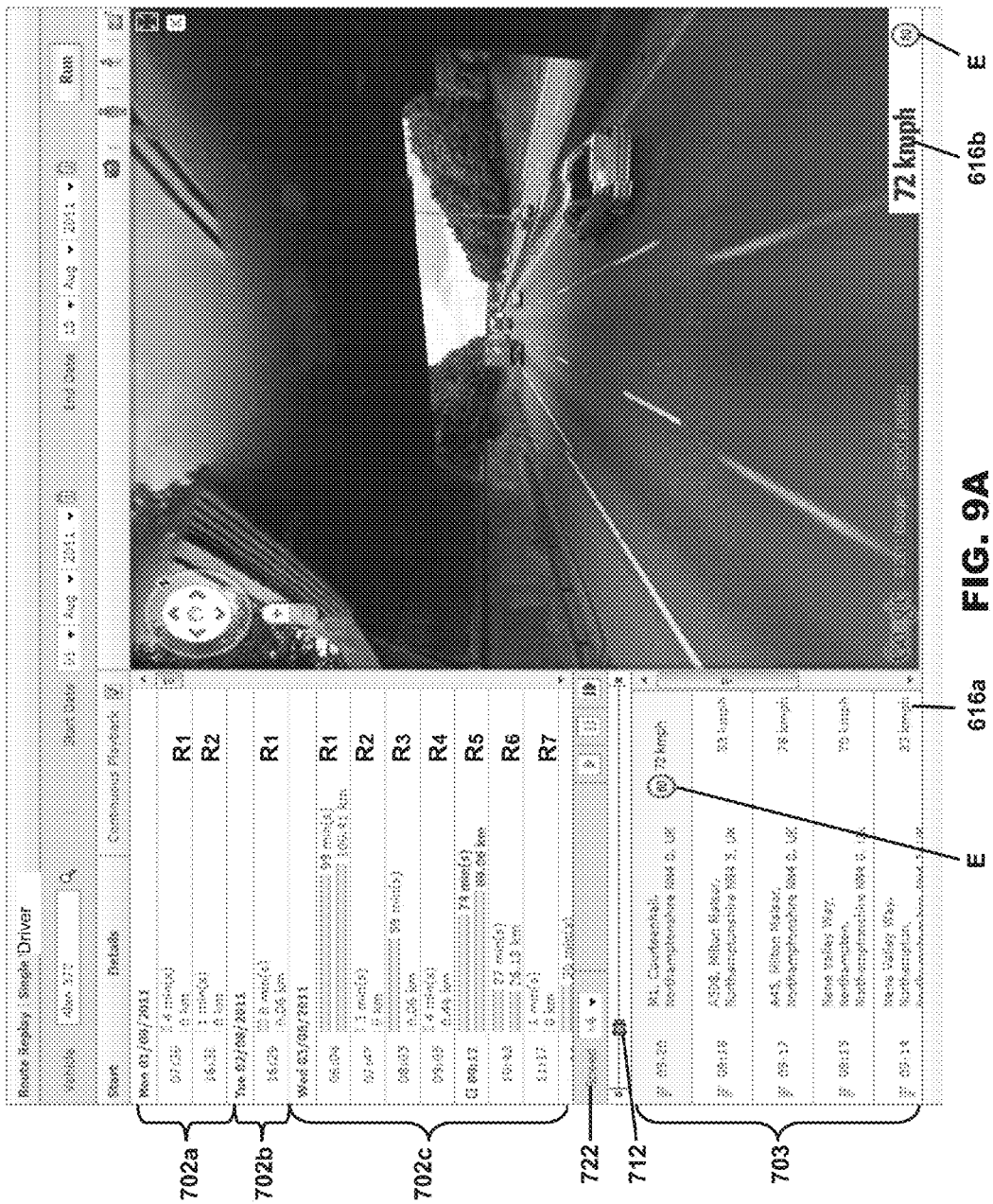

Thus, as shown in FIG. 9A, ground level image data may represent various geographic objects such as buildings 722, sidewalks 730 and street or road 740 from a perspective of a few feet above the ground and looking down the street or road. It will be understood that while ground level image 720 only shows a few objects for ease of explanation, a typical street level image will contain as many objects associable with geographic locations (street lights, mountains, trees, bodies of water, vehicles, people, etc.) in as much detail as the camera was able to capture.

The ground level image 720 may be captured by a camera mounted on top of a vehicle, from a camera angle pointing roughly parallel to the ground and from a camera position at or below the legal limit for vehicle heights (e.g., 7-14 feet). Ground level images are not limited to any particular height above the ground, for example, a street level image may be taken from the top of building. Panoramic street-level images up to 360 degrees may be created by stitching together a plurality of photographs taken from different camera angles.

The system 140 is configured cause the display device 155 to display thereon a plurality of sequential displays of the ground level area representations 720 for locations along a route, as shown in FIGS. 9-10. In one embodiment the route includes a first display comprising an origin location area representation; a plurality of sequential displays comprising sequential location area representations along the route; and a last display of a destination location area representation. The system 140 can be configured to receive at least one ground level image representation for each location along the route, or for selected locations along the route.

In one embodiment, the system is programmed work in conjunction with a system configured to provide a record of a route recorded by a GPS (Global Positioning System) device, for example, using an on-board unit which uses technology such as GPS to monitor a vehicle's positions and transmit wireless uploads to a central host system, as described herein.

One or more systems 100 can be further programmed record the route. The recorded route can then be provided to a computer system 100 configured to display the route as a map on a display device 151 of a client device 184, as described above. The computer system 100 can then be configured cause the display to display thereon the plurality of sequential displays of the ground level area representations along the recorded route so as to replicate a first person view of the route. The system 140 is configured to provide to the graphic user interface 151 a user-interactive interface to control and replay the ground level sequential displays as shown in FIG. 10.

Figure 9C:
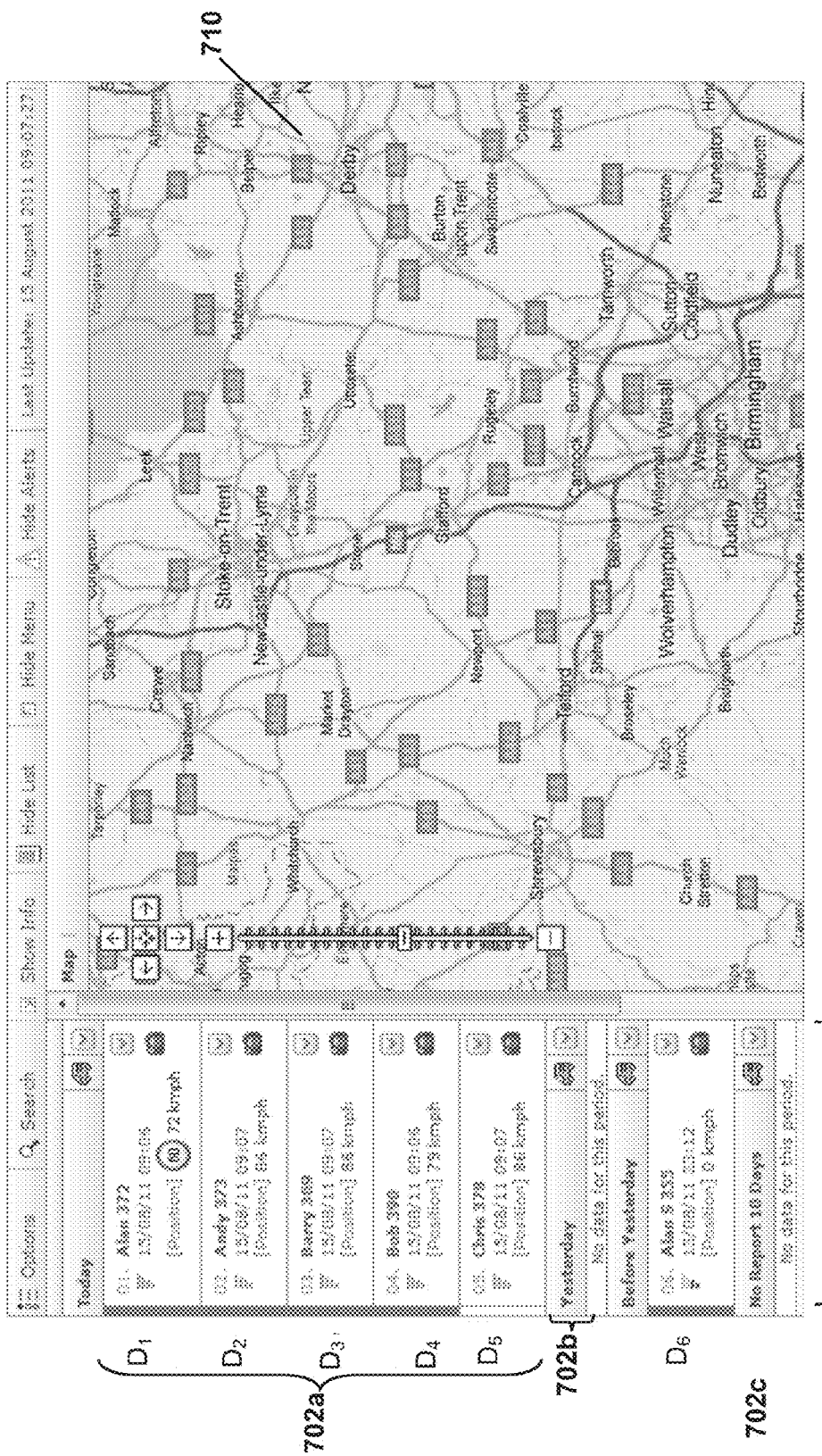

For example in one embodiment, an on-board GPS unit uploads one or more point-to-point routes it as traveled to a central host system. These travelled routes can be presented to a user on a display device 151, for example, as a layout shown in FIGS. 9A-9C. At 700, the routes taken for at least one vehicle associated with a driver can be displayed in an interactive graphic. As shown in 700, one screen has a scrollable interface for viewing statistics and routes taken for a vehicle for a number of days 702*a*, 702*b*, 702*c* . . . 702*n*. As an alternative, routes taken for each of a fleet of vehicles on a given day could be presented. For example as shown in FIG. 9C, a "Live Map" 324 shows GPS data and mapping software which tracks vehicles v1, v2 . . . vn. Each day or driver can have, for example, statistics for one or more routes R1, R2, R3, R4 . . . Rn recorded for that vehicle by an on board GPS device, as well as a total RT. The origin and destination for route can be determined in any number of ways, as for example between deliveries for a delivery service (e.g., the origin being the start of day, the destination being the first delivery point, which thereafter is the origin point for the next delivery destination, and so on until the end of a work period for vehicle operation, for example, an workday). In another example, an origin point can be the point where the driver's work period starts and the destination where it ends (e.g. end of driver operation for a given workday). The definition of a route for a driver can thus be defined in terms of the needs of a given business or other measurement model.

Locations and time stamps can also be provided for points along the route (e.g., every 60 seconds) in a graphic 703, where speeds 616 can be given. Speeds can be rounded up or down in accord with a rule (no decimal point), or can be more exact (with decimal point. For example, a rounding rule can be applied such than above 5 mph or kmph gets rounded up and anything below gets rounded down.

In embodiments including a speed database comprising speed data such as posted speeds or average road or traffic speeds, if a driver exceeds a posted speed limit for allocation, then it will be flagged in the journey graphic 703. Similar to the exceptions En in the "Red Flag" report 600, the posted speed limit E can be displayed in icon form E and the speed 606 can be displayed in red. For example, for each exception E1 the driver's mph at the location 616 is in red and an icon, a red circle with the number "60," indicated that the posted speed for that location is 60 mph. A "mouse-over" can also display text with further details when a pointer is placed on an exception. If the user is in "street view" of ground level images as described herein, the posted speed can be displayed in a bottom right corner graphic 701 and the excessive speed displayed in red. The mouse-over can also be configured to work on a Multi Route Replay as shown at 702*a* and 702*b* and in FIG. 9C when a position information (arrow) icon is clicked. Also similar to the other speed reports and alerts for a driver, (e.g. the Red Flag Report 600) if the "posted speed" feature is not switched on then the speed threshold warnings for reporting and alerting for, among other things, speeds in excess of speed thresholds 70 mph 306*d*, 80 mph 308*d*, and 90 mph 309*d*, with different colors for each (e.g. green, yellow, and red as shown in a driver's speed graphic 610 herein) can show in the journey graphic 703 as well as, if implemented, on the bottom right graphic 701 of the ground level image.

For each route, a number of points representing locations along the route can be recorded from the GPS and stored at the DBMS 208 of a central host system. A displayable map can be offered as described above and as shown in 710. As shown at 710, the four routes are overlaid each with a distinguishing graphic on a displayable electronic map 710. In one embodiment, a user can select a recorded GPS route R1 for Driver 1 using an input device 149 such as a mouse, which would then highlight or display the route R1 on the map 710. For the selected Route R1, the user is presented with a "Route Replay" 720 to give the client a first person perspective of the route.

The system 140 is configured to provide to the graphic user interface 151 a user-interactive interface to control and replay the ground level sequential displays for locations along the route R1. In one embodiment, an input control graphic 722 has user-selectable objects, selectable by a mouse or key inputs for example, has at least one fast forward object 724 at least one play/pause object 723,725 and at least one rewind objects 727. A user can select these objects to start, stop, and control the speed of a first person view of a sequence T1, T2, T3, T4, T5 of ground level images such as street view photographs along the route R1 recorded by the GPS, as shown in FIG. 8. An icon 712 could also be provided on the map 710 or in another area of the graphic which moves along with the sequence of images presented in the "Route Replay." A graphic 703 can also show locations and time stamps can also be provided for points along the route (e.g., every 60 seconds).

Figure 9D:
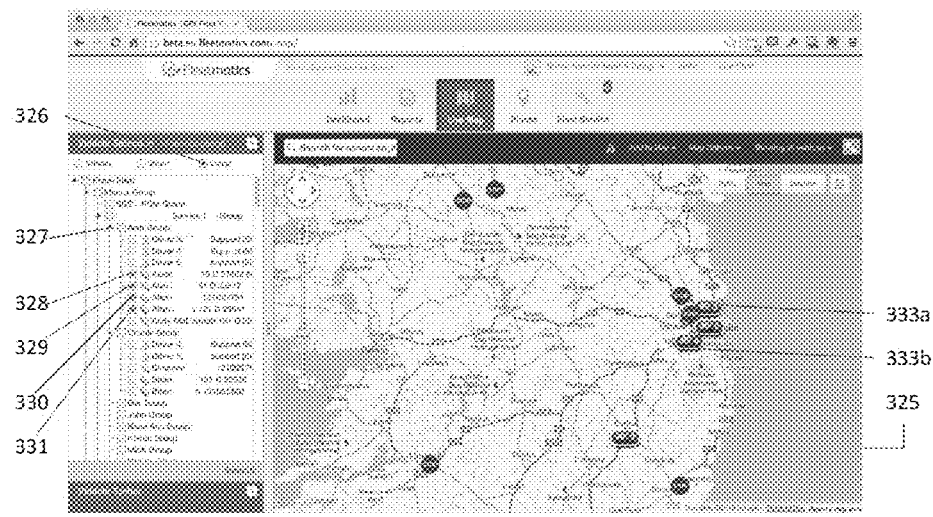

Alternatively, "Live Map" that shows GPS data and mapping software which tracks drivers or groups may be generated based on user selection. For example, as shown in FIG. 9D, after the user select "Groups" 326, then select "Alan Group" 327, and then select vehicles 328-331, the "Live Map" 325 will be generated to show GPS data and mapping information of selected vehicles 328-331. On the live map 325, icon 333*a* indicates there are two vehicles are located at the spot indicated by 333*a*. Similarly, icon 333*b* indicates there are four vehicles are located at the spot indicated by 333*b*.

FIG. 10 shows a time sequence T1, T2, T3, T4, T5 . . . Tn of ground level images 720 that are presented to a user on a display device 151. As shown in FIG. 10, in one embodiment, the sequence, T1, T2, T3, T4, T5 . . . Tn of ground level images is played for locations along the route in a manner like a slide show, giving the viewer a first person view of the exact route taken by the driver on a time-scale proportionate to the driver's movement. Thus in such an embodiment, the speed, starts and stops of the driver will be presented so as to reflect the recorded route as travelled driver.

In one embodiment, the system provides a timeline view as a visual, interactive representation of vehicle and driver activity. The user can easily scan activity for multiple vehicles at a time, compare the travel activity of multiple drivers in one view, and advantageously allows a user to quickly identify issues or exceptions and drill directly down to full replay mode via one input (e.g. mouseover or touchscreen) via a one or a few "clicks" on a driver's day or shift.

Figure 13A:
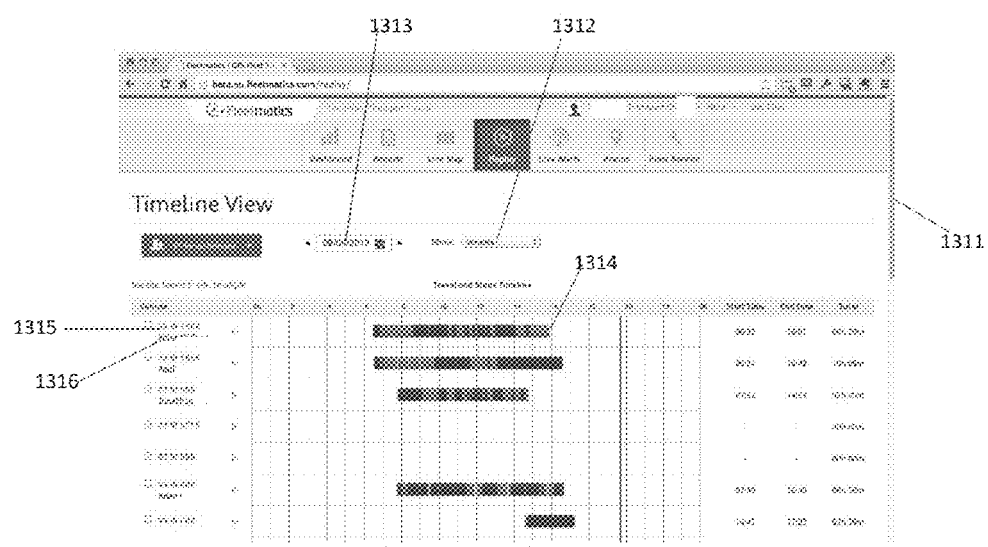
FIGS. 13A-13F illustrate an example of a series of interactive displays for timeline view.

In an embodiment, FIGS. 13A-13F illustrate an example of a series of interactive displays for timeline view of driver activity and/or vehicle activity based on user selection. A "Timeline" graph makes early starts, early finishes and off hours use obvious at a glance. Color-coded vehicle statuses are configured to highlight exceptions, such as long stops and excess idling. As shown in FIG. 13A, in a replay screen ("Route Replay") page 1311, after the user selects 1312 "Vehicles" to show the travel and stops timeline of each vehicle during a selected time period, ie., September 9 as selected in 1313, timelines for all the selected vehicles are displayed. For example, interactive timeline 1314 of vehicle 1315 "02 W 1362", which is assigned to driver 1316 "Peter", indicates that the travel of vehicle 1315 on September, 9 starts at time 06:32, ends at time 16:01, and the total travel time is 9 hours 29 minutes. The red portion of the timeline 1314 indicates the status is stop, the yellow portion indicates the status is idling, and the green portion indicates the vehicle is moving.

Figure 13B:
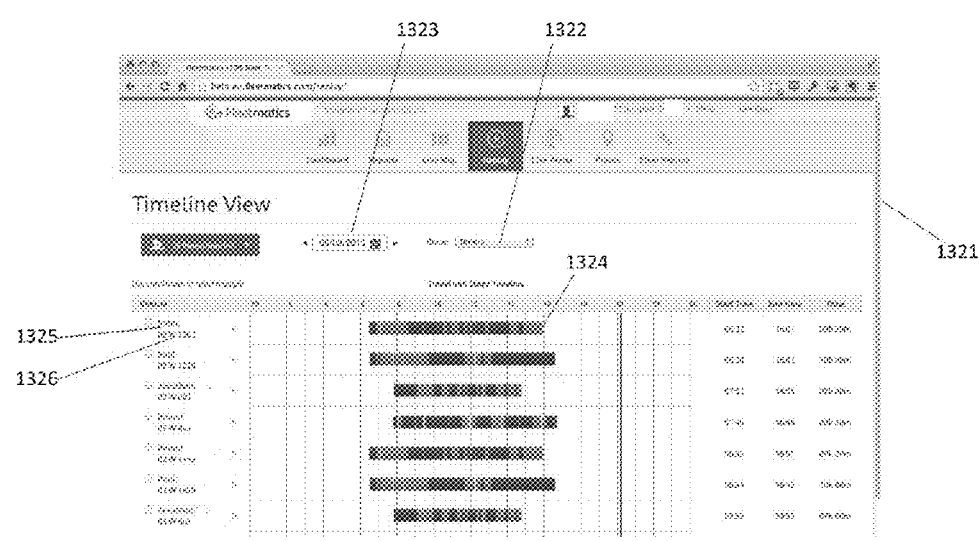

The activity within timeline view can be organized by either vehicles or drivers, depending on the user's preference. As shown in FIG. 13B, in a replay page 1321, after the user select 1322 "Drivers" to show the travel and stops timeline of each driver on September 9 as selected in 1323, timelines for all the selected drivers are displayed. For example, interactive timeline 1324 of driver 1325 "Peter", which is assigned to vehicle "02 W 1362", indicates that the travel of driver 1325 on September, 9 starts at time 06:32, ends at time 16:01, and the total travel time is 9 hours 29 minutes.

Figure 13C:
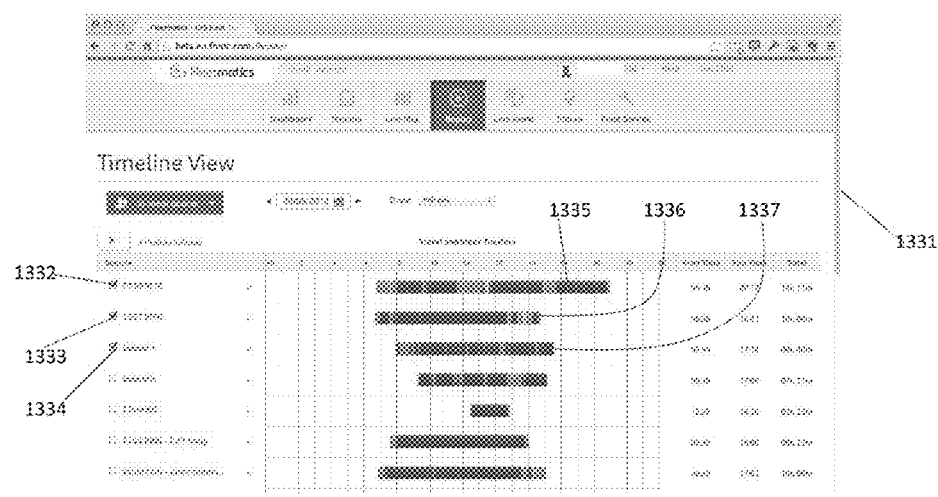

The user can check off multiple drivers to view all their activity on one map with playback abilities. As shown in FIG. 13C, in a replay page 1331, after the user select vehicle 1332 "PX59 WYA", vehicle 1333 "YS57 WTN" and vehicle 1334 "bobcat 1", timelines 1335-1337 are displayed for the 3 selected vehicle 1332-1334, respectively. It will also be appreciated that after the user selects multiple drivers, timelines for the multiple drivers may be displayed on the page.

Figure 13D:
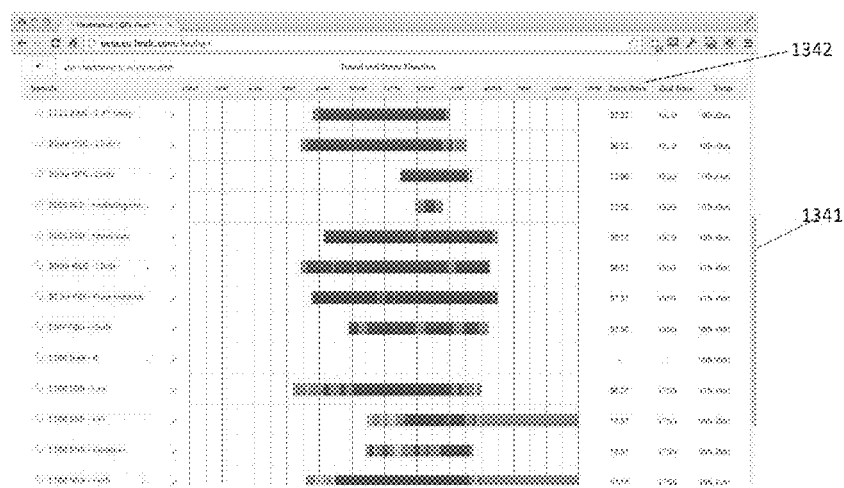

The "Timeline View" is configured to intelligently determine if the user has scrolled down and automatically shows the header information with the time scale if needed. As shown in FIG. 13D, in a replay page 1341, the timelines for vehicles are displayed. After the user scrolled down, the header information 1342 is automatically shown on the page.

Figure 13E:
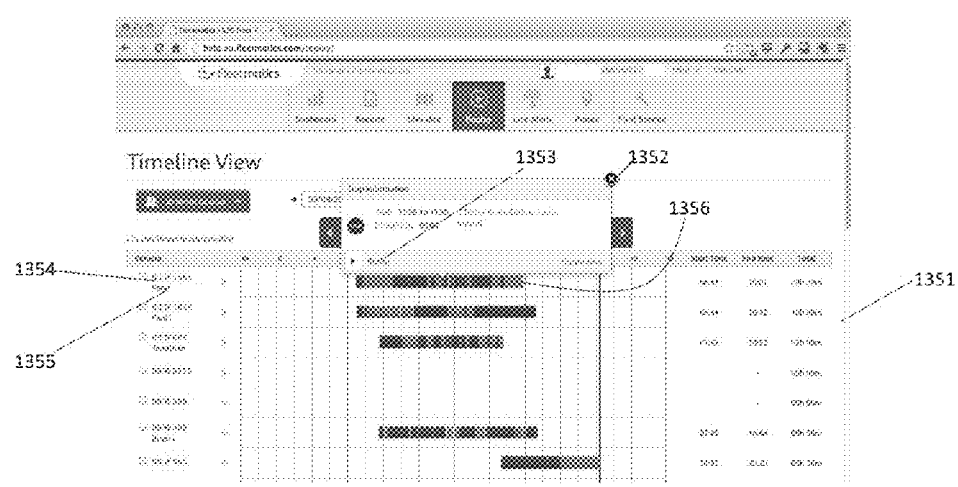

Furthermore, the interactive timeline segments display location and trip details. As shown in FIG. 13E, in a replay page 1351, when the user selects a segment of a displayed interactive timeline 1356, for example by a mouse click or mouseover, an information area 1352 may be populated. The information area 1352 includes information about the selected segment representing stop, idling or travel. For example, as shown in FIG. 3E, the information area 1352 indicates that the selected segment represents a stop activity of vehicle 1354 "02 W 1362" associated with driver 1355 "Peter", the stop time is from 11:26 to 11:30, duration 00:04 hour, and the stop location "1 sleaty Road, Carlow, Laois, Ireland". When the user click "Replay" button 1353, a visual representation of travel and stop activity of the driver or the vehicle represented by the selected timeline will be displayed, as shown in FIG. 13F.

Figure 13F:
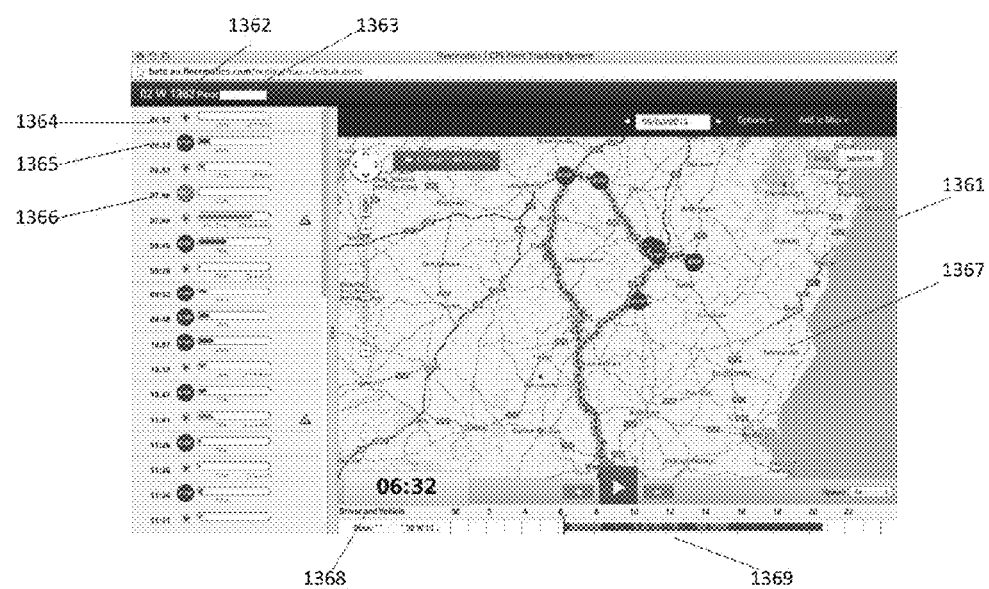

For example as shown in FIG. 13F, page 1361 has a scrollable interface for selecting different time segments of the timeline 1356 for vehicle 1362 "02 W 1362", associated with driver 1363 "Peter", by clicking selection area 1364-1366, etc. For example, when the user selects selection area 1364, which representing a travel activity, the visual representation of travel activity of the vehicle will be displayed on the map area 1367 as a moving arrow. When the user selects selection area 1365, which representing a stop activity, the visual representation of stop activity of the vehicle will be displayed on the map area 1367 as a stop sign. When the user selects selection area 1366, which representing a idling activity, the visual representation of idling activity of the vehicle will be displayed on the map area 1367 as a idling sign. As shown in area 1368, timeline 1369 represent the activity of driver "Peter", such as stop, idling and travel. Therefore, timeline 1369 in FIG. 13F is based on driver centricity and timeline 1356 in FIG. 13E is based on vehicle centricity.

In another embodiment, a preset play speed causes the display device 151 to display thereon the plurality of sequential displays in a time sequence different than that of the speed and movement of the vehicle recorded by the GPS. Thus, for example, the sequence of ground level images such as photographs of points along the route, may be presented slower than a "real time" record of the route to allow for a more viewer-friendly presentation of the sequence of images where, for instance, a real time presentation would present the images in sequence too quickly.

In another embodiment, transitioning from image to image may be smoothed or made more continuous, as described in incorporated reference U.S. patent application Ser. No. 12/391,596. In such an embodiment a "real time" presentation of a "Route Replay" can be contemplated.

As explained above, panoramic street-level images up to 360 degrees may be created by stitching together a plurality of photographs taken from different camera angles. In another embodiment, system 140 can provide, for at least one of the plurality of locations along the route, a plurality of ground level area representations configured to display a 360 degree view of the location for the first person view.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

The invention claimed is:

1. A computer system comprising:
   a memory; and
   at least one processor, coupled to the memory, configured to:
   receive Global Positioning System (GPS) event data transmitted from each GPS device, of a plurality of GPS devices, over a period of time,
      each GPS device, of the plurality of GPS devices, being associated with a corresponding vehicle, of a plurality of vehicles, and
      each GPS event data including location information for a vehicle, of the plurality of vehicles, associated with each GPS device;
   store the GPS event data, received from the plurality of GPS devices, in the memory;
   associate information identifying each driver, of a plurality of drivers, and information identifying one or more of the plurality of vehicles;
   provide a graphic user interface that includes at least one user-selectable filtering category for generating a report based on the GPS event data in the memory,
      the at least one user-selectable filtering category including a group filter category with a plurality of user-selectable vehicle groups,
         each of the plurality of user-selectable vehicle groups including information identifying two or more vehicles of the plurality of vehicles;
   provide driver activity information for each driver of the plurality of drivers,
      the driver activity information being derived from the GPS event data;
   provide, via the graphic user interface and based on the GPS event data, an interactive display that displays a visual representation of the driver activity information during a time period;
   generate, in response to a selection of one of the plurality of user-selectable vehicle groups and based on the GPS event data, one or more vehicle activity reports that include information associated with:
      each of the vehicles in the one of the plurality of user-selectable vehicle groups,
      scores and rankings, associated with a plurality of operational metrics, for each of the vehicles in the one of the plurality of user-selectable vehicle groups,
         the rankings being based on a comparison of the scores, for each of the vehicles in the one of the plurality of user-selectable vehicle groups, with scores of the plurality of vehicles other than the vehicles in the one of the plurality of user-selectable vehicle groups,
      each driver assigned to the vehicles in the one of the plurality of user-selectable vehicle groups, and
      each indirectly-associated vehicle that is assigned to at least one of the drivers assigned to the vehicles in the one of the plurality of user-selectable vehicle groups,
         each indirectly-associated vehicle not being included in the one of the plurality of user-selectable vehicle groups;
   provide, via the graphic user interface, the one or more vehicle activity reports;
   determine whether the plurality of vehicles satisfy a goal, associated with the plurality of operational metrics, based on the one or more vehicle activity reports and the GPS event data; and
   provide information indicating whether the plurality of vehicles satisfy the goal.

2. The computer system of claim 1, wherein the information identifying each driver is associated with information identifying one of the plurality of vehicles for a particular period of time.

3. The computer system of claim 1, wherein the visual representation indicates a start time, an end time, and duration, associated with the driver activity information, for the time period.

4. The computer system of claim 1, wherein the visual representation comprises a plurality of segments,
   each of the plurality of segments representing a segment time period during which one of the plurality of vehicles includes an unchanged vehicle status based on the driver activity information.

5. The computer system of claim 4, wherein the vehicle status is based on at least one of the plurality operational metrics, and
   wherein the visual representation indicates each different vehicle status with a different graphic pattern.

6. The computer system of claim 4, wherein when one of the plurality of segments is selected, the at least one processor is further configured to:
   provide segment information for the one of the plurality of segments.

7. The computer system of claim 6, wherein the segment information includes information indicating:
   a segment start time associated with the one of the plurality of segments,
   a segment end time associated with the one of the plurality of segments,
   a segment duration associated with the one of the plurality of segments, and
   a location of the one of the plurality of vehicles during the segment time period.

8. The computer system of claim 1, wherein the at least one processor is further configured to:
   store, in the memory, a record of a route from an origin location to a destination location during the time period represented by the visual representation; and
   provide the record of the route to a device that displays the route as a map.

9. The computer system of claim 4, wherein the at least one processor is further configured to:
   store, in the memory, a record of a segment route from an origin segment location to a destination segment location during the segment time period; and
   provide the record of the segment route to a device that displays the segment route as a map.

10. The computer system of claim 1, wherein each GPS device, of the plurality of GPS devices, is associated with a corresponding driver, of the plurality of drivers, based on an input received from a driver identification device.

11. The computer system of claim 10, wherein the driver identification device is one of:
a Driver Keyfob,
a Driver Assignment Module,
a Driver Mobile Application,
a Third Party Integrations, or
a GPS device not included in the plurality of GPS devices.

12. The computer system of claim 1, wherein the at least one processor is further configured to:
generate a data structure that associates information identifying one of the plurality of drivers and information identifying one or more of the plurality of vehicles and associates information identifying one of the plurality of vehicles and information identifying one or more drivers of the plurality of drivers; and
store the data structure in the memory.

13. The computer system of claim 12, wherein the data structure is a lookup table.

14. A method comprising:
receiving, by a device, Global Positioning System (GPS) event data transmitted from each GPS device, of a plurality of GPS devices, over a period of time,
each GPS device, of the plurality of GPS devices, being associated with a corresponding vehicle, of a plurality of vehicles, and
each GPS event data including location information for a vehicle, of the plurality of vehicles, associated with each GPS device;
storing, by the device, the GPS event data, received from the plurality of GPS devices, in a memory;
associating, by the device, information identifying each driver, of a plurality of drivers, and information identifying one or more of the plurality of vehicles;
providing, by the device, a graphic user interface that includes at least one user-selectable filtering category for generating a report based on the GPS event data in the memory,
the at least one user-selectable filtering category including a group filter category with a plurality of user-selectable vehicle groups,
each of the plurality of user-selectable vehicle groups including information identifying two or more vehicles of the plurality of vehicles;
providing, by the device, driver activity information for each driver of the plurality of drivers,
the driver activity information being derived from the GPS event data;
providing, by the device and via the graphic user interface and based on the GPS event data, an interactive display that displays a visual representation of the driver activity information during a time period;
generating, by the device, in response to a selection of one of the plurality of user-selectable vehicle groups, and based on the GPS event data, one or more vehicle activity reports that include information associated with:
each of the vehicles in the one of the plurality of user-selectable vehicle groups,
scores and rankings, associated with a plurality of operational metrics, for each of the vehicles in the one of the plurality of user-selectable vehicle groups,
the rankings being based on a comparison of the scores, for each of the vehicles in the one of the plurality of user-selectable vehicle groups, with scores of the plurality of vehicles other than the vehicles in the one of the plurality of user-selectable vehicle groups,
each driver assigned to the vehicles in the one of the plurality of user-selectable vehicle groups, and
each indirectly-associated vehicle that is assigned to at least one of the drivers assigned to the vehicles in the one of the plurality of user-selectable vehicle groups,
each indirectly-associated vehicle not being included in the one of the plurality of user-selectable vehicle groups;
providing, by the device and via the graphic user interface, the one or more vehicle activity reports;
determining, by the device, whether the plurality of vehicles satisfy a goal, associated with the plurality of operational metrics, based on the one or more vehicle activity reports and the GPS event data; and
providing, by the device, information indicating whether the plurality of vehicles satisfy the goal.

15. The method of claim 14, where the information identifying each driver is associated with information identifying one of the plurality of vehicles for a particular period of time.

16. The method of claim 14, where the visual representation indicates a start time, an end time, and duration, associated with the driver activity information, for the time period.

17. A non-transitory computer-readable medium storing instructions, the instructions comprising:
one or more instructions that, when executed by one or more processors, cause the one or more processors to:
receive Global Positioning System (GPS) event data transmitted from each GPS device, of a plurality of GPS devices, over a period of time,
each GPS device, of the plurality of GPS devices, being associated with a corresponding vehicle, of a plurality of vehicles, and
each GPS event data including location information for a vehicle, of the plurality of vehicles, associated with each GPS device;
store the GPS event data, received from the plurality of GPS devices, in a memory;
associate information identifying each driver, of a plurality of drivers, and information identifying one or more of the plurality of vehicles;
provide a graphic user interface that includes at least one user-selectable filtering category for generating a report based on the GPS event data in the memory,
the at least one user-selectable filtering category including a group filter category with a plurality of user-selectable vehicle groups,
each of the plurality of user-selectable vehicle groups including information identifying two or more vehicles of the plurality of vehicles;
provide driver activity information for each driver of the plurality of drivers,
the driver activity information being derived from the GPS event data;
provide, via the graphic user interface and based on the GPS event data, an interactive display that displays a visual representation of the driver activity information during a time period;
generate, in response to a selection of one of the plurality of user-selectable vehicle groups and based on the GPS event data, one or more vehicle activity reports that include information associated with:
each of the vehicles in the one of the plurality of user-selectable vehicle groups, scores and rankings, associated with a plurality of operational metrics, for each of the vehicles in the one of the plurality of user-selectable vehicle groups,
    the rankings being based on a comparison of the scores, for each of the vehicles in the one of the plurality of user-selectable vehicle groups, with scores of the plurality of vehicles other than the vehicles in the one of the plurality of user-selectable vehicle groups, each driver assigned to the vehicles in the one of the plurality of user-selectable vehicle groups, and each indirectly-associated vehicle that is assigned to at least one of the drivers assigned to the vehicles in the one of the plurality of user-selectable vehicle groups,
    each indirectly-associated vehicle not being included in the one of the plurality of user-selectable vehicle groups;

provide, via the graphic user interface, the one or more vehicle activity reports;

determine whether the plurality of vehicles satisfy a goal, associated with the plurality of operational metrics, based on the one or more vehicle activity reports and the GPS event data; and provide information indicating whether the plurality of vehicles satisfy the goal.

18. The non-transitory computer-readable medium of claim 17, where the information identifying each driver is associated with information identifying one of the plurality of vehicles for a particular period of time.

19. The non-transitory computer-readable medium of claim 17, where the visual representation indicates a start time, an end time, and duration, associated with the driver activity information, for the time period.

20. The non-transitory computer-readable medium of claim 17, where the visual representation comprises a plurality of segments,
    each of the plurality of segments representing a segment time period during which one of the plurality of vehicles includes an unchanged vehicle status based on the driver activity information.

* * * * *